US006877137B1

(12) United States Patent
Rivette et al.

(10) Patent No.: US 6,877,137 B1
(45) Date of Patent: Apr. 5, 2005

(54) SYSTEM, METHOD AND COMPUTER PROGRAM PRODUCT FOR MEDIATING NOTES AND NOTE SUB-NOTES LINKED OR OTHERWISE ASSOCIATED WITH STORED OR NETWORKED WEB PAGES

(75) Inventors: Kevin G. Rivette, Palo Alto, CA (US); Irving S. Rappaport, Palo Alto, CA (US); Luke Hohmann, Mountain View, CA (US); Sandra L. Carrico, Mountain View, CA (US); Andrew S. DeWolfe, Sunnyvale, CA (US); Brent Rosenquist, Sunnyvale, CA (US); David Koehn, Mountain View, CA (US)

(73) Assignee: Rose Blush Software LLC, Los Altos, CA (US)

( * ) Notice: Subject to any disclaimer, the term of this patent is extended or adjusted under 35 U.S.C. 154(b) by 0 days.

(21) Appl. No.: 09/455,528

(22) Filed: Dec. 7, 1999

Related U.S. Application Data

(63) Continuation-in-part of application No. 09/057,557, filed on Apr. 9, 1998, now Pat. No. 6,389,434, and a continuation-in-part of application No. 09/057,644, filed on Apr. 9, 1998, now Pat. No. 6,018,749.
(60) Provisional application No. 60/139,376, filed on Jun. 16, 1999.

(51) Int. Cl.[7] .............................................. G06F 17/00
(52) U.S. Cl. .................................... 715/512; 715/501.1
(58) Field of Search .............................. 715/512, 501.1, 715/513, 511, 530, 531; 345/775, 776

(56) References Cited

U.S. PATENT DOCUMENTS

| 4,205,780 A | 6/1980 | Burns et al. |
|---|---|---|
| 4,270,182 A | 5/1981 | Asija |
| 4,486,857 A | 12/1984 | Heckel |
| 4,533,910 A | 8/1985 | Sukonick et al. |
| 4,555,775 A | 11/1985 | Pike |
| 4,622,545 A | 11/1986 | Atkinson |
| RE32,632 E | 3/1988 | Atkinson |
| 4,736,308 A | 4/1988 | Heckel |
| 4,748,618 A | 5/1988 | Brown et al. |
| 4,772,882 A | 9/1988 | Mical |
| 4,785,408 A | 11/1988 | Britton et al. |
| 4,788,538 A | 11/1988 | Klein et al. |
| 4,812,834 A | 3/1989 | Wells |
| 4,847,604 A | 7/1989 | Doyle |
| 4,873,623 A | 10/1989 | Lane et al. |
| 4,884,223 A | 11/1989 | Ingle et al. |
| 4,899,136 A | 2/1990 | Beard et al. |

(Continued)

FOREIGN PATENT DOCUMENTS

EP 0239884 10/1987

OTHER PUBLICATIONS pg,1*
"Agent Searching," Executive Technologies, Inc., Last Updated: Jan. 12, 1996.

(Continued)

*Primary Examiner*—Sanjiv Shah
(74) *Attorney, Agent, or Firm*—Sterne Kessler Goldstein & Fox PLLC

(57) ABSTRACT

A system and method of manipulating notes linked to Web pages, and of manipulating the Web pages. These Web pages (or portions of Web pages) can be stored at a Web site or in a local file system. The method of linking notes to Web pages operates by enabling a user to select a portion of a Web page, creating a annotation, linking the annotation to the selected portion, receiving a request from a user viewing the annotation to display the selected portion linked to the annotation, and invoking an application, if the application is not already invoked, and for causing the application to load the Web page and present the selected portion.

18 Claims, 40 Drawing Sheets

U.S. PATENT DOCUMENTS

| | | |
|---|---|---|
| 4,914,732 A | 4/1990 | Henderson et al. |
| 4,931,783 A | 6/1990 | Atkinson |
| 4,935,865 A | 6/1990 | Rowe et al. |
| 4,939,507 A | 7/1990 | Beard et al. |
| 4,959,769 A | 9/1990 | Cooper et al. |
| 4,977,455 A | 12/1990 | Young |
| 4,985,863 A | 1/1991 | Fujisawa et al. |
| 4,991,087 A | 2/1991 | Burkowski et al. |
| 5,008,853 A | 4/1991 | Bly et al. |
| 5,062,060 A | 10/1991 | Kolnick |
| 5,072,412 A | 12/1991 | Henderson, Jr. et al. |
| 5,120,944 A | 6/1992 | Kern et al. |
| 5,148,154 A | 9/1992 | MacKay et al. |
| 5,155,806 A | 10/1992 | Hoeber et al. |
| 5,157,768 A | 10/1992 | Hoeber et al. |
| 5,163,104 A | 11/1992 | Ghosh et al. |
| 5,222,160 A | 6/1993 | Sakai et al. |
| 5,228,123 A | 7/1993 | Heckel |
| 5,237,158 A | 8/1993 | Kern et al. |
| 5,241,671 A | 8/1993 | Reed et al. |
| 5,253,362 A | 10/1993 | Nolan et al. |
| RE34,476 E | 12/1993 | Norwood |
| 5,276,616 A | 1/1994 | Kuga et al. |
| 5,319,745 A | 6/1994 | Vinsonneau et al. |
| 5,349,170 A | 9/1994 | Kern |
| 5,392,428 A | 2/1995 | Robins |
| 5,404,514 A | 4/1995 | Kageneck et al. |
| 5,428,778 A | 6/1995 | Brookes |
| 5,432,897 A | 7/1995 | Tatsumi et al. |
| 5,440,481 A | 8/1995 | Kostoff et al. |
| 5,442,778 A | 8/1995 | Pedersen et al. |
| 5,444,615 A | 8/1995 | Bennett et al. |
| 5,481,666 A | 1/1996 | Nguyen et al. |
| 5,519,857 A | 5/1996 | Kato et al. |
| 5,537,526 A | 7/1996 | Anderson et al. |
| 5,544,302 A | 8/1996 | Nguyen |
| 5,550,976 A | 8/1996 | Henderson et al. |
| 5,551,055 A | 8/1996 | Matheny et al. |
| 5,557,722 A | 9/1996 | DeRose et al. |
| 5,559,942 A | 9/1996 | Gough et al. |
| 5,568,639 A | 10/1996 | Wilcox et al. |
| 5,581,686 A | 12/1996 | Koppolu et al. |
| 5,583,982 A | 12/1996 | Matheny et al. |
| 5,584,035 A | 12/1996 | Duggan et al. |
| 5,592,607 A | 1/1997 | Weber et al. |
| 5,592,608 A | 1/1997 | Weber et al. |
| 5,596,700 A | 1/1997 | Darnell et al. |
| 5,604,901 A | 2/1997 | Kelley et al. |
| 5,623,679 A | 4/1997 | Rivette et al. |
| 5,623,681 A | 4/1997 | Rivette et al. |
| 5,625,833 A | 4/1997 | Levine et al. |
| 5,628,003 A | 5/1997 | Fujisawa et al. |
| 5,696,963 A | 12/1997 | Ahn |
| 5,757,983 A | 5/1998 | Kawaguchi et al. |
| 5,799,325 A | 8/1998 | Rivette et al. |
| 5,806,079 A | 9/1998 | Rivette et al. |
| 5,809,318 A | 9/1998 | Rivette et al. |
| 5,845,301 A | 12/1998 | Rivette et al. |
| 5,848,409 A | 12/1998 | Ahn |
| 5,999,929 A * | 12/1999 | Goodman ................... 707/7 |
| 6,243,761 B1 * | 6/2001 | Mogul et al. ............ 709/246 |
| 6,366,923 B1 * | 4/2002 | Lenk et al. ............ 707/104.1 |
| 6,389,434 B1 | 5/2002 | Rivette et al. |
| 6,401,131 B1 * | 6/2002 | Haverstock et al. ........ 709/246 |
| 6,433,795 B1 * | 8/2002 | MacNaughton et al. .... 345/738 |
| 6,484,156 B1 * | 11/2002 | Gupta et al. ................. 707/1 |
| 6,571,295 B1 * | 5/2003 | Sidana ....................... 709/246 |
| 6,687,877 B1 * | 2/2004 | Sastry et al. ................ 715/512 |

OTHER PUBLICATIONS

Albert, M., "CD–ROM: The Next PC Revolution," *Fortune Magazine*, Jun. 29, 1992.

Albert, M., "Ease Access to Patents," *Fortune Magazine*, Jun. 29, 1992.

Alexander, "Visualizing Cleared–Off Desktops," *Computerworld*, May 6, 1991, p. 20.

Banet, "Creating a CD–ROM: overview of the product field," *The Seybold Report on Desktop Publishing*, vol. 7, No. 6, p. 3(29), Feb. 1993.

Becker, "Voyager kit: Ticket to books on–line," *MacWeek*, vol. 7, No. 8, Feb. 22, 1993, p. 57.

Berk et al. (eds.), *Hypertext/Hypermedia Handbook*, pp. 209–224, 285–297, 329–355, 529–533, Jan. 1991.

Bermant, "Finding It Fast: New Software Features That Search Your System," *Personal Computing*, vol. 11, No. 11, Nov. 1987, pp. 125–131.

Bish, "An Essential ingredient: Post recognition processing," *Imaging World*, vol. 5, Issue 3, Mar. 1996.

Blatt, J., "A Primer on User Interface Software Patents," *The Computer Lawyer*, vol. 9, No. 4, Apr. 1992.

Boedeker et al., "Choosing Imaging Software," *Law Office Computing*, vol. 5, Issue 3, Jun./Jul., 1995, pp. 50–55.

"Boolean Searching," Executive Technologies, Inc., Last Updated: Jan. 12, 1996.

Bradbury, "Expanded Book Toolkit," *MacUser*, vol. 9, No. 3, Mar., 1993, p. 85.

Briggs, "CD–ROM publishing boom is Dataware's delight," *MIS Week*, vol. 10, No. 38, Sep. 25, 1989, pp. 40–41.

Briggs, "Dataware Comes to U.S. With CD–ROM Publishing," *MIS Week*, vol. 10, No. 5, Jan. 30, 1989, p. 21.

Brockschmidt, *Inside OLE 2*, Microsoft Press, Redmond, WA, Copyright 1994.

Brockschmidt, "What OLE Is Really About," *OLE Development*, Microsoft Corporation, Copyright 1997, pp. 1–59.

"BRS/Search: An Industrial Strength Document Warehouse Solution—Profile," Dataware Technologies, Copyright May 1996, pp. 1–12.

"BRS/Search," Dataware Technolgies, Inc., date unclear.

Catchings et al., "Price Delineats Text–Retrieval Software," *PC Week*, vol. 8, No. 20, May 20, 1991, pp. 120–123.

Catchings et al., "Retrieval Technologies Inc.:re:Search 2.0" *PC Week*, vol. 8, No. 20, p. 121(2), May/1991.

Catlin et al., "InterNote: Extending A Hypermedia Framework to Support Annotative Collaboration," *Hypertext '89 Proceedings*, pp. 365 to 378, Nov., 1989.

"CD Author/CD Answer," Dataware Technologies, date unclear.

Chan, Patrick P., *Learning Considerations In User Interface Design: The Room Model*, Software Protability Laboratory, University of Waterloo, Waterloo, Ontario, Canada, Jul. 1984.

"Chapter 1: Component Object Model Introduction," *OLE Development*, Microsoft Corporation, Copyright 1997, pp. 1–37.

Christodoulakis, S., et al., *Browsing Within Time–Driven Multimedia Documents*, Institute for Computer Research, University of Waterloo, Waterloo, Ontario, Canada, pp. 219–227, Jul. 1988.

Classified Search and Image Retrieval Student Manual, U.S. Patent and Trademark Office, May. 1991.

Cohen, "Browsers get BookWorm for Mac," *MacWeek*, vol. 7, No. 39, Oct. 4, 1993, p. 4.

*Commands and Settings,* OmniPage Professional Windows Version 5, Caere Corporation, Chapter 1, pp. 1–1 to 1–70, 1988–1993.
*The Complete Document Profiling and Retrieval System for Windows,* World Software Corporation, WORLDOX, Copyright World Software Corp., 1992.
Conklin, "Hypertext: An Introduction and Survey," *Computer,* pp. 17–41, Sep./1987.
Cooper et al., "Oh! Pascal!," pp. 389–399, Jan. 1982.
Cote et al., "Searching for Common Threads," *Byte,* vol. 17, No. 6, Jun., 1992, pp. 290–305.
*Creation/Modification of the Audio Signal Processor Setup for a PC Audio Editor,* IBM Technical Disclosure Bulletin, vol. 30, No. 10, Mar. 1988.
Curran, "Growing company changes data entry," *Imaging-World,* vol. 4, Issue 3, Mar. 1995.
"Dataware Technologies: Products and Services," Dataware Technologies, Copyright 1996.
Dintzer, J.P. and J. Van Thielen, "Image Handling at the European Patent Office: BACON and First Page," *World Patent Information,* vol. 13, No. 3, pp. 152–154, 1991.
Doherty, "New Op–Disk Peripherals Displayed at Conference," *Electronic Engineering Times,* No. 339, Jul. 22, 1985, p. 15.
Duncan, "ZyIMAGE's Use of Windows Interface Falls Short of Mark," *LAN Times,* vol. 10, Issue 10 May 24, 1993, pp. 70 and 79.
"Eastern Electricity: BRS/Search Customer Profile," Dataware Technologies, Copyright 1995.
*Editing Recognized Documents,* OmniPage Profession Windows Version 5, Caere Corporation, Chapter 3, pp. 3–1, to 3–20, 1988–1993.
"EZ–C + DE2 Images: The New Standard in Data Capture," Textware Corporation, Copyright 1994, pp. 1–8.
*The Fastest, Most Powerful Full Text Retrieval System,* ZyINDEX 5.2 for Windows, Zylab, 1994.
Fersko–Weiss, "3–D Reading with the Hypertext Edge," *PC Magazine,* vol. 10, No. 10, May 28, 1991, pp. 241–282.
Fish et al., "Quilt: a collaborative tool for coopertive writing," *Conf. on Information Systems '88,* pp. 30 to 37, Jan., 1988.
"Forms Processing Products & Services," TextWare Corporation, Copyright 1996.
"FormWare for Windows 95/NT," TexcWare Corporation, Copyright 1996.
"Fuzzy Searching," Executive Technolgies, Inc., Last Updated: Jan. 12, 1996.
Gerber, "Lotus rolls out gateway for Notes, cc: Mail," *InfoWorld,* vol. 14, No. 46, p. 1(2), Nov. 1992.
Halasz et al., "Issues in the Design of Hypermedia Systems," *CHI '90 Tutorial,* Jan. 1990.
Harney, "TextWare's FormWare—Complex Data Capture that Puts Simpicity First," *Imaging Magazine,* Apr. 1996.
Haskin, "Textware 4.0: Text Retrieval for Electronic Documents," *Computer Shopper,* vol. 13, No. 8, Aug. 1993, p. 334–335.
Haskin, "Zylmage Finds Images And Text," *PC–Computing,* vol. 6, No. 5, May 1993, p. 60.
*Help Yourself! With PCT Patent Search On CD–ROM,* MicroPatent, New Haven, CT, appears to be before Jul. 1, 1993.
"Hip Products," ZyLab Europe BV, Copyright 1996.
Holtz, *Mastering Ventura; Second Edition,* pp. 360–375, Jan. 1989.
*How to Install and Use the USAPat Demonstration Disc,* USPTO Office of Information Products Development, 1994(?).
*HyperCard Basics,* Apple Computer, Inc., 1990.
"IDI brings Basis plus down to workgroups," The Seybold Report on Publishing Systems, vol. 22, No. 14, p. 16(2), Apr. 1993.
"InnerView for Windows 3.0, For Evaluation Only, Version 2.2 Pre–Release #6," TMS, Inc. Copyright 1991–1992.
Ishii, H., et al., "Clearface: Translucent Multiuser Interface for Team Work Station," *ECSCW,* Sep., 1991, pp. 6–10.
Ishii, H., et al., "Toward an Open Shared Workspace," *Communications of the ACM,* Dec., 1991, vol. 34, No. 12, pp. 37–50.
Jonckheere, C., "EPOQUE (EPO Query service) the Inhouse Host Computer of the European Patent Office," *World Patent Information,* vol. 12, No. 3, pp. 155–157, 1990.
Karraker, "Voyager Toolkit stretches Expanded Book concept to let users pen their own," *MacWeek,* vol. 6, No. 11, Mar. 16, 1992, p. 9.
Knibbe, "Zylmage 2 boosts OCR, batch duties," *InfoWorld,* vol. 15, Issue 51, Dec. 20, 1993, p. 20.
Knibbe, "Zylmage 3.0 will facillitate distribution on CD–ROMs; Boasts integration with WordScan OCR software," *InfoWorld,* vol. 16, No. 38, Sep. 19, 1994, p. 22.
Lexis–Nexis Printout of a Business Wire Article Entitled: *TMS Announces Contract With Major Insurance Information Provider,* Business Wire Inc., Feb. 11, 1991.
Lexis–Nexis Printout of a Business Wire Article Entitled: *TMS Announces Easy View Available for CD–ROM Publishers,* Business Wire Inc., Mar. 9, 1992.
Lexis–Nexis Printout of a Business Wire Article Entitled: *TMS Announces Release of Inner View 2.1 Software,* Business Wire Inc., Mar. 18, 1991.
Lougher et al., "Supporting long–term collaboration in software maintenance," *Conf. on Organizational Computing Systems,* pp. 228–238, 1993.
Lucas, Jay, "The Progress of Automation at the U.S. Patent and Trademark Office," *World Patent Information,* vol. 14, No. 3, pp. 167–172, 1992.
McEvoy, Ed., *Object Linking and Embedding: Programmer's Reference, Version 1,* Microsoft Press, Redmond, WA, Copyright 1992.
Mallory, "New for Mac: text/graphics retrieval software from TMS," *Newsbytes,*Jul. 1992.
Marshall, "Text retrieval alternatives: 10 more ways to pinpoint important information,"*Infoworld,* vol. 14, No. 12, Mar. 23, 1992, pp. 88–89.
Marshall, "Zylmage adds scanning access to ZyIndex," *InfoWorld,* vol. 16, No. 15, Apr. 11, 1994, pp. 73, 76, and 77.
Marshall, "Zylmage is ZyIndex plus a scan interface integrated," *InfoWorld,* vol. 15, Issue 10, Mar. 8, 1993, p. 100.
Marshall et al., "ZyIndex for Windows, Version 5.0" *InfoWorld,* vol. 15, No. 21, May 1993, pp. 127, 129, 133 and 137.
"MasterView for Microsoft Windows," TMS Inc., Copyright 1993.
Matazzoni, "Expanded Book Toolkit 1.0.1," *Macworld,* vol. 10, No. 6, Jun., 1993, p. 158.
Mendelson, "HyperWriter for Windows," *PC Magazine,* vol. 14, No. 3, Feb. 7, 1995, pp. 140, 142, and 143.
Moore, "Detaware lands $6.6M GPO pact," *Federal Computer Week,* vol. 9, No. 27, Sep. 11, 1995, pp. 84 and 86.

Moore, "The Forms Processing Paradigm Shift," *Imaging Magazine,* Mar. 1995.
"NetAnswer Hosting Service," Dataware Technolgies, Inc., Copyright 1995.
"NetAnswer: Information Super Server for the World Wide Web," Dataware Technolgies, Inc., Copyright 1995.
"NetAnswers: Organizations Worldwide Take Content Onto the Web with NetAnswer," Dataware Technolgies, Spring 1996.
OmniPage Professional Tutorials, Windows Version 5, Caere Corp., Jan. 1993.
Ores, "Hypertext Publishing: Edit Trail," *PC Magazine,* vol. 14, No. 3, Feb. 7, 1995, pp. 132, 134, 136, and 138.
*Patents on CD–ROM, Track Technology, Focus R& D, Watch Competitors, Speed Products to Market, Cut Online/ Copy Costs, A World of Opportunities, from MicroPatent,* MicroPatent USA, New Haven, CT, appears to be before Sep. 1, 1992.
"PatenImages, User Profile European Patents, Search & Tech Tips, Conference Calendar," *MicroPatent World Newsletter,* Spring 1991, New Haven, CT.
Pelham, A., "A Wave of the Wand for Litigators. Tools of the Trade Go High–Tech, Focus on Technology," *Legal Times,* Jan. 24, 1994.
Perenson, "Retrieving Text on the Net," *PC Magazine,* vol. 14, No. 20, Nov. 21, 1995, p. 61.
*Previewing the Letter,* WordPerfect Workbook for IBM Personal Computers, WordPerfect Corporation, Version 5.0, Lesson 4, p. 24 and Lesson 13, pp. 108–109, 1988.
Print out of *On–line Help Manual,* Innerview for Windows 3.0, Version 2.2, Pre–Release ™6, TMS, Inc. 1991–1992.
Quattro Pro User's Guide, Borland Int'l, Inc., p. 245, Jan. 1989.
"re:Search V.2.6," Software Product Specification, Computer Select, Nov. 1993.
Rooney, "Text–retrieval veterans prepare Windows attack," *PC Week,* vol. 9, No. 24, p. 46, Jun. 1992.
Rooney, "ZyLab partners with Calera: films roll out document–image system," *PC Week,* vol. 10, No. 3, Jan. 25, 1993, p. 22.
Schroeder, "Low Price Point Is Key for Buyers Of Text Databases," *PC Week,* vol. 8, No. 20, May 20, 1991, pp. 120 and 122.
Schroeder, "Multimedia offerings target expanded platform support," *PC Week,* vol. 10, No. 13, Apr. 5, 1993, pp. 59 and 73.
Schwartz, "Dataware Plants CD–ROM Seeds," *Computer Systems News,* No. 403, Feb. 6, 1989, p. 33.
Search Results from Dialog Search for MicroPatent for News Releases and Corporate Announcements Relating to APS, FullText, PatenImages, Espace, Dialog Files: 148, 479 and 648, 1989–1991.
Simon, "ZyImage: A Winning Combination of OCR And Text Indexing," *PC Magazine,* vol. 12, No. 6, Mar. 30, 1993, p. 56.
Simpson, *Mastering WordPerfect 5.1 & 5.2 for Windows,* p. 58, Jan. 1993.
Somers, "Personal Text–Retrieval Software Works with Calera's WordScan," *PC Magazine,* vol. 14, No. 2, Jan. 24, 1995, p. 68.
Spencer, "Tijuana data entry shop logs 500K forms/day," *ImagingWorld,* vol. 4, Issue 4, Apr. 1995.
Spitzer, "Needles in Document Haystacks" *DBMS,* vol. 9, No. 1, Jan., 1996, pp. 84–87.
Sullivan, "Dataware's CD Author System To Boast Hypertext Capability," *PC Week,* vol. 8, No. 31, Aug. 5, 1991, pp. 31–32.
"Text Retrieval Products & Services," TextWare Corporation, Copyright 1996.
"TextWare: Instant Information Access," TextWare Corporation, Copyright 1995.
"TextWare Pricing," TextWare Corporation, Effective Mar. 26, 1996.
Thompson et al., *Full Write Professional—A User's Guide,* pp. 99–122, 1988.
Torgan, "ZyImage: Document Imaging and Retrieval System," *PC Magazine,* vol. 12, No. 3, Feb. 9, 1993, p. 62.
"Toshiba America Information Systems: CD–ROM Customer Profile," Dataware Technologies, Copyright 1995.
"Total Recall," Dataware Technologies, Copyright 1995.
Tredennick, Jr., C., "Full–Text Search and Retrieval Winning Big With Computers," *Law Practice Management,* vol. 19, No. 8, Nov./Dec., 1993.
Tribute, "Searching CeBit for publishing products; Power Mac draws the crowds at Hannover show," *Seybold Report on Publishing Systems,* vol. 23, No. 15, Apr. 22, 1994, pp. 5–8.
Ueda, H., et al., "An Interactive Natural–Motion–Picture Dedicated Multi–Media Authoring System," Mar., 1991, pp. 343–350.
*Understanding OCR,* OmniPage Professional Windows Version 5, Caere Corporation, Chapter 6, pp. 6–1 to 6–8 and Glossary pp. 1–8, 1988–1993.
"Voyager cd–roms," Voyager, Spring, 1996.
"Voyager: cd–rom catalog," Voyager, 1996–1997.
Wiggins, R.W., *Networked Hypermedia: The World–Wide Web and NCSA Mosaic, The Internet for Everyone—A Guide for Users and Providers,* Chapter 13, pp. 245–290, McGraw–Hill, Inc., 1995.
"WorldView V. 1.1 and WorldView Press V. 1.0.2," Software Product Specification, Computer Select, Nov. 1993.
Young, "UK Police Put Criminals On–Line With New National Computer," *Imaging Magazine,* Aug. 1995.
"ZyImage," ZyLab International, Inc., Copyright 1996.
"ZyImage: Common Questions Asked About ZyImage," ZyLab Europe BV, Copyright 1996.
"ZyImage Web Server," ZyLab Europe, BV, Copyright 1996.
*ZyIndex Developer's Toolkit Version 5.0 for Windows,* Programmers Guide, Information Dimensions, 1992.
"ZyIndex Developer's Toolkit for Windows, Version 5.0, Programmer's Guide," ZyLab, Copyright 1992, pp. 1–35.
"ZyIndex for Windows User's Guide," ZyLab Division, Copyright 1992, pp. 1–262.
"ZyLab: The Full Text Retrieval & Publishing Experts," ZyLab Europe BV, Copyright 1996.
"ZyLab retrieval engine optimized for CD–ROM; ZyLab, Progressive Technologies merge," *Seybold Report on Desktop Publishing,* vol. 8, No. 10, Jun. 6, 1994, p. 40.
Ishii, H. "TeamWorkStation: Towards a seamless shared workspace", *Proceedings of CSCW '90,* Oct. 1990, pp. 13–26.
Canzil, G. et al., "SDDS: Scientific Document Delivery System", *TEX for Scientific Documentation,* ed. By D. Lucarella, pp. 15–25, (1985).
Cefriel, S. P. et al., "ALIVE: A distributed live–link documentation", *Electronic Publishing,* vol. 5(3), pp. 131–142, (Sep. 1992).

Chamberlain, D.D. et al., "JANUS: An interactive document formatter based on declarative tags", *IBM Systems Journal,* vol. 21, No. 3, pp. 250–271, (1982).

Croft, W. Bruce, et al., "A Loosely–Coupled Integration of a Text Retrieval System and an Object–Oriented Database System", *15th Annual International SIGIR '92,* pp. 223–232.

Dengel, Andreas et al., "From Paper to Office Document Representation", *Computer,* Jul. 1992, pp. 63–67.

Ferguson, Michael J., "TEX is Multilingual", *1988 Conference Proceedings of the TEX Users Group,* pp. 179–187.

*Using FrameMaker: FrameMaker 4 X/Motif Version,* pp. 27–1 thru 27–30, Copyright 1986–1993 Frame Technology Corporation.

Furuta, Richard, "Important papers in the history of document preparation systems: basic sources", *Electronic Publishing,* vol. 5(1), pp. 19–44, (Mar. 1992).

Haan, Bernard J. et al., "IRIS: Hypermedia Services", *Communications of the ACM,* vol. 35, No. 1, pp. 36 and 38–51, (Jan. 1992).

Kahn, Paul, "Linking Together Books: Experimental in Adapting Published Material into Intermedia Documents", *Hypermedia,* vol. 1, No. 2, pp. 111–145, (1989).

Knuth, Donald E., *The TEXbook,* Addison–Wesley Publishing Company, 1986.

Knuth, Donald E. and Michael F. Plass, "Breaking Paragraphs into Lines", *Software–Practice and Experience,* vol. 11, pp. 1119–1184, (1981).

Koons, W. Randall et al., "The Computer Sciences Electronic Magazine: Translating From Paper To Multimedia", CHI '92 Conference Proceedings, pp. 11–18, (May 3–7, 1992).

Lesk, Michael, "The Core Electronic Chemistry Library", *SIGIR '91 Proceedings of the Fourteenth Annual International ACM/SIGR Conference on Research and Development in Information Retrieval,* 93–112, (Oct. 13–16, 1991).

Meyrowitz, Norman, "Intermedia: The Architecture and Construction of an Object–Oriented Hypermedia System and Application Framework", *OOPSLA '86 Proceedings,* pp. 186–201, (Sep. 1996).

Miyazawa, M. et al., "An Electronic Book: APTBook" *Proceedings of the IFIP TC 13 Third International Conference on Human–Computer Interaction,* pp. 513–519, (1990).

Myers, Brad A., "Text Formating By Demonstration", *Human factors in Computing Systems: Reaching Through Technology, CHI '91 Conference Proceedings,* pp. 251–256, (1991).

Nelson, Theodor H., "Replacing the Printed Word: A Complete Literary System", *Information Processing 80: Proceedings of IFIP Congress 80,* pp. 1013–1021, (1980).

Raymond, Darrell R. and Frank Wm. Tompa, "Hypertext and the Oxford English Dictionary", *Communications of the ACM,* vol. 31, No. 7, pp. 871–879, (Jul. 1988).

Rubinstein, Richard, *Digital Typography: An Introduction to Type and Composition for Computer System Design,* pp. 195–233, (Addison–Wesley Publishing Company 1988).

Savoy, Jacques, "The electronic book Ebook3", *International Journal of Man–machine Studies,* vol. 30, pp. 505–523, (1989).

Story, Guy A., "The RightPages Image–Based Electronic Library for Alerting and Browsing", *Computer,* pp. 17–25, (Sep. 1992).

*Text Search and Retrieval Reference Manual for the Automated Patent System,* by the U.S. Department of Commerce and the U.S. Patent and Trademark Office, Section 4, pp. 1–6, (Oct. 1992).

Yankelovich, N. et al., "Reading and Writing the Electronic Book", *Computer,* pp. 15–29, (Oct. 1985).

Yankelovich, N. et al., "Intermedia: The Concept and the Construction of a Seamless Information Environment", *Computer,* pp. 81–96, (Jan. 1988).

* cited by examiner

SYSTEM, METHOD AND COMPUTER PROGRAM PRODUCT FOR MEDIATING NOTES AND NOTE SUB-NOTES LINKED OR OTHERWISE ASSOCIATED WITH STORED OR NETWORKED WEB PAGES

CROSS-REFERENCE TO OTHER APPLICATIONS

This application claims the benefit under 35 U.S.C. § 119(e) of U.S. Provisional Application No. 60/139,376, filed Jun. 16, 1999, which is incorporated by reference herein in its entirety.

This is a continuation-in-part application of the application entitled "System, Method, and Computer Program Product for Creating Sub-notes Linked to Portions of Data Objects After Entering an Annotation Mode," by Rivette et al., application Ser. No. 09/057,557; filed Apr. 9, 1998, now U.S. Pat. No. 6,389,434, incorporated herein by reference in its entirety.

This is a continuation-in-part application of the application entitled "System, Method, and Computer Program Product for Generating Documents Using Pagination Information (As Amended)" by Rivette et al., application Ser. No. 09/057,644; filed Apr. 9, 1998, now U.S. Pat. No. 6,018,749, incorporated herein by reference in its entirety.

This patent application is related to U.S. Pat. No. 5,950,214, entitled "System, Method, and Computer Program Product for Accessing a Note Database Having Sub-note Information for the Purpose of Manipulating Sub-notes Linked to Portions of Documents," by Rivette et al., issued from application Ser. No. 09/058,275, filed Apr. 10, 1998, incorporated herein by reference in its entirety.

This patent application is also related to the U.S. Pat. No. 5,623,681, entitled "Method and Apparatus for Synchronizing, Displaying and Manipulating Text and Image Documents," issued from Appl. No. 08/155,752, filed Nov. 19, 1993, incorporated herein by reference in its entirety.

This patent application is also related to the U.S. Pat. No. 5,806,079, entitled "System, Method, and Computer Program Product for Using Intelligent Notes to Organize, Link, and Manipulate Disparate Data Objects," issued from application Ser. No. 08/632,801, filed Apr. 17, 1996, incorporated herein by reference in its entirety.

This patent application is also related to the U.S. Pat. No. 5,845,301, entitled "System, Method, and Computer Program Product for Displaying and Processing Notes Containing Note Segments Linked to Portions of Documents," issued from application Ser. No. 08/647,230, filed May 9, 1996, incorporated herein by reference in its entirety.

This patent application is also related to the U.S. Pat. No. 5,809,318, entitled "Method and Apparatus for Synchronizing, Displaying and Manipulating Text and Image Documents," issued from application Ser. No. 08/832,971, filed Apr. 4, 1997, incorporated herein by reference in its entirety.

This patent application is also related to the application entitled "Intellectual Property Asset Manager (IPAM) for Context Processing of Data Objects," by Rivette et al., application Ser. No. 09/260,079, filed Mar. 2, 1999, pending, incorporated herein by reference in its entirety.

BACKGROUND OF THE INVENTION

1. Field of the Invention

Generally speaking, the present invention is directed to a system, method, and computer program product of linking notes to data objects. In a preferred embodiment, the present invention is directed to a system, method, and computer program product of linking notes to Web pages.

2. Related Art

The importance to the modern economy of rapid information and data exchange cannot be understated. This explains the exponentially increasing popularity of the Internet. The Internet is a world-wide set of interconnected computer networks that can be used to access a growing amount and variety of information electronically.

One method of accessing information on the Internet is known as the World Wide Web (www, or the "Web"). The Web is a distributed, hypermedia system, and functions as a client-server based information presentation system Information that is intended to be accessible over the Web is stored in the form of "pages" on general-purpose computers known as "servers." Computer users can access a Web page using general-purpose computers, referred to as "clients," by specifying the uniform resource locator (URL) of the page.

Hyperlinks are a common function of the Internet. A hyperlink is an element in an electronic document that links to another place in the same document or to an entirely different document. Typically, you click on the hyperlink to follow the link. Hyperlinks are one of the most essential ingredients of all hypertext systems, including the Web. As a publishing tool, hyperlinks enable the publisher to define the direction, location, flow and content of the user's path over the Internet. These single direction hyperlinks are part of published content that the user cannot change or comment on. In the Web environment, HyperText Markup Language (HTML) is the authoring language used to create documents or pages accessible on the Web.

In today's Computer Age, there exists a vast amount of information accessible over the Internet that can be processed by computers. Such information is generally referred to herein as data objects, and more specifically referred to herein as HTML documents or Web pages.

It is often desirable to organize information such that data objects that somehow relate to a particular topic are associated with other data objects that are related to the same topic. Hyperlinks represent a conventional mechanism for associating data objects with other data objects. FIG. 1 illustrates a scenario involving Documents A, B, C, D, and E. Document A is linked to Document B via Hyperlink B. In a similar manner, Document B is linked to Documents C and D, and Document D is linked to Document E. A user follows Hyperlinks B, C, D, and E to traverse through Documents A, B, C, D, and E using a conventional "point-and-click" methodology.

As apparent from FIG. 1, Hyperlinks B, C, D, and E form a trail through Documents A, B, C, D, and E. This trail represents the organization of Documents A, B, C, D, and E. However, Hyperlinks B, C, D, and E do not document or explain this trail. Accordingly, it can be said that Hyperlinks B, C, D, and E form an undocumented trail through Documents A, B, C, D, and E.

Consider, for example, Hyperlink B. Hyperlink B merely serves to link Document A to Document B. Hyperlink B does not describe why Document A is linked to Document B. Instead, the explanation or rationale for the linkage of Document A with Document B must be inferred by the user from the contents of Documents A and B.

However, it is often difficult to discern the rationale for the linkage between data objects. This is especially true for data objects which are not directly linked (Documents A and B represent two data objects that are directly linked), but which are indirectly linked (Documents A and E represent two data objects that are indirectly linked). For example, it may be very difficult for a user to determine the rationale for the indirect linkage of Document E to Document A. To discern the rationale for this linkage, it may be necessary for the user to review the contents of Documents A, B. D, and E. This could be a difficult and time-consuming task. Even then, the user may not be able to determine the rationale for the linkage. The user is unable to discern this rationale by reference to Hyperlinks B, D, and/or E since, as discussed above, these hyperlinks do not convey any information to the user.

In addition, a user will not know of the existence of Document E when following traditional links from Document A until he/she gets to Document E. This link (from Document A to Document E) may be the only link of interest to the user. The traditional linking mechanism is wasteful, as it requires the user to traverse through Documents B and D in order to arrive at Document E. Also, the user may end the search at Document B or Document D, thereby never getting to Document E. Further, traditional linking mechanisms do not provide a means by which to create links, with contextual information within and between different data objects. This type of linkage would provide the user with critical information as to how and why data objects are internally and externally related. Also, traditional links fail to provide the user with the ability to link the same portion of a data object with multiple links and notes to other data objects as well as to other portions of the same data object with varying contextual information on the rational for the links and user ideas or comments on the portion of the linked data object. Accordingly, there is a need for a mechanism that not only organizes, associates, and links data objects internally and externally, but also conveys contextual information explaining the rationale for such organization, association, and linkage, as well as the users' thoughts regarding the data objects.

Adding Notes to Data Objects

It is often desirable to add notes to data objects. Such notes may include a description of the contents of the data objects, instructions or comments to people working with the data objects, project notes, etc.

Some computer applications allow users to attach notes to data objects. For example, some word processors (such as MICROSOFT WORD and WORD PERFECT) allow users to attach notes to their documents. Typically, the user positions the cursor at the point in the document where he wishes to insert the note. The user then keys in the text for the note. The note is linked to the point in the document where the cursor was positioned.

Some spreadsheet applications (such as MICROSOFT EXCEL) allow users to attach notes to their spreadsheets. FIG. 2 illustrates an example spreadsheet window 204. The user has attached a note 212 to cell 206 of the spreadsheet 204 via a link 210. A small icon 208 located in cell 206 indicates that a note (in this case, note 212) is linked to cell 206. The user accesses the note 212 from the spreadsheet 204 by clicking on the icon 208.

The note functionality of conventional computer applications (including those described above) is limited in many respects. First, these applications restrict the manner in which users are allowed to associate notes with data objects. For example, these applications permit a note to be associated with only a single element in a data object. See FIG. 2, where note 212 is associated with only cell 206. It is not possible to associate note 212 with multiple cells or to establish intra or inter data object links. Also, notes cannot be associated with partial overlapping portions of data objects. For example, the spreadsheet 204 in FIG. 2 does not allow a first note to be associated with cells 206 and 214, and a second note to be associated with cells 214 and 216.

Second, these applications do not allow users to group related notes together. Accordingly, these applications do not permit users to organize their notes.

Third, these applications do not provide a mechanism for documenting the rationale for linking notes to data objects. For example, in FIG. 2, the link 210 conveys no information that explains the rationale for linking note 212 with cell 206. Instead, the user must attempt to discern this rationale from the contents of note 212 and cell 206.

Fourth, these applications do not provide a mechanism for establishing intra or inter data object linking, such as between different spreadsheets in EXCEL or linking with a word processor data object or another computer application data object.

The restrictions described above severely diminish the usefulness of notes. Notes are intended to convey information. The ability of notes to convey information is diminished if notes cannot be associated with any portions of data objects, and if notes cannot be organized and structured, and if the rationale for linking notes to data objects is not explicitly conveyed to users.

Accordingly, there is a need for a more flexible and intelligent mechanism for attaching notes to data objects.

Potential Loss of Information

Given these limitations of conventional data organization and note tools, users are not motivated or encouraged to utilize computer related tools to organize work product and data objects that are collected and generated during the performance of a task or project. Instead, such work product and data objects are often maintained in an unorganized state, often scattered about a person's office or haphazardly stored in a makeshift filing system. Also, a person's thinking is not typically documented or recorded. Instead, such thinking remains in the person's head.

Thus, a person's thinking, work product, and data objects that are collected and generated during the performance of a task or project are easily lost (either temporarily or permanently) if the person becomes unavailable, is unable to completely remember his thinking, or loses his work product. The person and the person's employer then suffer from this loss of information.

Accordingly, what is required is a system and method for enabling the organization and recordation of a person or group's thinking, work product, and data objects collected or generated during a project or task. Such organization and recordation serves to institutionalize the person or group's thinking, work product, and data objects, thereby protecting against the unavailability of persons, memory loss, or loss of work product.

SUMMARY OF THE INVENTION

Generally speaking, the present invention is directed to a system, method, and computer program product of linking notes to data objects. In a preferred embodiment, the present invention is directed to a system, method, and computer program product of linking annotations (or notes or subnotes in a note) to Web pages. The invention enables a user to select a portion of a Web page stored at a Web site or from a local file system (if the portion of the Web page was cached). The invention creates an annotation, and links the annotation to the selected portion. The invention receives a request from a user viewing the annotation to display the selected portion linked to the annotation. In response to this request, the invention makes a connection to the Web site, if a connection is not already created, and causes the Web site to send the Web page and present the selected portion. Also note that if the portion of the Web page was cached and thus stored in a local file system, then the present invention does not need to make a connection to a Web site.

The present invention also relates to organizing, bi-directionally linking, making annotations (or notes and sub-notes) on, and maintaining disparate Web pages. Bi-directional links as described in this application allow the user to determine the relative location of links on Web page of the Internet or an intranet. Bi-directional links as described in this application also allow the user to select a portion or section of the Web page and then make annotations on the portion of the Web page selected. Bi-directional links as described in this application also link the user to the location of the selected Web page from the note or sub-note about the selected Web page. Once the Web page is placed in annotation mode, the existing bi-directional links appear beside the portion of the Web page selected, beside the annotation (or note/sub-note), and content field of the annotation, and beside the organizational storage of the annotation.

The present invention relates generally to organizing, bi-directionally linking, making annotations (or notes and sub-notes) on, and maintaining disparate Web pages. Specifically, embodiments of the invention relate to a standalone mediator that lets users create, manage, arrange, categorize, search, customize, label, title and otherwise maintain annotations on Web pages available on the Internet without changing or manipulating the location of the Web page.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein:

FIG. 7 is broken into nine(9) figures including FIG. 7A, FIG. 7B, FIG. 7C, FIG. 7D, FIG. 7E, FIG. 7F, FIG. 7G, FIG. 7H and FIG. 7I;

TABLE OF CONTENTS

Figure 1:
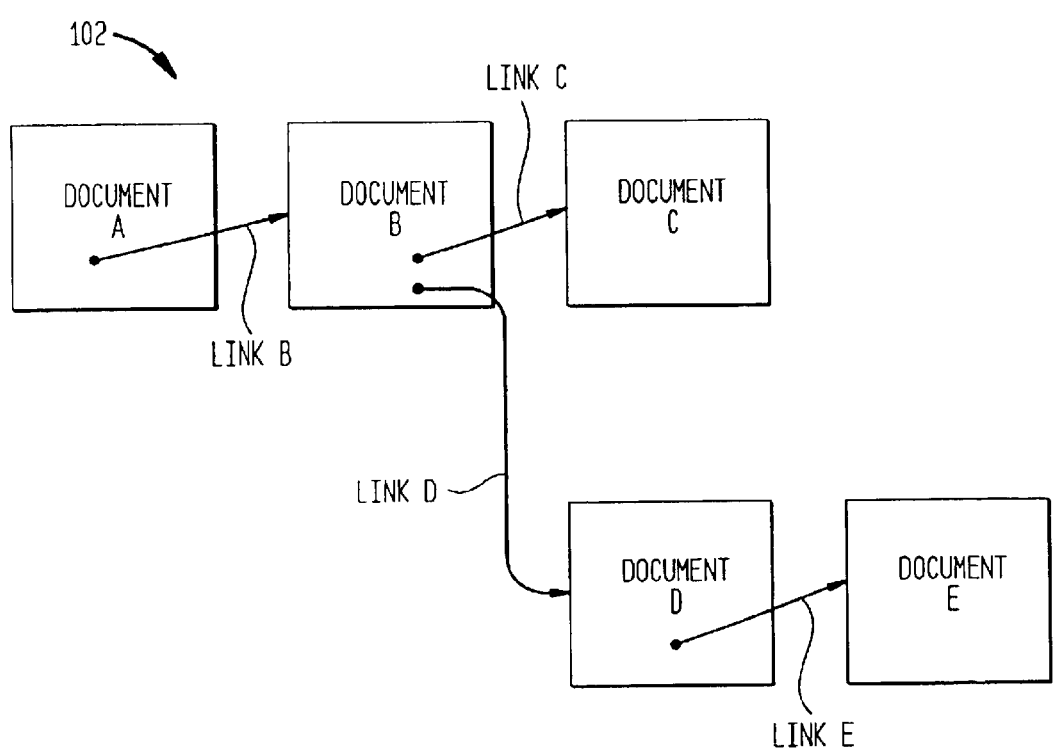
FIG. 1 illustrates a conventional scenario comprising linked documents.
Figure 2:
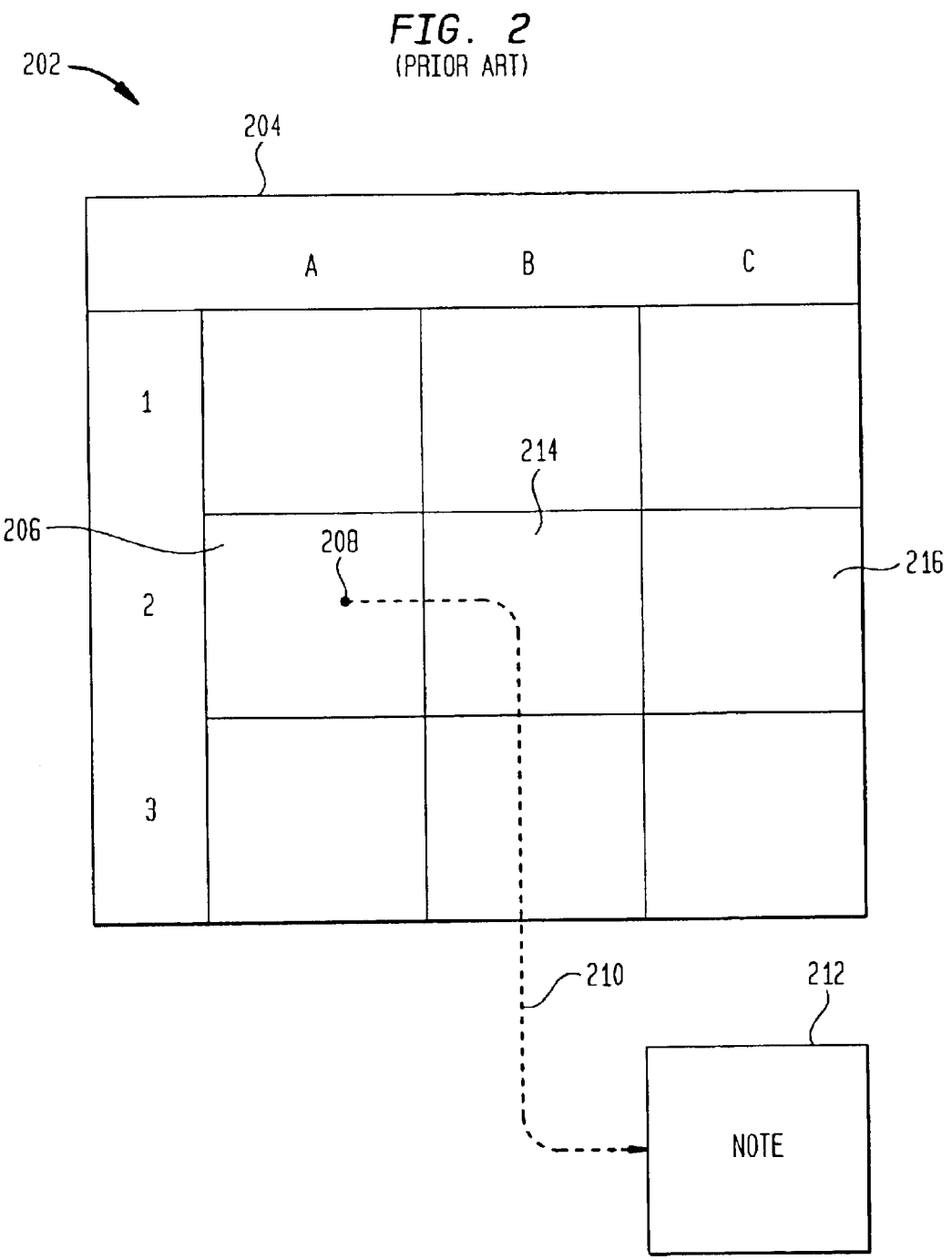
FIG. 2 illustrates a conventional spreadsheet application having limited note capabilities.

1. Overview of the Invention
    1.1 Marketing Expert Example: Business Internet User
    1.2 Chef Example: Casual Internet User
2. Structure of the Present Invention
3. Preferred Implementation of the Present Invention
    3.1 A Preferred Environment
    3.2 A Preferred Software Programming Language and Network Architecture 4. Features and Capabilities of the Present Invention
    4.1 Note/Sub-Note Organization
    4.2 Linking Sub-Notes To Web Pages
    4.3 Examples of Note/Sub-Note Organization and Linking Sub-Notes To Web Pages
    4.4 Viewing Notes, Sub-Notes, and Data Objects
    4.5 Editing Note/Sub-Note Organization
        4.5.1 Modification
        4.5.2 Replication
    4.6 User Interface
    4.7 Security
        4.7.1 Security on Individual Note Groupings, Notes, Sub-notes, Links, and Web pages
        4.7.2 Security on the Note Database as a Whole
    4.8 Search Capabilities
5. Notes Database
6. Operation of the Invention
    6.1 Launch an Application
    6.2 Create a Note/Sub-note (From the File Menu)
    6.3 Create a Note/Sub-note (Using a Pen)
    6.4 View Note (By Selecting a Linking Button in a Web Page)
    6.5 Search a Note
    6.6 E-mail Notes to a Recipient
    6.7 Find Specified Text in the Current Web Page
    6.8 Modify Privacy/Security Settings
    6.9 Edit One or More Notes
    6.10 Show Sub-Notes
    6.11 Toggle Between Notes and Web Pages View
    6.12 Change or View Options
    6.13 Change or View Properties
7. Applications of the Invention
    7.1 Movie Production
    7.2 Bar Review Program
8. Conclusion

DETAILED DESCRIPTION OF THE PREFERRED EMBODIMENTS

1. Overview of the Invention

The present invention is directed to a system, method, and computer program product (CPP) for attaching annotations (or notes and sub-notes) to data objects, and for linking data objects via the use of annotations. In a preferred embodiment, data objects are Web pages. The note capabilities of the present invention can be used to organize, associate, annotate, and link data objects in an intra and/or inter data object environment with single notes and multiple sub-notes and/or multiple notes and sub-notes to the same data object portions or different data object portions as required by the needs of the user to institutionalize his/her knowledge. Additionally, the note capabilities of the present invention can be used to convey information explaining the rationale for such organization, association, and linkage. Accordingly, the present invention represents a system, method, and CPP for using intelligent notes to organize, associate, annotate, and link data objects. The invention can also be used to manipulate these data objects.

As used herein, the term "data object" refers to any information in any form that can be accessed and/or processed by a computer. Such information includes data generated and/or processed by computer applications and computer-related devices such as word processing applications, spreadsheet applications, presentation managers, database managers, financial applications, networking applications, communication applications, sound recorders and processors, video recorders and processors, on-line service applications, scanners, computer aided drafting (CAD) applications, virtual reality applications and environments, etc. The data objects generated and processed by these applications and devices vary widely in subject matter. Also, these data objects come in many forms, such as text files, image files, video files, audio files, computer programs, Web pages, etc. Accordingly, these data objects are disparate in both form and content.

The invention is adapted to memorialize and/or institutionalize a person's or group's thinking and work product regarding a subject. If a person's or group's thinking and work product are not memorialized or institutionalized, then such thinking and work product may be lost or not accessible when needed if the person or group becomes unavailable, or is unable to remember its thinking, or loses its work product.

The present invention relates generally to organizing, bi-directionally linking, making notes and sub-notes on, and maintaining disparate data objects. A preferred embodiment of the present invention relates to organizing, bi-directionally linking, making notes and sub-notes on, and maintaining disparate Web pages. Specifically, embodiments of the invention relate to a standalone mediator that lets users create, manage, arrange, categorize, search, customize, label, title and otherwise maintain notes on Web pages available on the Internet without changing or manipulating the location of the Web page.

1.1 Marketing Expert Example: Business Internet User

Figure 3:
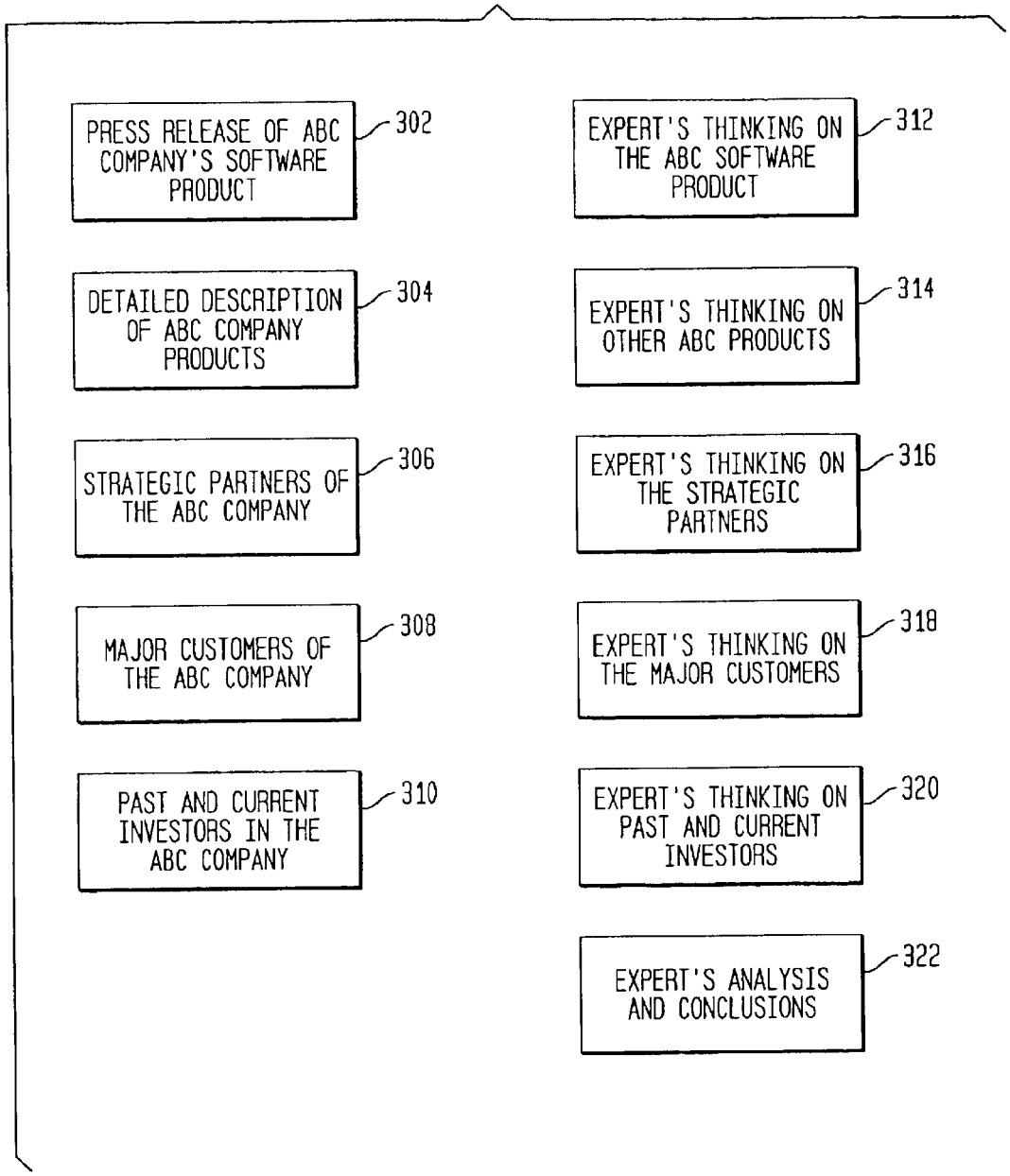
FIGS. 3 and 4 illustrate a marketing related example.

The invention shall initially be described by way of several examples. Consider a scenario where a marketing expert regularly uses the Internet for research to determine if there are products that may compete with his company's software product. Referring to FIG. 3, the marketing expert first discovers company ABC's Web site that contains a Web page 302 containing a press release detailing the launch of a new ABC software product. The marketing expert notices that the ABC software product appears to directly compete with his company's software product. The marketing expert may or may not record his thinking 312.

The expert then notices links to other Web pages that provide interesting information including, a more detailed explanation on all ABC products, strategic partners to ABC, major customers of ABC, and entities that have invested in ABC. It is important to note that these Web pages could be either located on the same Web site as Web page 302, or be located on a different Web site.

The expert first clicks on the link to a Web page 304 describing ABC products in more detail. The expert notes some additional products that may also compete with his company's software product. The expert may or may not record his thinking 314.

The expert next requests a Web page 306 discussing the strategic partners of ABC. The expert recalls that one of the strategic partners listed is currently talking to his company about a joint venture. The expert may or may not record his thinking 316.

Next, the expert requests a Web page 308 that contains information relating to ABC's major customers. The expert notes some of the same customers of his company, along with some potential customers. The expert may or may not record his thinking 318.

Finally, the expert requests a Web page 310 that has information relevant to ABC's past and current investors.

The expert recalls that one of the investors listed has recently declined an offer to invest in his company. The expert may or may not record his thinking 320. The expert's overall analysis and conclusions involving the ABC company may or may not be recorded 322.

The scenario described above and shown in FIG. 3 represents a conventional investigation, analysis and decision process. This conventional process may or may not be documented. In particular, the marketing expert's thinking during each step of the process may or may not be documented. Such thinking is represented by blocks 312, 314, 316, 318, 320, and 322. The expert may document such thinking (by writing or dictating notes, for example). However, the expert is just as likely to maintain his thinking only in his head. In this latter case, the expert's thinking will be lost or not accessible when needed if the expert becomes unavailable, or is unable to remember his thinking.

The investigation, analysis, and decision process represented by FIG. 3 will not be fully documented, even if the expert documents his thinking in blocks 312, 314, 316, 318, 320, and 322. In other words, the total work product and thinking resulting from the investigation, analysis, and decision process of FIG. 3 will not be fully documented simply by the documentation of thinking blocks 312, 314, 316, 318, 320, and 322. This is the case for at least two reasons. First, such documentation will be very disorganized. The documentation will not indicate how one note is related to another note. Second, such documentation will include only the expert's thinking (represented by blocks 312, 314, 316, 318, 320, and 322). The documentation will not include copies of the Web pages upon which such thinking was based or a reference to the exact portion (text excerpt, video section, audio segment, etc.) that is relevant to the expert's thinking and analysis. In instances with voluminous Web pages, the lack of this type of reference or the like prevents the expert from clearly communicating and recording the basis for the analysis. That is, the documentation will not include the Web pages relating to press release 302, the detailed description of ABC company products 304, the strategic partners 306, the major customers 308, and the past and current investors 310. The documentation may contain cites to some of these Web pages, but it would be necessary for a person to manually retrieve these Web pages in order to evaluate them. Such manual retrieval is inefficient, as it requires another person to perform the same tasks as the expert. Also, such manual retrieval may not be possible, since particular Web sites and/or Web pages often become unavailable over time. Further, as noted above, such cites will not be to the exact portion (text excerpt, video section, audio segment, etc.) that is relevant to the expert's thinking and analysis.

The invention addresses and solves the problems illustrated by the conventional investigation, analysis, and decision process of FIG. 3. The invention is adapted to memorialize and/or institutionalize the expert's total work product and thinking related to the investigation, analysis, and decision process. By doing so, the invention ensures that the expert's total work product and thinking will survive and be accessible when needed, even if the expert becomes unavailable, or is unable to remember his thinking, or loses the hard copies of his work product.

Figure 4:
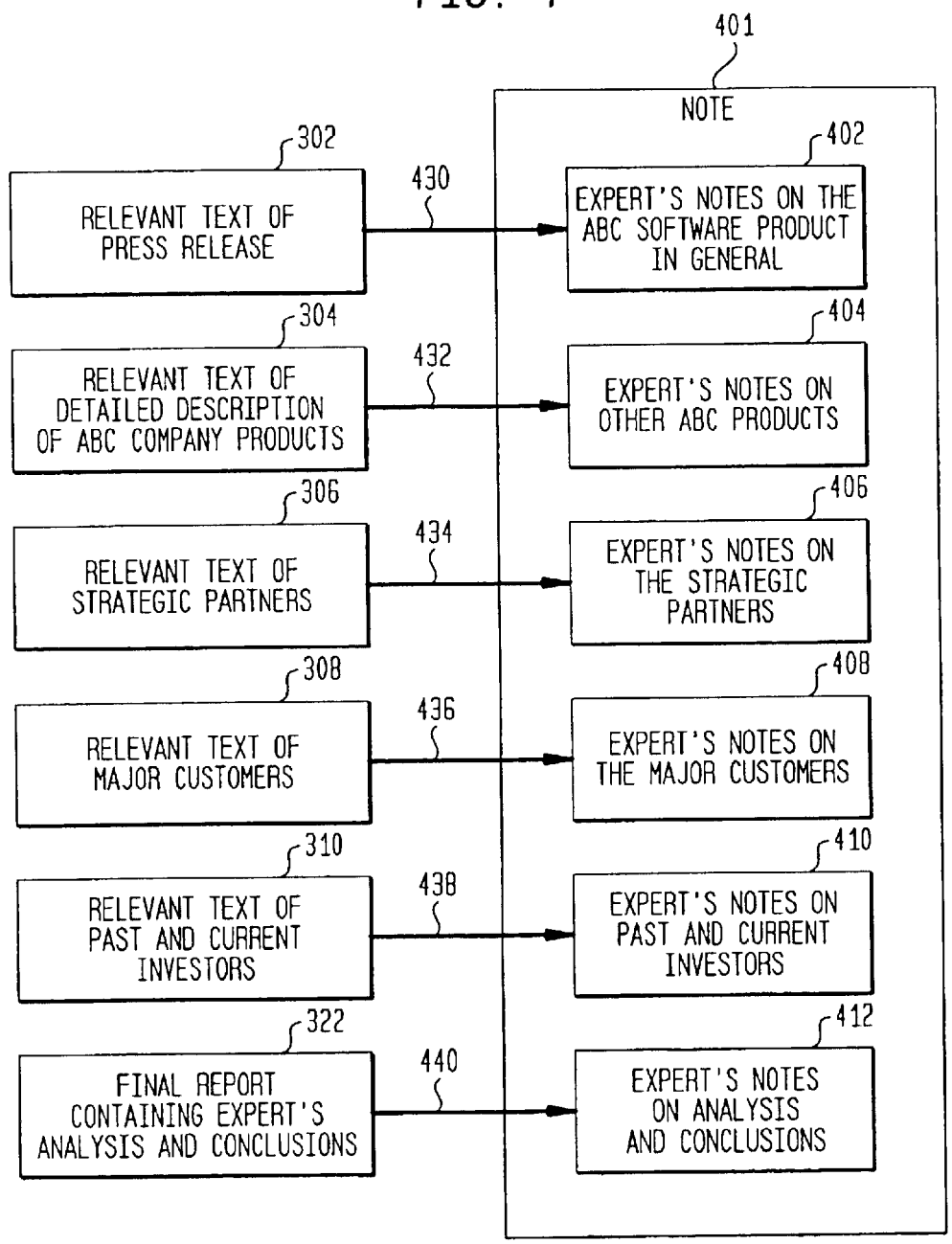

The operation of the invention is represented by FIG. 4. The invention allows the expert to create a note 401 comprising multiple sub-notes 402, 404, 406, 408, 410, and 412. The expert records his thinking in these sub-notes 402, 404, 406, 408, 410, and 412. For example, according to the present invention, the expert reviews the press release 302 and notices that the ABC software product appears to be very similar to his company's software product. The expert records his thinking regarding the press release 302 and the potential competition between the ABC software product and the expert's company product sub-note 402.

The sub-notes 402, 404, 406, 408, 410, and 412 are linked to the relevant portions of the Web pages upon which the expert's thinking is based. Such linkage is represented by links 430, 432, 434, 436, 438, and 440. For example, the expert links sub-note 402 to the relevant portion of the press release 302. As another example, recall that the expert looks at ABC's other products 304 to see if what other competing products may exist. The expert records his thinking regarding the other products in 404. The expert links sub-note 404 to that relevant portion of the ABC's other products 304 containing the competitive products. By linking sub-note 404 to only the relevant portion of the ABC's other products 304 pertinent to the expert's thinking recorded in sub-note 404, the expert creates a documented trail that is more useful and effective at communicating his work product and thinking.

The sub-notes 402, 404, 406, 408, 410, and 412 and the links 430, 432, 434, 436, 438, and 440 collectively represent the expert's total work product and thinking. The sub-notes 402, 404, 406, 408, 410, and 412 and the links 430, 432, 434, 436, 438, and 440 are stored in a computer database. Thus, the invention memorializes and/or institutionalizes the expert's total work product and thinking.

As will be described below in more detail, the marketing expert can categorize the notes he makes on the Web site(s) by color and by the shape of the bi-directional hyperlink he associates with the part of the Web page he has selected. The expert stores these notes on his own computer and the Web site is left unmarred. At a later time, the expert can revise the content of the notes and then decides which company strategist should receive which copies of the notes and Web pages. The notes he has made on the Web site can be shared in their entirety, by note (a collection of sub-notes), by type (based on a pre-set or user-defined filter), or by sub-note. For example, the expert may decide to send a copy of the notes on strategic partners 406 to his Vice-President of Marketing, a copy of the notes on major customers 408 to his Vice President of Sales, and a copy of the notes on past and current investors 410 to his CEO. He also informs his marketing department that he has stored all of his notes on a public directory for all of the members of the marketing department to read and further develop. The present invention allows the marketing expert to remark on any location on the Internet and choose the people he would like to securely view his notes.

As described in more detail below, the present invention notifies the marketing expert when the Web page has changed in one or both of the following ways. The marketing expert can be notified that the Web page changes its content when the user is notified by e-mail of a change in the data object. The marketing expert can be notified that the Web page has changed its content when he activates a bi-directional link intended to take him from his note or sub-note to the Web page, and the marketing expert will have the option of re-linking his notes to locations on the changed Web page.

1.2 Chef Example: Casual Internet User

A more casual use of the present invention is described next. Consider a scenario where a chef who casually uses the Internet to find recipes receives an email from a customer to look at a particular URL that has an excellent recipe for Creme Brulee. Ordinarily the chef would visit the site, see the information, and perhaps try the recipe. Using the present invention the e-mail from the customer would contain an attachment for viewing the customers note's on the URL. If the chef did not have the current invention on his computer, activating the attachment would give him the option of automatically navigating to a Web site where he can download the application. Also included in the email would be a URL the chef could simply click on to get to the location where he can download the application.

Once the attachment is activated and the present invention's application executes, the Web page of the recipe of interest to the chef appears with all of the customer's notes listed and color-coded. One color for tips about equipment, one color for tricks about making the recipe more successful, and one color for missing steps in the recipe's procedure.

The chef uses this information and tries the recipe. He adds several more tips about equipment and adds a new color for a new category of notes titled Customer Feedback. He then uses the present invention to send this new set of notes to several other chefs and to the customer who sent the original notes. Now all the people that receive the e-mail can view the same URL and the same set of notes and make notes of their own. Some they can store locally, others they can store on a network, and of both sets of notes they can choose which ones or which set of notes to send to others. They may choose to send a single sub-note, several sub-notes, or a full note containing any number of combinations of additional notes and sub-notes.

Figure 5:
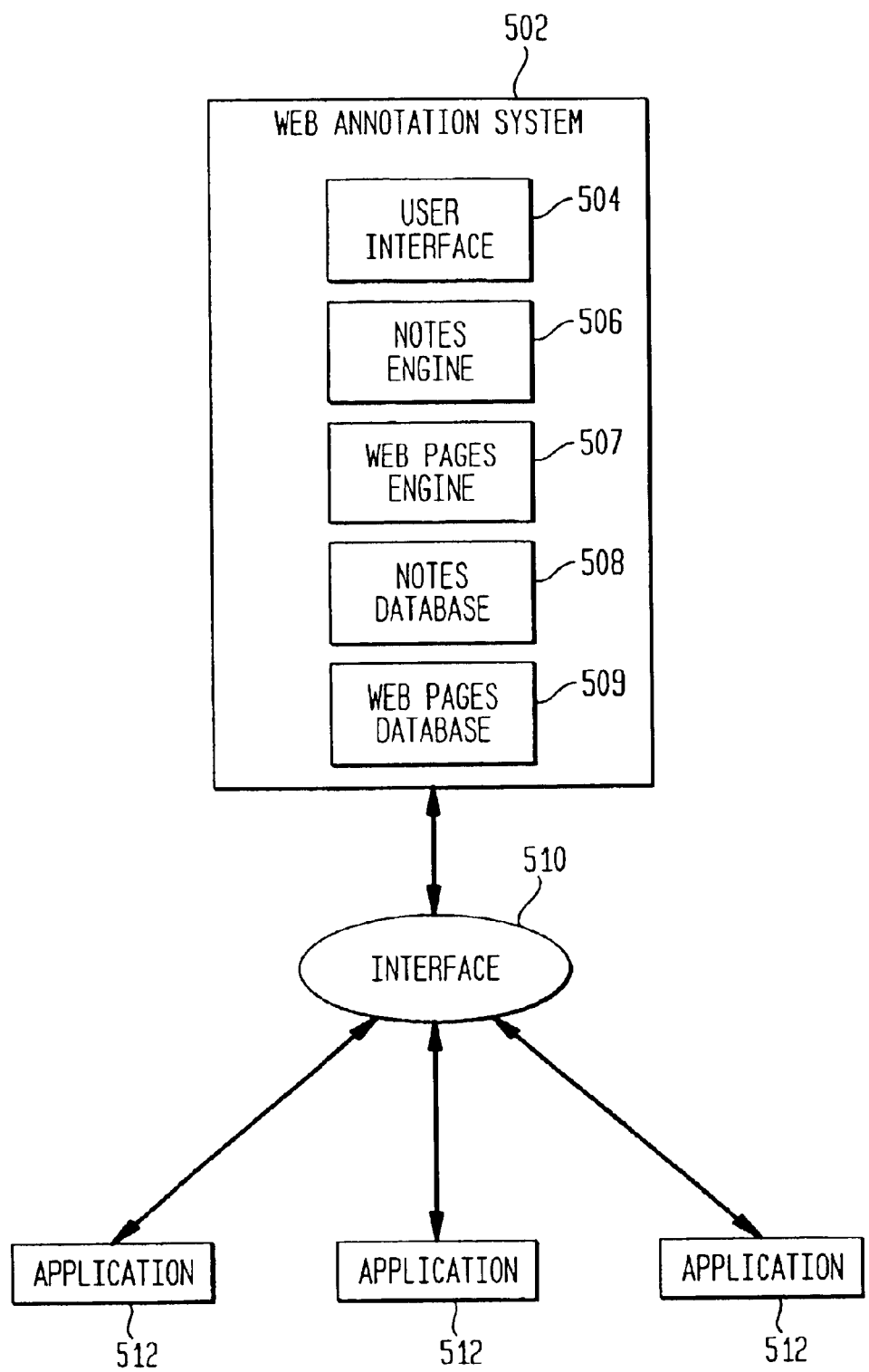
FIG. 5 is a block diagram of a Web annotation system according to a preferred embodiment of the present invention.

The chef can save his notes and sub-notes and print them individually or in sets or even related sets based on his own needs. The chef may later receive notes from the people he sent his notes to; he can view those notes on the recipe Web page and include the notes sent to him in his own collection of notes and sub-notes. The invention is preferable implemented using a Web annotation system 502 (FIG. 5). The Web annotation system 502 is described in the following section.

2. Structure of the Present Invention

FIG. 5 is a block diagram of a Web annotation system 502 according to a preferred embodiment of the present invention. The Web annotation system 502 includes a user interface 504, a notes engine 506, a Web pages engine 509, a notes database 508, and a Web pages database 509. The notes database 508 includes annotations (also called notes and sub-notes or note sections) that are attached to Web pages generated and/or processed by applications 512. The Web pages database 509 may be used to store Web pages, or a Web page's images or its text, that are associated with notes stored in notes database 508 for greater speed in re-loading the data objects when the user returns to the note or sub-note on the Web page. The applications 512 include any computer applications that generate and/or process information accessible via the Internet.

The notes engine 506 manages the notes database 508. More particularly, the notes engine 506 enables users to create, modify, delete, link, view, create hierarchies of annotations (or notes and sub-notes), categorize, classify, view the location or address of the selected Web page, view the name or title of the selected Web page, re-link notes to changed Web pages, and otherwise manipulate the notes and sub-notes in the notes database 508. Users gain access to the functions supported by the notes engine 506 via the user interface 504.

The Web pages engine 507 manages the Web pages database 509. More particularly, the Web pages engine 507 enables users to cache or store, or otherwise maintain, Web pages and parts of Web pages stored in Web pages database 509 for greater speed in re-loading the Web page when the user returns to the note or sub-note on the Web page. The caching feature of the present invention means that the present invention does not need to make a connection to a Web site. Users gain access to the functions supported by the Web pages engine 507 via the user interface 504.

In performing its function, the Web annotation system 502 drives, controls, manipulates, and otherwise interacts with the applications 512. For example, the Web annotation system 502 controls the applications 512 so as to open Web pages (i.e., access Web sites containing Web pages), display particular portions of Web pages, highlight portions of Web pages using particular fonts, patterns, and/or colors, display icons and/or buttons, etc.

Preferably, the present invention achieves this functionality by interacting with applications 512 that support an interface 510 defining the interaction between computer applications. In one embodiment of the present invention, the interface 510 uses the Object Linking Embedded (OLE) standard. The OLE standard is well known and defines the manner in which one software application may drive, control, manipulate, and otherwise interact with another software application. The OLE standard is described in many publicly available documents, such as Microsoft OLE Programmers Reference, Volumes I and II, 1993, which are herein incorporated by reference in their entirety. The OLE standard is based on the Component Object Model (COM). The COM enables programmer to develop objects that can be accessed by any COM-compliant application.

In a preferred embodiment of the present invention, the interface 510 uses JScript and Dynamic HTML (DHTML) standards. Both of these standards are also based on the COM, as the OLE standard discussed above. JScript is Microsoft's extended implementation of ECMAScript (ECMA262), an international standard based on the Netscape's JavaScript and Microsoft's JScript languages. JScript is implemented as a Windows Script engine. This means that it can be "plugged in" to any application that supports Windows Script, such as Internet Explorer, Active Server Pages, and Window Script Host. It also means that any application supporting Windows Script can use multiple languages, including JScript, VBScript, Perl, and others. JScript can be used for both simple tasks (such as mouseovers on Web pages) and for more complex tasks (such as updating a database with ASP or running logon scripts for Windows NT).

In general, dynamic HTML refers to Web content that changes each time it is viewed. For example, the same URL could result in a different page depending on any number of parameters, such as: geographic location of the user, time of day, previous pages viewed by the user, and profile of the user. DHTML refers to new HTML extensions that will enable a Web page to react to user input without sending requests to the Web server.

It should be understood that the invention is not limited to use with OLE, JScript, or DHTML components. The applications 512 can be any conventional or implementation specific applications, as long as they have the capability of being externally controlled (in this case, as long as they have the capability of being controlled by the Web annotation system 502).

Standard windows operations are mentioned in this disclosure. Such operations include selecting text, opening files, moving between windows, resizing windows, editing documents, etc. Such operations are well known and are described in many publicly available documents, such as Microsoft Word for Windows Users Guide, 1994, incorporated herein by reference in its entirety.

3. Preferred Implementation of the Present Invention

3.1. A Preferred Environment

Figure 6:
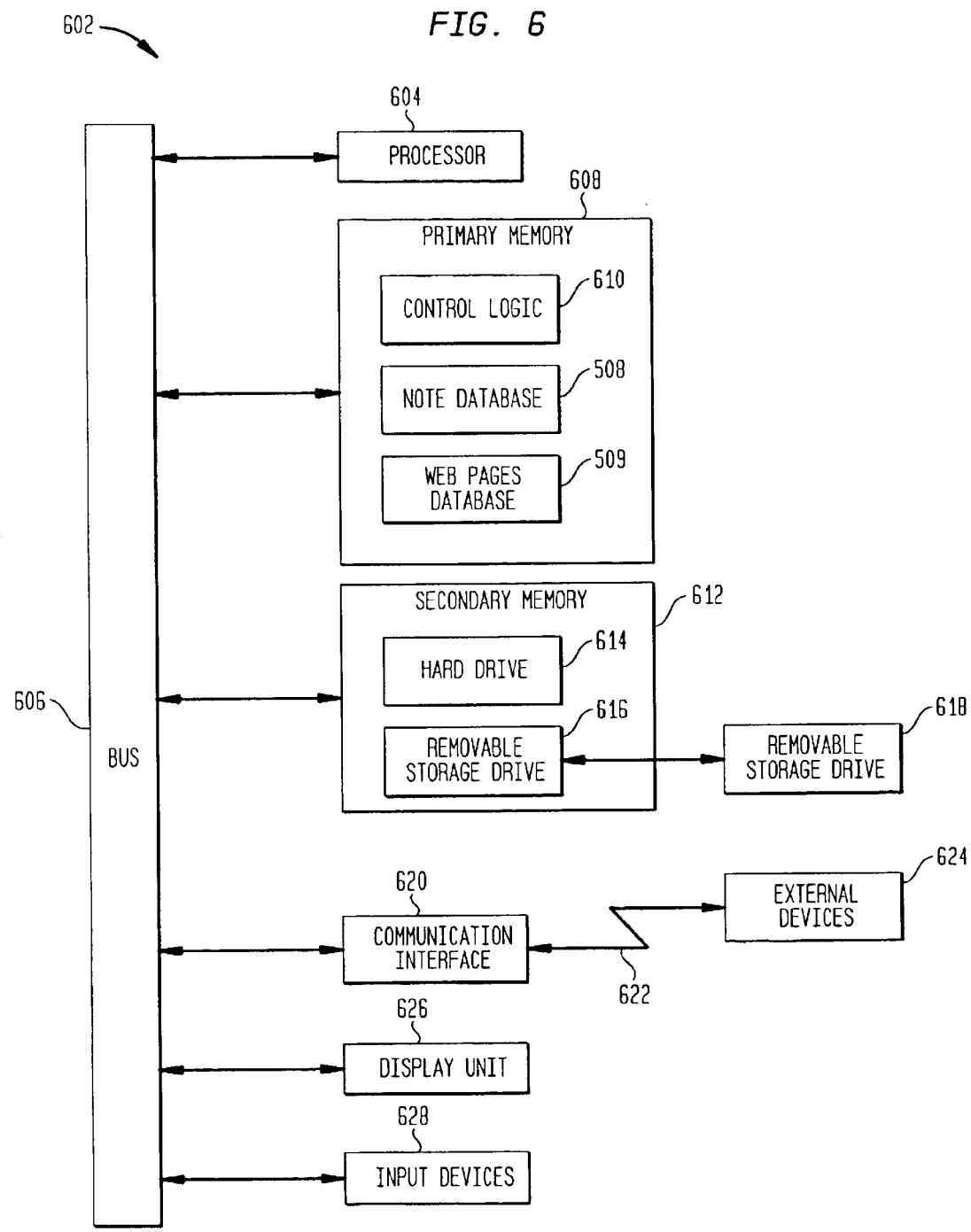
FIG. 6 is a block diagram of an exemplary computer system useful for implementing the present invention.

In an embodiment of the present invention, components of the present invention (such as the Web annotation system 502) are each implemented using a computer system 602 such as that shown in FIG. 6. The computer system 602 includes one or more processors, such as a processor 604. The processor 604 is connected to a communication bus 606. The computer system 602 also includes a main or primary memory 608, preferably random access memory (RAM). The primary memory 608 has stored therein control logic 610, such as software corresponding to the Web annotation system 502, the notes database 508, and the Web pages database 509.

It should be understood that the notes database 508 and/or the Web pages database 509 are not necessarily stored within a single computer. Instead, the notes database 508 and/or the Web pages database 509 may be distributed among multiple computers. Such distribution of the notes database 508 and/or the Web pages database 509 are described in further detail below.

The computer system 602 also includes a secondary memory 612. The secondary memory 612 includes, for example, a hard disk drive 614 and/or a removable storage drive 616, representing a floppy disk drive, a magnetic tape drive, a compact disk drive, a program cartridge and cartridge interface (such as that found in video game devices), a removable memory chip (such as EPROM or PROM), etc., which is read by and written to by removable storage unit 618. As will be appreciated, the removable storage unit 618 includes a computer usable storage medium having stored therein computer software and/or data. The removable storage drive 616 reads from and/or writes to a removable storage unit 618 in a well known manner. Removable storage unit 618, also called a program storage device or a computer program product, represents a floppy disk, magnetic tape, compact disk, etc.

Computer programs (also called computer control logic) are stored in main memory 608 and/or the secondary memory 612. Such computer programs, when executed, enable the computer system 602 to perform the functions of the present invention as discussed herein. In particular, the computer programs, when executed, enable the processor 604 to perform the functions of the present invention. Accordingly, such computer programs represent controllers of the computer system 602. The Web annotation system 502 preferably represents a computer program executing in the computer system 602.

The computer system 602 also includes a communication interface 620. The communications interface 620 enables the computer system 602 to communicate and interact with locally or remotely located external devices 624 via a communications medium 622. In particular, communications interface 620 enables the computer system 602 to send and receive software and data to/from the external devices 624. Examples of the communications interface 622 include a modem, a network interface (such as an Ethernet card), a communications port, etc.

The computer system 602 also includes a display unit 626, such as a computer monitor, and one or more input devices, such as a keyboard and a pointing device (such as a mouse, trackball, etc.).

In one embodiment, the invention is directed to a system 602 as shown in FIG. 6, and having the functionality described herein. In another embodiment, the invention is directed to a computer program product having stored therein computer software (having the functionality described herein) for controlling computer systems, such as computer system 602. In another embodiment, the invention is directed to a system and method for transmitting and/or receiving computer software (having the functionality described herein) to/from external devices 624.

3.2. A Preferred Software Programming Language and Network Architecture

As discussed above, computer programs when executed, enable computer 602 to perform the functions of the present invention as discussed herein. In a preferred embodiment, the present invention is implemented using computer programs written in an object-oriented programming language. Object-oriented programming is a type of programming in which programmers define not only the data type of a data structure, but also the types of operations (functions) that can be applied to the data structure. In this way, the data structure becomes an object that includes both data and functions. In addition, programmers can create relationships between one object and another. For example, objects can inherit characteristics from other objects.

One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify. To perform object-oriented programming, one needs an object-oriented programming language (OOPL). C++ and Smalltalk are two of the more popular languages, and there are also object-oriented versions of Pascal. While a preferred embodiment of the present invention is implemented using computer programs written in an object-oriented programming language, the present invention can also be implemented using procedural programming languages, etc.

As discussed above, one or more of computers 602 is connected by a network. A preferred embodiment of the present invention uses a type of network architecture called a peer-to-peer object architecture. Before peer-to-peer object architecture can be understood, a type of network architecture called client/server architecture must be described. Client/server architecture is a network architecture in which each computer or process on the network is either a client or a server. Servers are computers or processes dedicated to managing disk drives (file servers), printers (print servers), applications/functions or network traffic (network servers). In fact, a server is any computer or device that allocates resources for an application. Clients are personal computers or workstations on which users run applications. Clients rely on servers for resources, such as files, devices, execution of functions and even processing power.

FIG. 7 illustrates an example of the dynamic steps to establish communication that occur between a client and a server executing an object-oriented program. In FIG. 7A, the server has switchboard object 702 and listen object 704 waiting for a request from the client. In FIG. 7B, init object 706 determines that it needs to perform a specific task. In FIG. 7C, init object 706 creates comm object 708. Comm object 708 is used to communicate with the server. Then, comm object 708 makes a connection to listen object 704 in FIG. 7D. Once comm object 708 makes the connection, listen object 710 creates comm object 710 and relocates comm object 710 to switchboard object 702. Comm object 710 is used to communicate back to the client (i.e., between the two piers), via comm object 708.

Figure 7A:
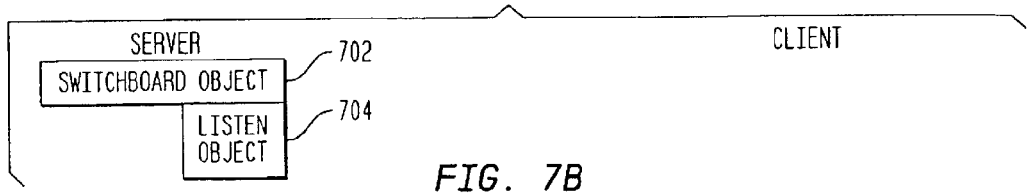
FIG. 7 illustrates the dynamic steps to establish communication between a client and a server executing an object-oriented program. For illustration purposes.
Figure 7B:
Figure 7C:
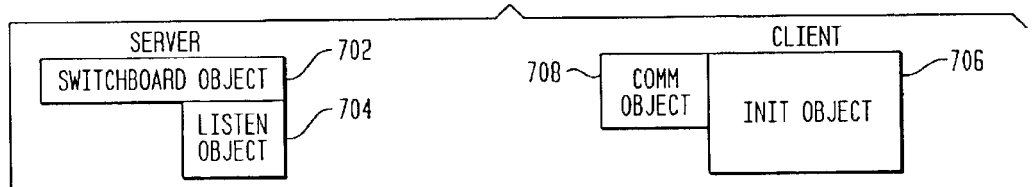
Figure 7D:
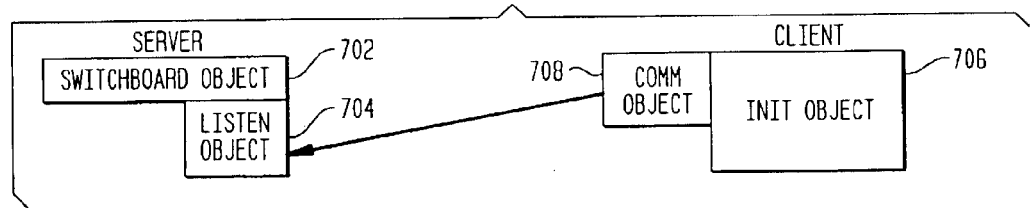
Figure 7E:
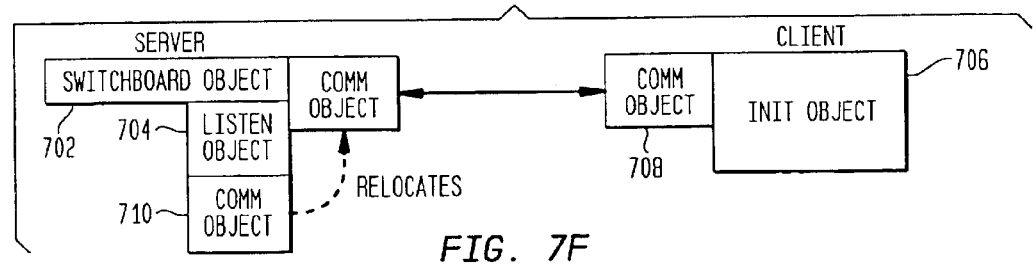
Figure 7F:
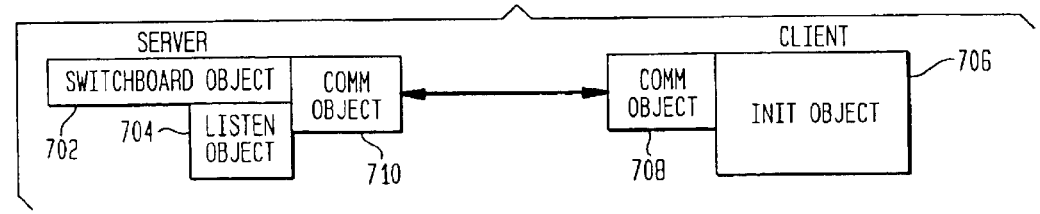
Figure 7G:
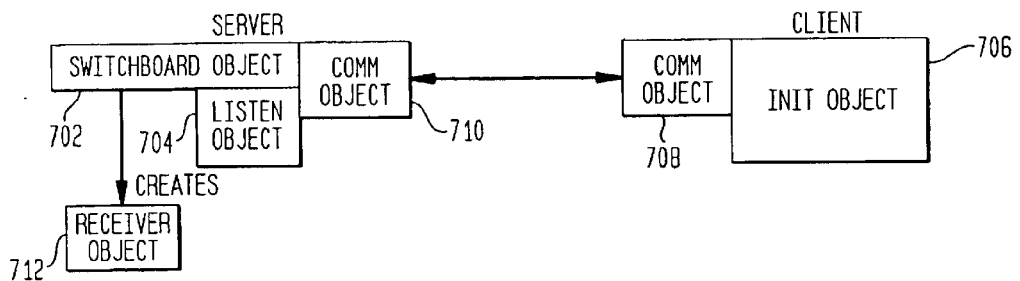
Figure 7H:
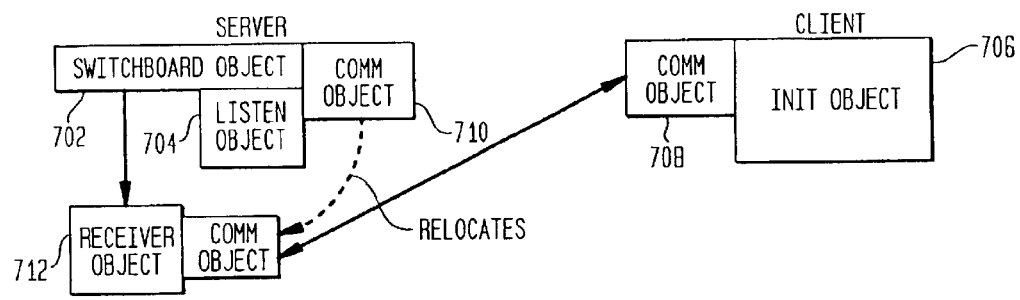
Figure 7I:
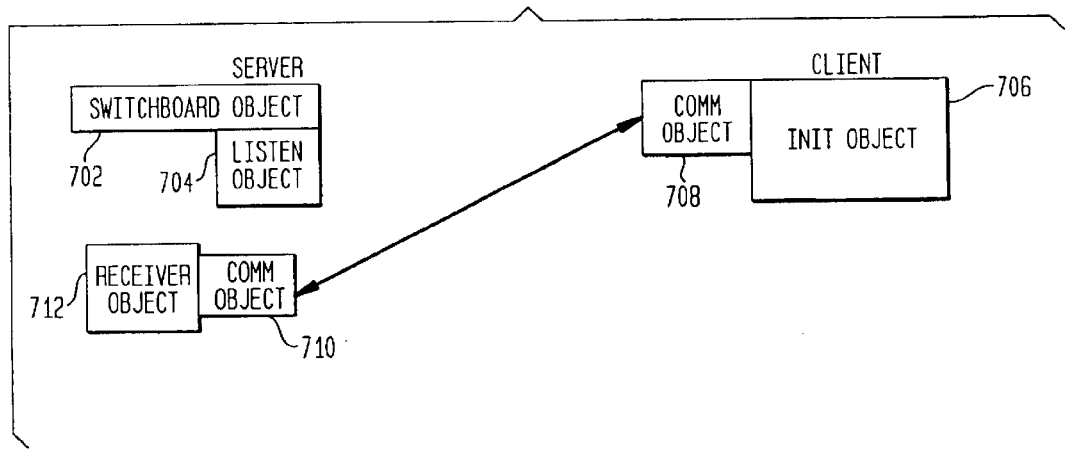

At this point, as shown in FIG. 7F, there is two-way communication between the client and the server (i.e., between the two piers) through comm object 708 and comm object 710. Init object 706 knows which receiver object needs to be created by the server (i.e., receiving pier) to preform the specific task required. Therefore, once this communication is established, init object 706 sends a request to the server (i.e., receiving pier) to create the specific receiver object. In FIG. 7G, switchboard object 702 receives the request, via comm object 710, and creates receiver object 712. Once receiver object 712 is created, comm object 710 is relocated to receiver object 712 in FIG. 7H. Now, as shown in FIG. 7I, init object 706 and receiver object 712, via comm object 708 and comm object 710, can communicate back and forth until receiver object 712 completes the task requested by init object 706.

As stated above, a preferred embodiment of the present invention uses a type of network architecture called a peer-to-peer object architecture. A peer-to-peer object architecture is when each computer in the network has equivalent capabilities and responsibilities. This differs from client/server architectures, in which some computers are dedicated to serving the others. Therefore, in a preferred embodiment of the present invention, all computers 602 can operate as either a server or a client.

As discussed above, one advantage of using an object-oriented programming language is that it allows programmers to create modules that do not need to be changed when a new type of object is added. This advantage will be further illustrated as the present invention is described in detail.

4. Features and Capabilities of the Present Invention

In one embodiment of the present invention, Web annotation system 502 is implemented as computer 602 operating as described in reference to FIG. 6 above. Computer 602 executes computer programs to enable it to perform the features and capabilities (or functions) of the present invention. Thus, Web annotation system 502 executes computer programs to perform its functions. As discussed above, the computer programs executed by Web annotation system 502 are preferably written in an object-oriented programming language and executed in a peer-to-peer object architecture.

An advantage of any object-oriented program, and thus also with computer programs executed by Web annotation system 502, is that they enable programmers to create modules that do not have to be changed when a new type of object is added. An object includes both the data and functions required to perform a task. Thus, by implementing the functions to be performed by Web annotation system 502 as objects, created modules do not need to be changed when a new type of object (or function) is added. This implementation of the present invention reduces complexity and thus increases efficiency.

Described above with reference to FIG. 7, is the dynamic steps involved in establishing communication between a client and a server executing an object-oriented program. As Web annotation system 502 of the present invention executes its various functions, the same dynamic steps involved in communication between the server and client occur for each function as shown in FIGS. 7A through 7I. FIG. 7 shows a generic init object 706 and a generic receiver object 712. For each type of function performed by Web annotation system 502, init object 706 and receiver object 712 are replaced by specific init and receiver objects that perform their specific functions.

The types of functions performed by Web annotation system 502, through the execution of computer software, note/sub-note organization, linking sub-notes to Web pages, viewing notes, sub-notes and Web pages, editing note/sub-note organization, and so forth. For simplicity, the figures used to illustrate the individual functions of Web annotation system 502 do not include switchboard object 702 and listen object 704 of FIG. 7.

Figure 8:
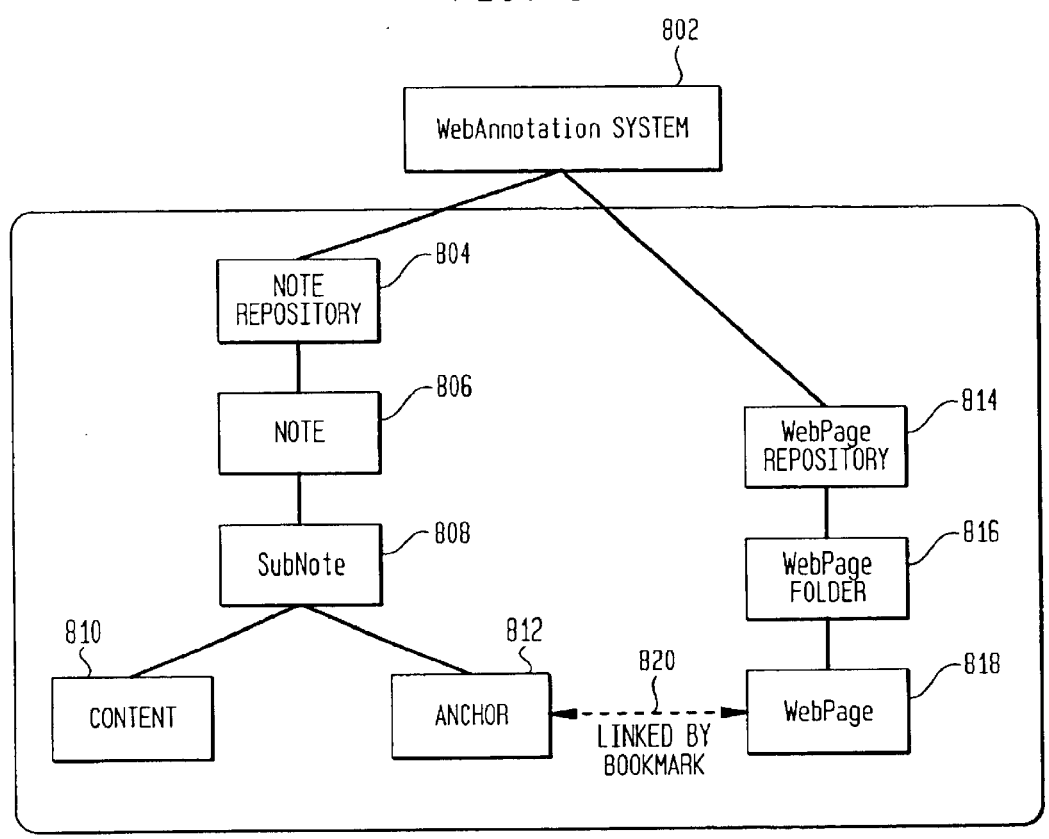
FIG. 8 is a high level view of the functional objects of the Web annotation system in a preferred embodiment of the present invention.

The functionality of the present invention implemented as objects shall be further described by reference to FIG. 8. FIG. 8 is a high level view of the functional objects of the Web annotation system 502 in a preferred embodiment of the present invention. The functional objects are organized in a hierarchical fashion and each functional object contains a data object wrapper that supports a COM interface and a data object. Referring to FIG. 8, the functional objects include a Web annotation system object 802, a note repository object 804, a note object 806, a sub-note object 808, a content object 810, an anchor object 812, a Web page repository object 814, a Web page folder object 816, and a Web page object 818. The content object 810 stores data that conveys information. This data is user definable and includes at least information that explains the rationale for linking the sub-note object 808 to a portion of the Web page object 818. The data stored in the content object 810 can be any format or combination of formats, such as text, sound, video, image, executable program, tactile (such as braille), etc. The anchor object 812 is linked by a bookmark link 820 to a portion of the Web page object 818. According to the present invention, the bookmark link 820 is bi-directional.

Each note object 806 preferably contains data including its title, the date and time of creation, the data and time of last modification, a listing of all of its sub-notes, etc. Each sub-note object 808 also preferably stores data including its title, the date and time of creation, the data and time of last modification, its content object, its anchor object, privacy settings, etc. The anchor object 812 contains data indicating the color and which pen was highlighted when the pointer was used to select the selected portion to which the sub-note is linked. The anchor object 812 also stores data representing the data object that the sub-note object 808 is linked with. This data may include a URL for non-cached Web pages and a filename for cached Web pages, a frame index array to the frame that contains the annotation, apiece of data (e.g., TextRange bookmark) that describes a text selection on the given frame of the given Web page, pixels that get printed to a screen, etc.

A frame index array is a collection of indexes that specify a frame. For example, a simple Web page may contain only one frame. The present invention would indicate this with an empty frame index array. Another example for a Web page that has three frames, and it is the second frame that is annotated by the present invention, the frame index array contains the number 1. (Note that arrays start with an index of 0). Once the frame is specified, the present invention may utilize at least four different ways to specify the selected text. An preferred way is through the use of a TextRange. A TextRange can be created from the current selection. A TextRange can be persisted to a "bookmark" (such as bookmark link 820), which is an opaque piece of data that represents the TextRange. This can be used to store the TextRange at a later time. In another embodiment, the present invention maintains a character offset to the start of the range, and then the number of characters in the TextRange. In yet another embodiment, the present invention maintains a collapsed TextRange bookmark to start the selected text or portion, and the number of characters in the TextRange. In yet another embodiment, the present invention maintains a collapsed TextRange bookmark to the start of the selected text or portion, and another collapsed TextRange bookmark to the end of the selected text.

Conceptually, note repository object 804, note object 806, sub-note object 808, content object 810, and anchor object 812 make up the notes database 508 (FIG. 5). Likewise, Web page repository object 814, Web page folder object 816, and Web page object 818 conceptually make up Web pages database 509.

The user interface 504 creates, updates, and deletes objects in the Web annotation system 502 preferably using the COM interfaces. In order to do this, the user interface 504 must first gain access to a functional object through the top level object, namely the Web annotation system object 802. The Web annotation system object 802 can return to the user interface 504 the note repository object 804 and/or the Web page repository object 814. Once the user interface 504 has either the note repository object 804 or the Web page repository object 814, it can use either of these (based on its interface) to: navigate to other objects, create child objects, remove child objects, and modify child objects.

Figure 9:
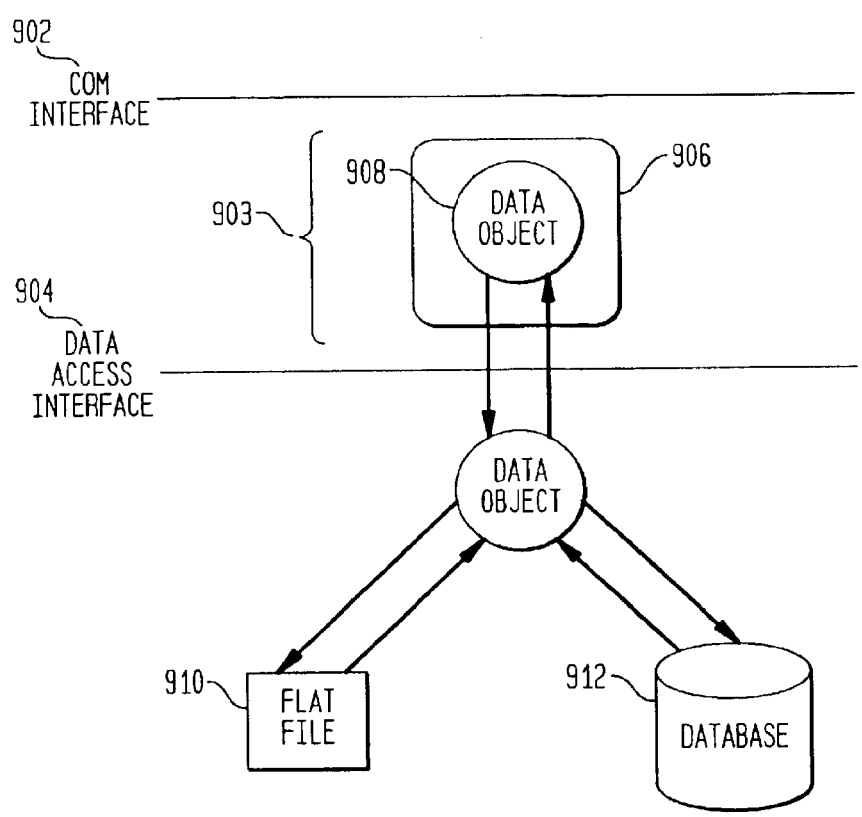
FIG. 9 illustrates a preferred implementation of the functional objects of the present invention according to a preferred embodiment of the present invention.

Each of the functional objects 802–818 shown in FIG. 8 preferably follows a pattern of implementation as shown in FIG. 9. In FIG. 9, the user interface 504 uses a COM interface 902 to access a generic functional object 903 (same as described above). The functional object 903 contains a data object wrapper 906 that supports the COM interface 902 and a data object 908 that can be stored in either a flat file 910 or a database 912. The functional object 903 uses the data access interface 904 to access the data object 908. In theory, the data access interface 904 could go across a network connection to access the data object 908, or it could access the data object 908 stored physically on the same computer. The present invention includes a multitude of functions which enable it to achieve the advantages discussed herein. Many of these functions are discussed in the following sections.

4.1 Note/Sub-Note Organization

Figure 29:
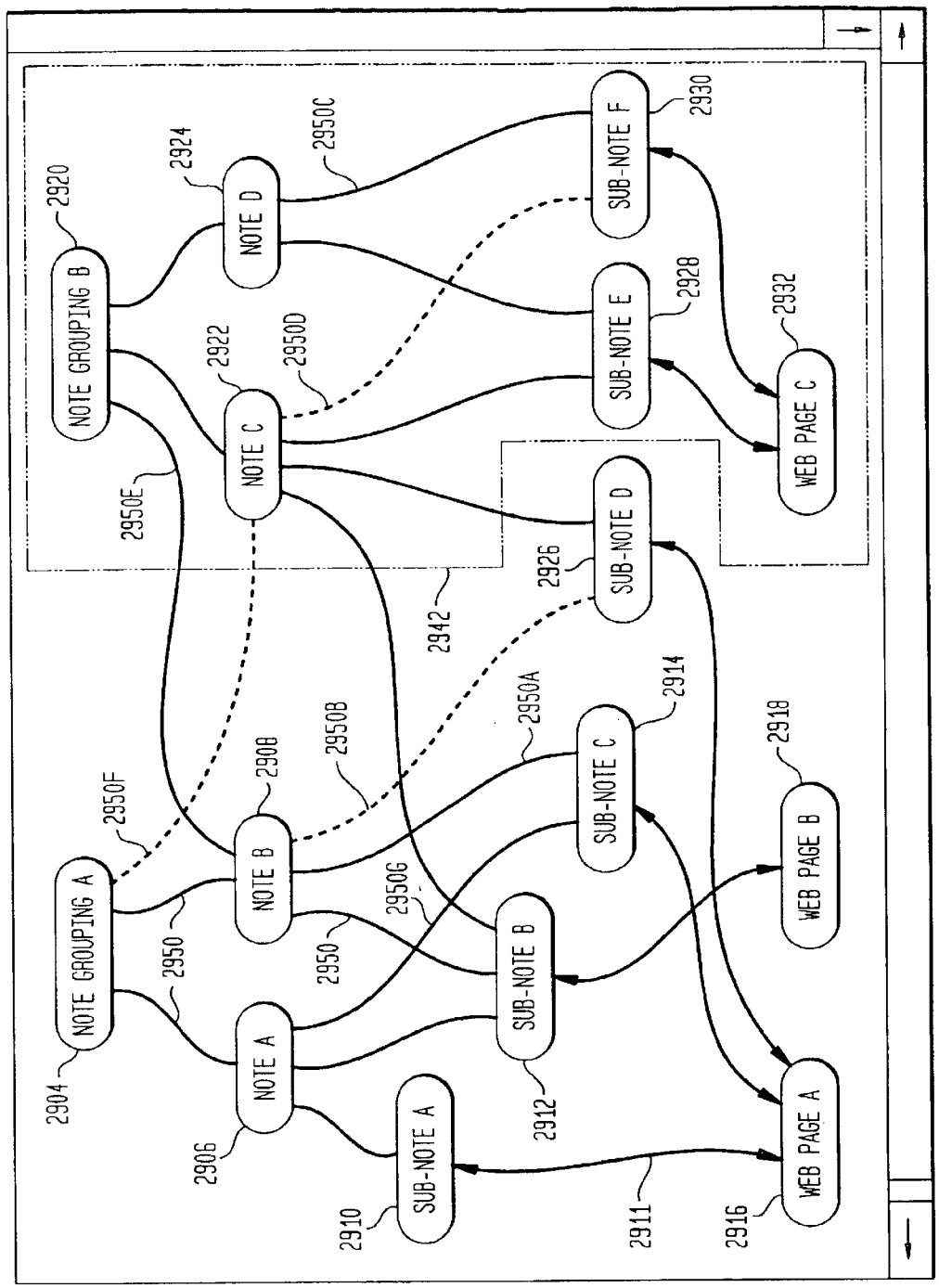
FIG. 29 illustrates an example link view according to a preferred embodiment of the present invention.

The present invention supports a note/sub-note hierarchy, where a note may include zero or more sub-notes. This is shown in FIG. 29, for example, where Note A includes Sub-notes A, B, and C. Note B includes Sub-notes B and C (dashed line 2950B is discussed below), Note C includes Sub-notes B, D, and E, and Note D includes Sub-notes E and F.

The note/sub-note hierarchy is useful for organizing information. In particular, the note/sub-note hierarchy allows users to group together related sub-notes for organization purposes. Related sub-notes may be grouped together under one note.

The note/sub-note hierarchy is extendable to multiple levels. For example, related notes can be grouped together under a note grouping. In essence, a note itself is also an implementation of a note grouping because a note can contain other notes (or sub-notes). In FIG. 29, for example, Notes A and B are grouped together under Note Grouping A. Notes B, C, and D are grouped together under Note Grouping B. The sharing of Note B between Note Grouping A and Note Grouping B is one embodiment of the present invention. In another embodiment, notes and/or sub-notes are not shared. It should be understood that the invention is not limited to the three level hierarchy shown in the example of FIG. 29. The invention is extendable to more than three levels.

The note/sub-note hierarchy of the invention is very flexible. Multiple note groupings may include the same note. For example, both Note Groupings A and B include Note B. Also, multiple notes may include the same sub-note. For example, Notes A, B, and C include Sub-note B.

The note/sub-note hierarchy is defined by users. That is, users define which notes are contained in note groupings, and which sub-notes are contained in notes. The invention includes tools for enabling users to define and modify the note/sub-note hierarchy (such tools are discussed below).

4.2 Linking Sub-Notes To Web Pages

The present invention allows users to link sub-notes to portions of data object, preferably Web pages. In FIG. 29, for example, Sub-note A is linked to a portion of Web Page A via link 2911. As discussed above, a Web page (or data object) represents any information in any form that can be accessed and/or processed by a computer via the Internet. The Web pages generated and processed by these applications and devices vary widely in subject matter. Also, these Web pages (or data objects in general) come in many forms, such as text files, image files, video files, audio files, computer programs, HTML documents, etc. Accordingly, these Web pages are disparate in both form and content.

Users can navigate from sub-notes to Web pages via the links. For example, a user can navigate from Sub-note A to Web Page A via link 2911.

The links between sub-notes and Web pages are bi-directional. Thus, in addition to being able to navigate from sub-notes to Web pages via the links, users can also navigate from Web pages to sub-notes via the links. For example, a user can navigate from Web Page A to Sub-note A via link 2911.

A note or sub-note may be linked to all or any portion of a Web page. (In the discussion contained herein, attributes of sub-notes also apply to notes.) Multiple sub-notes may be linked to portions of the same Web page. This is true, whether the sub-notes are in the same or different notes. These Web page portions may be completely overlapping, partially overlapping, or non-overlapping. Also, the sub-notes in a note may be linked to portions of a single Web page, or to portions of one or more Web pages.

A Web page may be linked to one or more sub-notes (these sub-notes may be in the same note, or in multiple notes). In FIG. 29, for example, Web page A is linked to Sub-notes A, C, and D.

Users can navigate from sub-notes in a first note to sub-notes in a second note via common Web pages. In FIG. 29, for example, a user can navigate from Sub-note A in Note A to Sub-note D in Note C via Web Page A, which is linked to both Sub-note A (via link 2911) and Sub-note D (via link 2917).

The linking capabilities of the present invention shall be further described by reference to an example scenario presented in FIG. 10. The Web annotation system 502 in the example of FIG. 10 includes notes 1014A and 1014B (these notes are stored in the notes database 508, which is not explicitly shown in FIG. 10). Each note 1014 includes a plurality of sub-notes 1016.

Each sub-note 1016 is linked to a Web page 1020. Each Web page 1020 is associated with one or more applications 512. A Web page 1020 is associated with an application 512 if the application 512 is capable of accessing and/or processing the Web page 1020. More particularly, each sub-note 1016 is linked to a portion 1022 of a Web page 1020. A portion 1022 may include all or part of a Web page 1020.

Portions 1022 in the same Web page 1020 that are linked to sub-notes 1016 may be distinct (non-overlapping), may completely overlap, or may partially overlap.

For purposes of illustration, it is assumed herein that each Web page is associated with a single computer program application. This association between Web pages and applications may be established in any well known manner, such as by file extension. For example, all files having a "wpd" extension are as a default associated with the WORD PERFECT word processing application, all files having a "wks" extension are as a default associated with the LOTUS 1-2-3 spreadsheet application, all files having a "db" extension are as a default associated with the PARADOX database application, etc. These default associations between Web pages and applications are preferably user definable. Preferably, users may override these default associations at the time that a sub-note is linked with a Web page, or at any time thereafter.

A note 1014 may contain sub-notes 1016 that are linked to portions 1022 of a single Web page 1020, or multiple Web pages 1020. These Web pages 1020 may be associated with a single application 512, or with multiple applications 512. For example, note 1014A includes sub-notes 1016A, 1016B, 1016C that are linked to portions 1022A, 1022C, 1022B, respectively, of Web pages 1020A, 1020B that are associated with application 512A. Note 1014A also includes a sub-note 1016D that is linked to portion 1022D of object 1020C associated with application 512B.

Multiple sub-notes 1016 in the same or different notes 1014 may be linked to the same portion 1022 of a Web page 1020. For example, sub-notes 1016D and 1016F are linked to portion 1022D of object 1020C.

In one embodiment of the present invention, a note 1014 is not a Web page. In another embodiment of the present invention, a note 1014 represents a Web page. Accordingly, a sub-note 1016 may be linked to a portion of a note 1014. For example, sub-note 1016E is linked to portion 1022F of note 1014B. Portion 1022F includes sub-note 1016G.

Each sub-note 1016 includes a content data that is used to convey information. The content data are user definable. Preferably, the content data includes at least information that explains the rationale for linking the sub-note 1016 to the portion 1022 of the Web page 1020. For example, the content field 1512 could include a description of how the portions 1022 linked to the sub-notes 1016 in the note 1014 are related to one another. The content field 1512 can be any format or combination of formats, such as text, sound, video, image, executable program, tactile (such as braille), etc.

Figure 10:
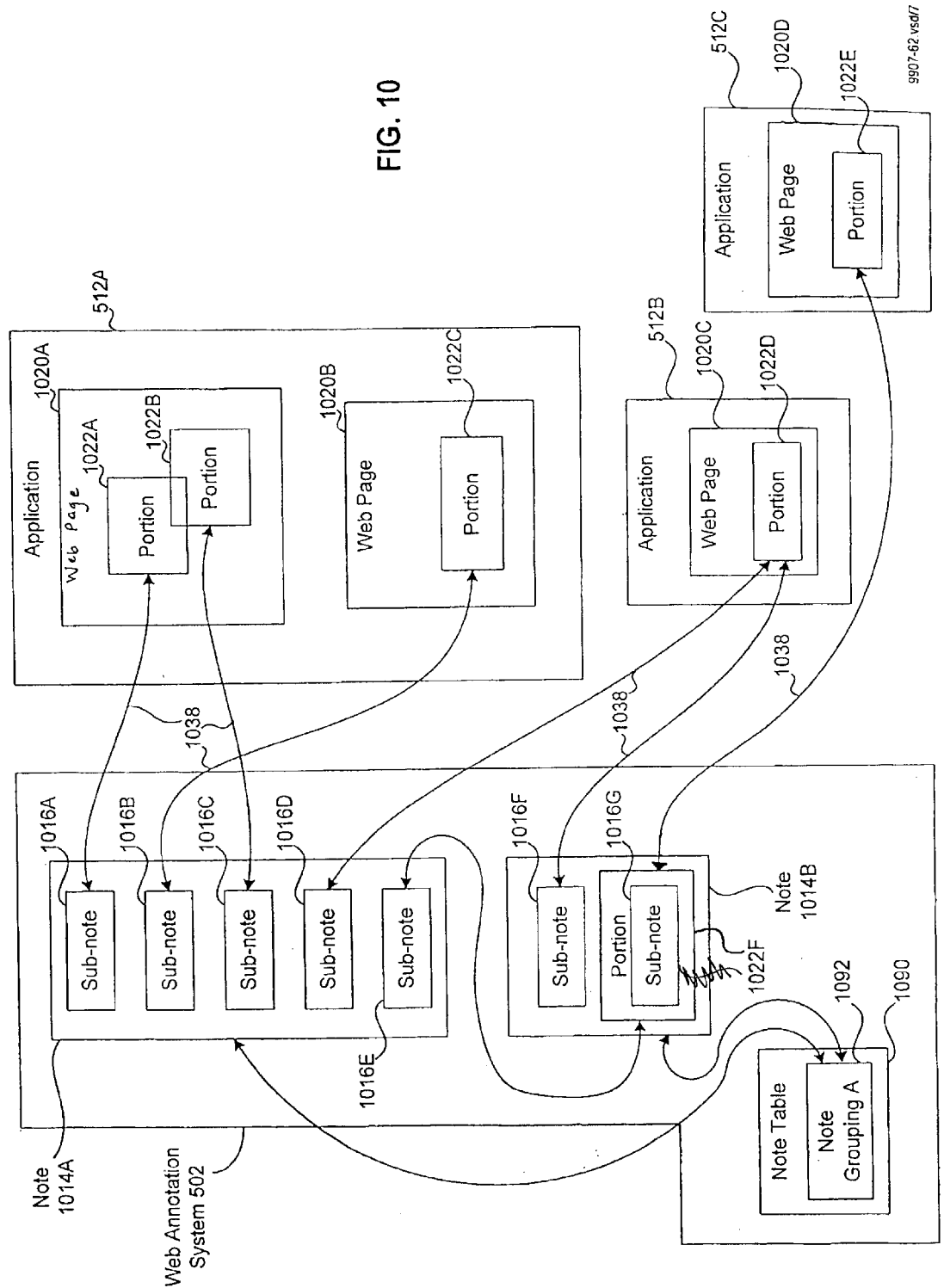
FIG. 10 is a block diagram used to explain the linking capabilities of the present invention according to a preferred embodiment.

The mechanism for linking portions 1022 of Web pages 1020 with sub-notes 1016 is generally represented in FIG. 10 as links 1038. According to the present invention, this linking mechanism 1038 is bi-directional. Thus, a user viewing portion 1022B of Web page 1020A can issue a command to view sub-note 1016C. Also, a user viewing sub-note 1016D can issue a command to automatically launch application 512B, load Web page 1020C, and view portion 1022D.

The linking mechanism 1038 of the present invention enables users to easily traverse through related Web pages 1020, and through sub-notes 1016. For example, a user could command the Web annotation system 502 to display the note 1014A. From note 1014A, the user could move from sub-note 1016A to portion 1022A and back again, from sub-note 1016B to portion 1022B and back again, etc. Accordingly, the notes 1014 and sub-notes 1016 represent a trail through portions 1022 in Web pages 1020.

The lining mechanism 1038 of the present invention enables users to access portions 1022 of Web pages 1020 in any order. This represents random access technology. For example, a user can access in any order the portions 1022 of Web pages 1020 linked to the sub-notes 1016 in the note 1014A. In this respect, the invention is superior to conventional mechanisms for linking documents, such as that shown in FIG. 1, where documents must be accessed in a predefined order. Such conventional mechanisms represent sequential or linear access technology. Thus, the trail through documents provided by the linking mechanism 1038 of the present invention is much more flexible and user-friendly than the trail provided by conventional linking mechanisms.

One or more notes can be grouped together under one note grouping. A note grouping table 1090 or other database construct is used to keep track of which notes are in which note groupings. In the example of FIG. 10, notes 1014A and 1014B are in Note Grouping A. Each note 1014 preferably includes information that identifies which Note Grouping it is in, such that it is possible to traverse from a note to a note grouping, and vice versa. This is described further below. Further levels of organization are also supported by the invention, using the same or extensions of the organizational constructs (note groupings, notes, sub-notes, links, etc.) discussed herein.

The note/sub-note hierarchy feature and the linking feature of the invention as described above collectively provide at least two ways to organize information, and to memorialize/institutionalize a person or group's thinking and work product. First, the Web annotation system 502 provides a note/sub-note hierarchy. The note/sub-note hierarchy allows users to group together related sub-notes for organization purposes. That is, related sub-notes may be grouped together under one note. The grouping together of related sub-notes conveys to a certain extent the rationale for the linking together of Web pages 1020.

Second, the Web annotation system 502 provides a means for explicitly documenting the trail through Web pages 1020 as established by the linking mechanism 1038. Such documentation is achieved by the sub-notes 1016. As discussed above, each sub-note 1016 includes a content field 1512 (FIG. 15) that is used to convey information. The content field 1512 preferably includes at least information that explains the rationale for linking the sub-note 1016 to the portion 1022 of the Web page 1020. Thus, the rationale for the trail established by the linking mechanism 1038 is explicitly explained by the information contained in the sub-notes 1016.

Note that there is no guarantee that a Web page stored on a Web site is not changed or even deleted. Thus, there is no guarantee that the information stored by the present invention for the linked portion of a Web page is valid if the user does not use the caching function provided by the present invention. If the user does not use the caching function, there are ways in which the present invention checks to ensure a Web page has not changed, including utilizing a checksum, comparing the "last modified" date that is returned on the Web page access to the "last modified" date that the present invention is expecting.

4.3 Examples of Note/Sub-Note Organization and Linking Sub-Notes To Web Pages

The note/sub-note hierarchy feature and the linking feature of the invention shall now be further described in this section by the use of examples. These examples will also serve to illustrate the general operation of the Web annotation system 502.

Figure 11:
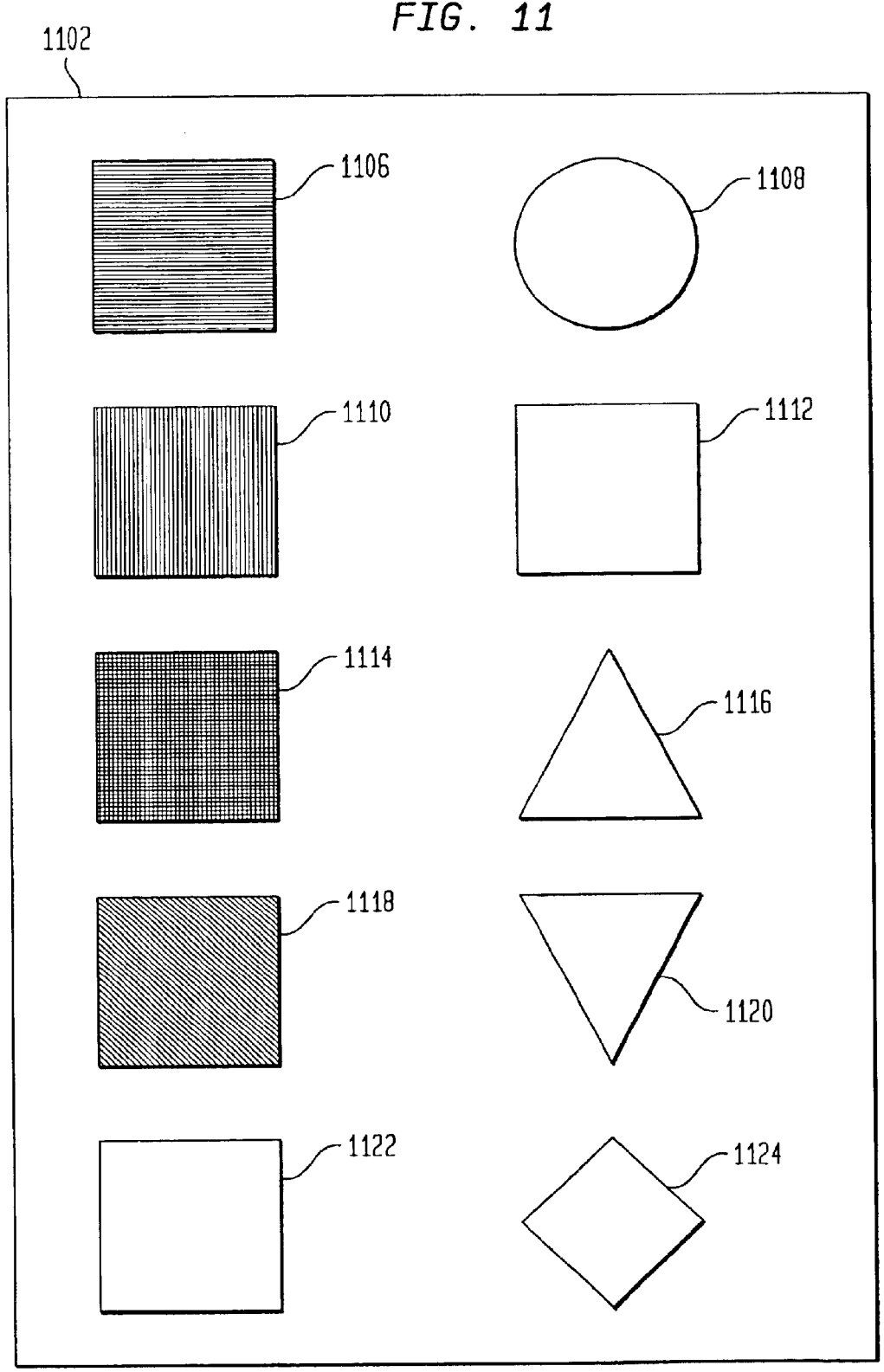
FIG. 11 is a legend of colors/fonts and symbols used by the present invention according to a preferred embodiment.

FIG. 11 is a legend 1102 of colors 1106, 1110, 1114, 1118, 1122 used by the present invention for color coding purposes. Colors 1106, 1110, 1114, 1118, 1122 are preferably red, green, yellow, cyan, and magenta, although other colors could alternatively be used. Colors 1106, 1110, 1114, 1118, 1122 could represent different patterns and/or fonts in addition to or instead of colors. This is especially useful when the notes application 302 is used with a computer having a black and while monitor. In one embodiment, the colors/patterns/fonts are user definable (this embodiment is discussed further below).

The legend 1102 depicts different symbols 1108, 1112, 1116, 1120, 1126 used by the present invention. For purposes of the present invention, symbols 1108, 1112, 1116, 1120, and 1124 are associated with colors 1106, 1110, 1114, 1118, and 1122, respectively. When displaying these symbols 1108, 1112, 1116, 1120, 1126, the invention fills the symbols 1108, 1112, 1116, 1120, 1126 with their associated colors 1106, 1110, 1114, 1118, 1122, respectively.

Figure 12:
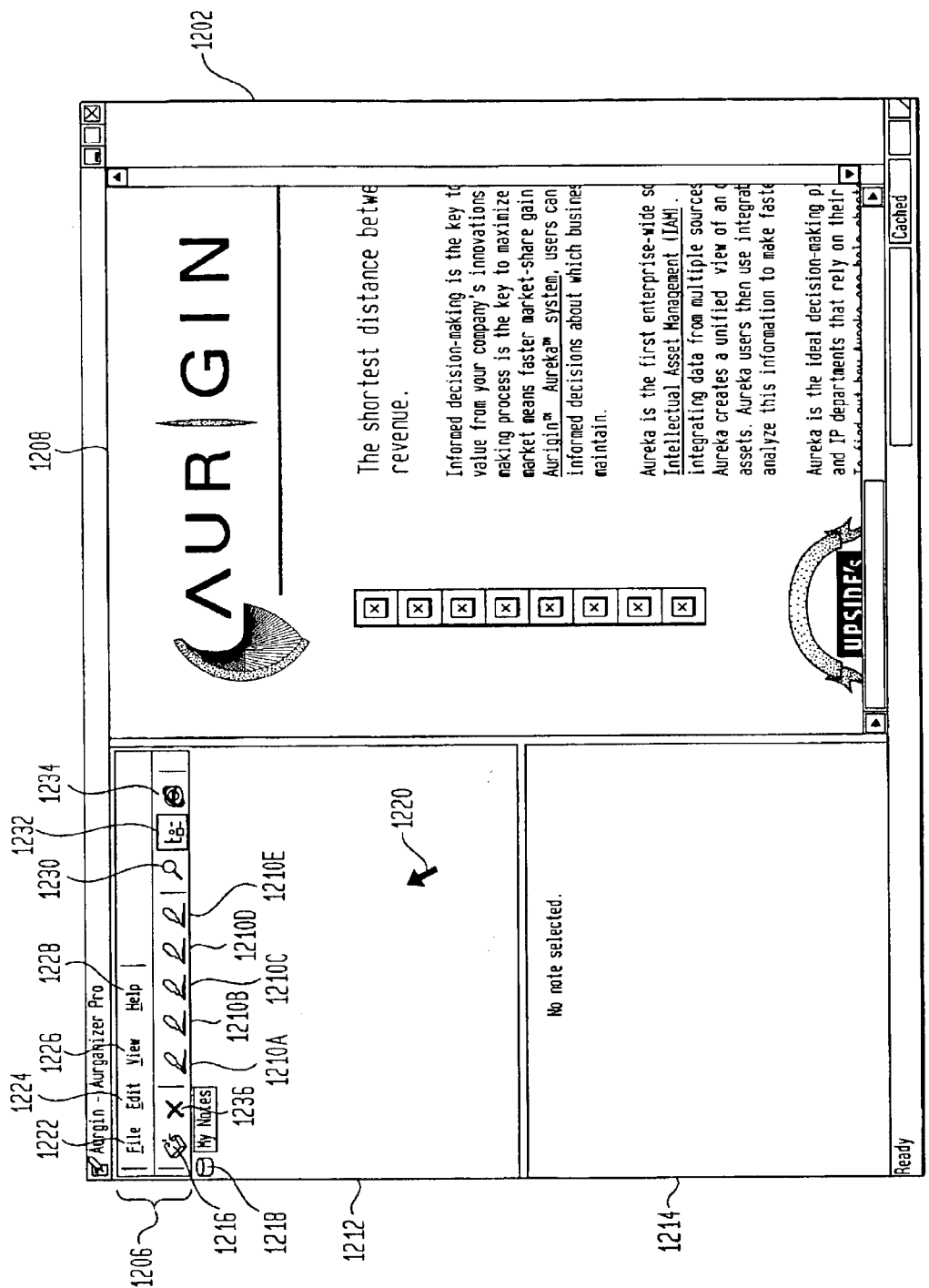
FIGS. 12 and 13 depict example computer displays of the display unit in a preferred embodiment of the present invention.

FIG. 12 depicts an example computer display 1202 of the display unit 626 (FIG. 6). The computer display 1202 is currently displaying a notes toolbox window 1206, a Web page window 1208, a notes/Web page directory window 1212, and a notes text window 1214. Also shown in FIG. 12 is a pointer 1220 corresponding to the mouse or other pointing device, such as a trackball.

The Web page window 1208 is generated by an application that can process Web pages, such as a Web browser or the Aureka Workbench available from Aurigin, Inc., Mountain View, Calif. The Web page window 1208 is currently displaying a portion of Aurigin's home page.

The notes/Web page directory window 1212 displays the directory of either the notes or the Web pages accessed by the present invention. The directory is displayed in a tree format. The notes/Web page directory window 1212 includes a directory button 1218. When the user clicks on the directory button 1218, any sub-notes that are stored in the note are displayed.

The notes text window 1214 is the area where the user types in his notes about the portion of the Web page that he highlights. The notes text window 1214 also displays the text of one or more notes for the user to review/revise.

The notes toolbox window 1206 includes a new note button 1216, a delete button 1236, a plurality of pen buttons 1210, a search button 1230, a show sub-notes button 1232, a launch Web browser button 1234, a file button 1222, an edit button 1224, a view button 1226, and a help button 1228. In the example of FIG. 12 the notes toolbox window 1206 includes five pen buttons 1210, but the notes toolbox window 1206 could alternatively include other numbers of pen buttons 1210.

A user presses the new note button 1216 to create a new note. The delete button 1236 is used to delete a note or Web page. Here, the user highlights a note or Web page in the notes/Web page directory window 1212 and then clicks on the delete button 1236.

Figure 13:
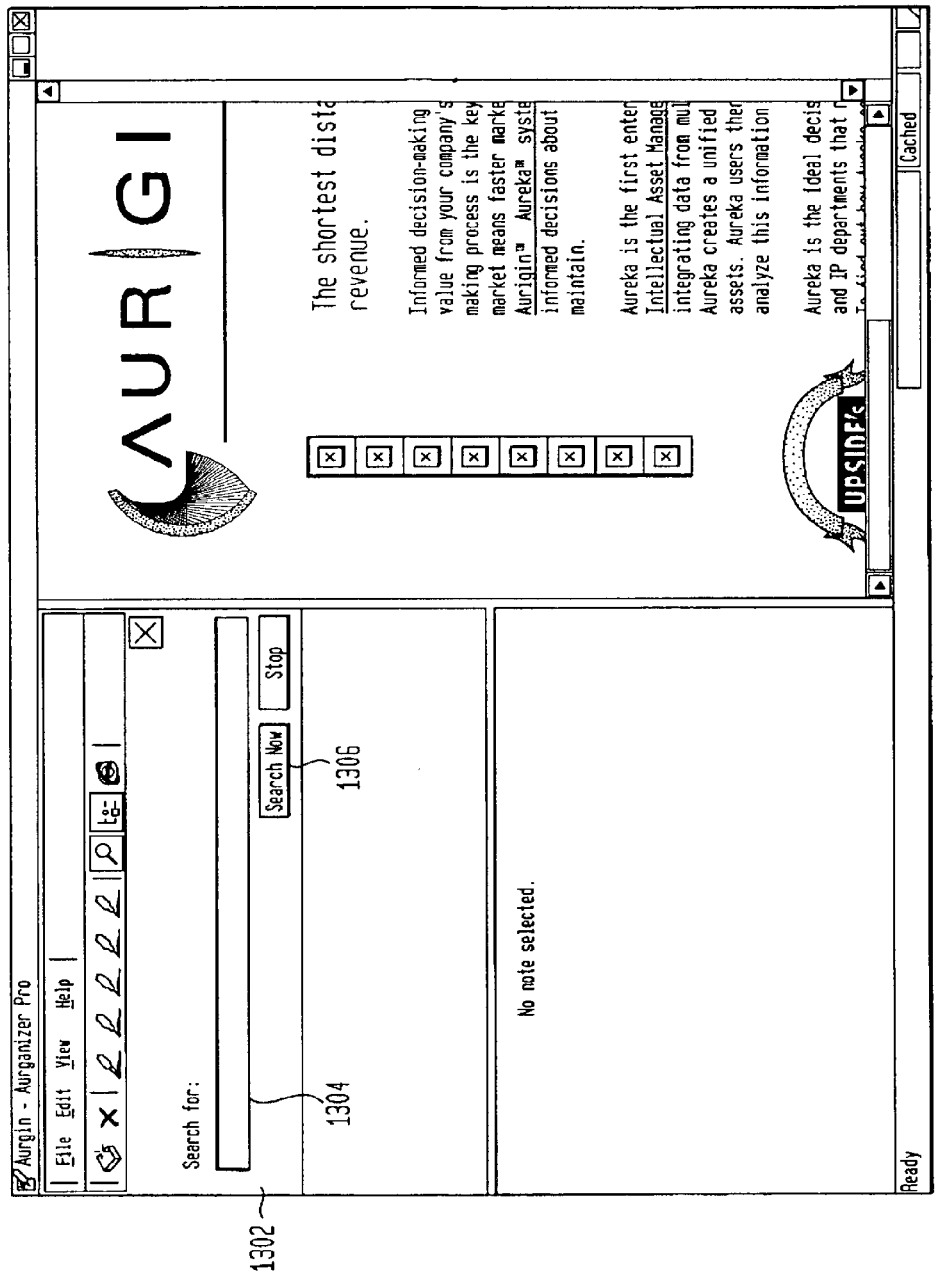

When the user presses the search button 1230 a search window 1302 (FIG. 13) appears. Referring to FIG. 13, the user types in the title of a note or sub-note in the space 1304 and clicks on a search now button 1306. The present invention searches for that particular note. If the note/sub-note is located, the present invention displays the note/sub-note to the user.

A user presses the show sub-notes button 1232 to display the sub-notes of a note in the tree of the notes/Web page directory window 1212, and presses the launch Web browser button 1234 to execute a Web browser.

Figure 14:
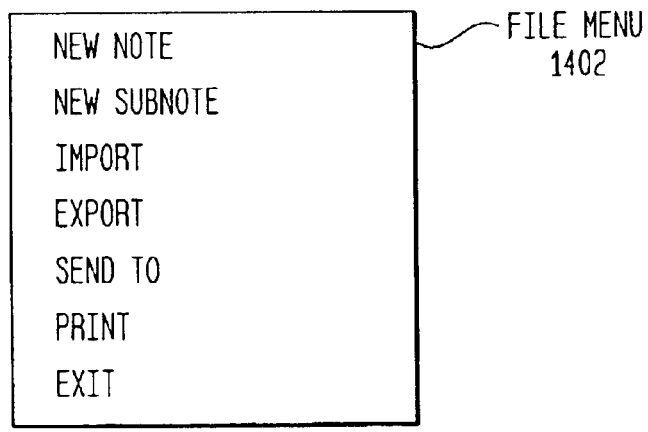
FIG. 14 illustrates an example file menu according to a preferred embodiment of the present invention.

A user presses the file button 1222 to display a file menu 1402 (FIG. 14). In the present invention, the term "menu" is used to describe property sheets, herein. Referring to FIG. 14, from the file menu 1402, the user can access functions provided by the Web annotation system 502 for manipulating notes and sub-notes. These functions include creating a new note, creating a new sub-note, importing a note or sub-note, exporting a note or sub-note, sending notes and sub-notes to another person, printing the notes and sub-notes, and exiting the Web annotation system 502. Here, the user is able to send via e-mail a copy of portions of the note database 508 to other users by using a "send to" command in the file menu 1402. If the user sends an e-mail to another user, the recipient gets copies of all of the notes and Web pages necessary to display the information that is sent. The user can also save AWN (Aurigin Web Note) files. These files can be generated using the "export" command in the file menu 1402. Here, the "send to" command simply mails an AWN file to the other user.

Figure 15:
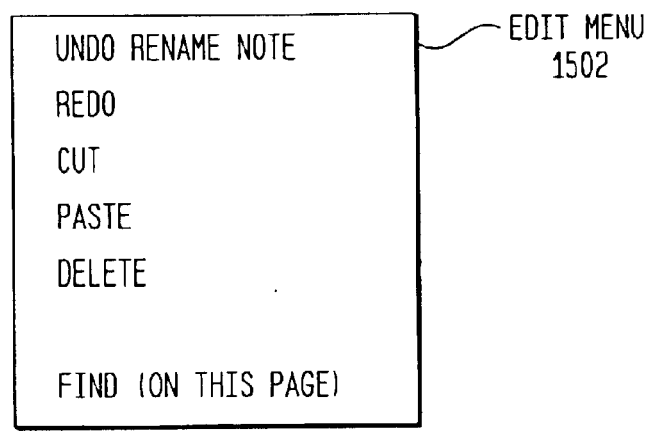
FIG. 15 illustrates an example edit menu according to a preferred embodiment of the present invention.

A user presses the edit button 1224 to display a edit menu 1502 (FIG. 15). Referring to FIG. 15, from the edit menu 1502, the user can access additional functions provided by the Web annotation system 502. These functions include undoing the last function, redoing the undo, cutting a note or sub-note, pasting a note or sub-note, deleting a note or Web page (same as delete button 1236), and finding text in a Web page displayed in the Web page window 1208.

Figure 16:
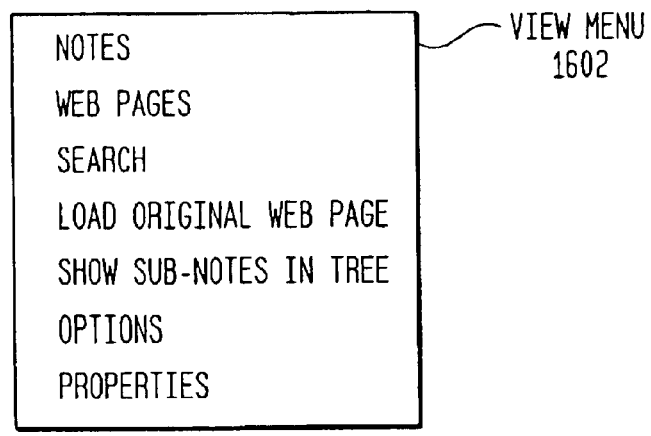
FIG. 16 illustrates an example view menu according to a preferred embodiment of the present invention.

When a user presses the view button 1226, a view menu 1602 (FIG. 16) is displayed. From the view menu 1602 in FIG. 16, the functions provided to the user include toggling between a notes directory tree or a Web pages directory tree displayed in the notes/Web page directory window 1212, searching for a note or sub-note (as described above with the search button 1230), loading the original Web page (function that shows the user the original version of the Web page), showing sub-notes in the tree of the notes/Web page directory window 1212 (as described above with the sub-notes button 1232), options, and properties. The options and properties functions of the present invention are described next in more detail.

Figure 17:
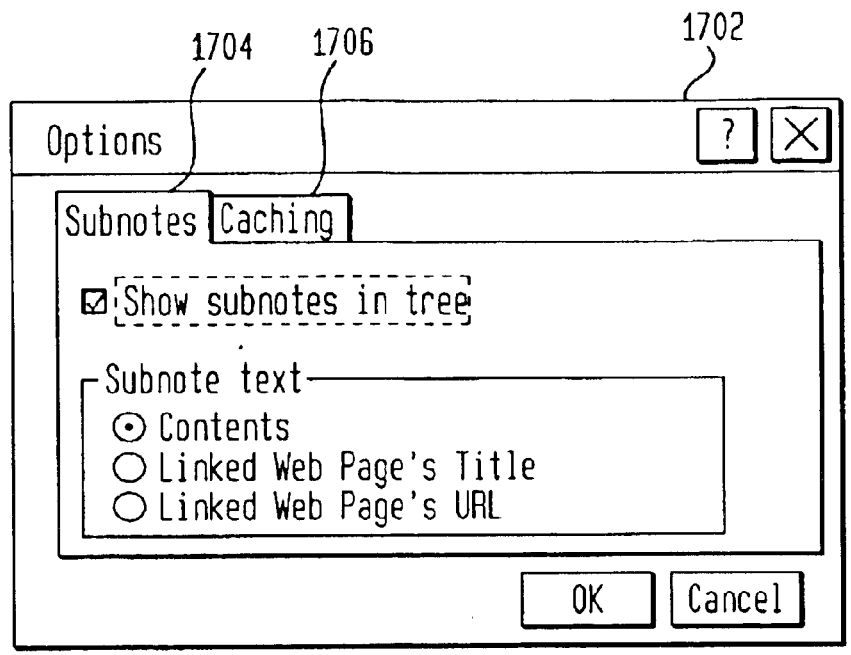
FIGS. 17 and 18 illustrate an example options menu according to a preferred embodiment of the present invention.

When a user picks the options function from the view menu 1602, an options menu 1702 (FIG. 17) is displayed. Referring to FIG. 17, the options menu has two property pages, a sub-notes page 1704 and a caching page 1706. The sub-files file 1704 provides the user with options on how the sub-notes are displayed. For example, the sub-notes can be shown in the tree in the notes/Web page directory window 1212 (as described above with the sub-notes button 1232), the contents of the sub-note can be displayed beside the title of the note in the tree, and the title and/or URL of the Web page that the sub-note is linked to can be display in the tree.

Figure 18:
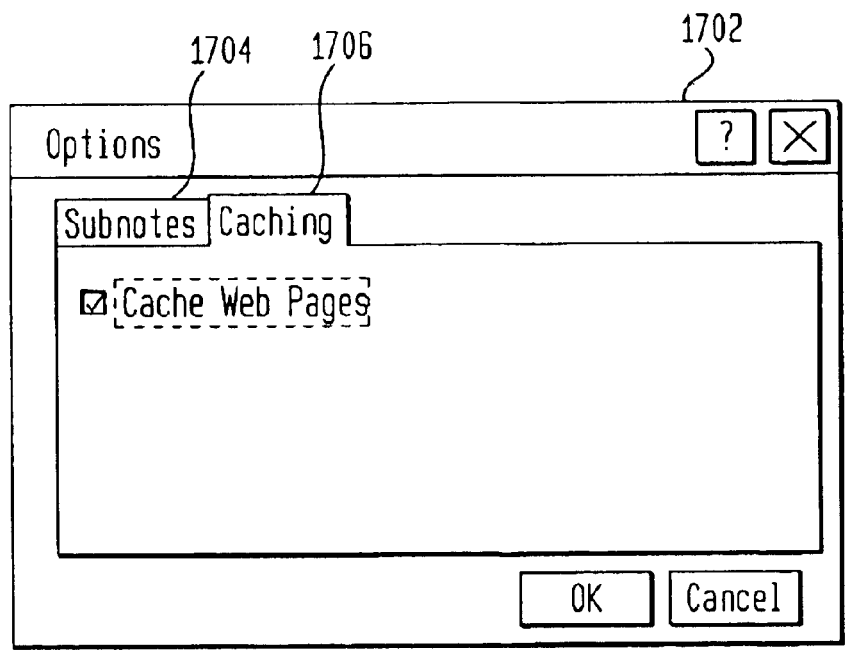

Referring to FIG. 18, the caching page 1706 will now be described. Here, the user can decide whether he wants the Web pages cached for faster retrieval of the Web pages by the present invention.

Figure 19:
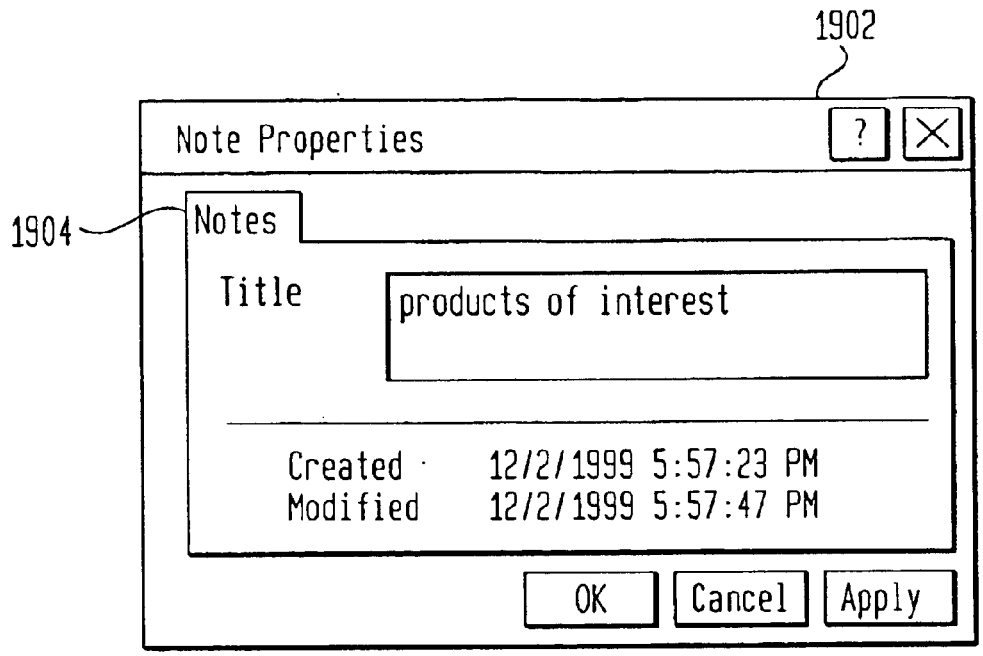
FIG. 19 illustrates an example note properties menu according to a preferred embodiment of the present invention.

When a user picks the properties function from the view menu 1602, a properties menu 1902 (FIG. 19). In FIG. 19, the properties menu 1902 has a note page 1904. Here, the title of the note is displayed, the date and time it was created, and the date and time it was last modified.

Figure 20:
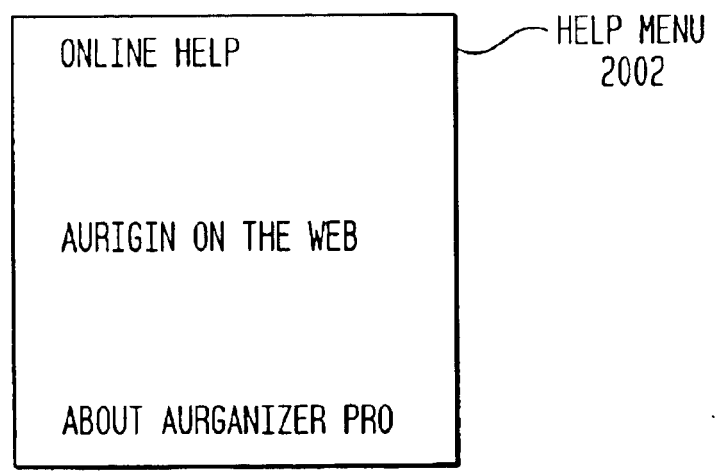
FIG. 20 illustrates an example help menu according to a preferred embodiment of the present invention.

A user presses the help button 1224 to display a help menu 2002 (FIG. 20). Referring to FIG. 20, the help menu 2002 provides the typical help functions to the user.

Each pen button 1210 includes an image of a pen, such as the pen image in pen button 1210A. The pen images in the pen buttons 1210 are color coded using the colors 1106, 1110, 1114, 1118, 1122 shown in FIG. 11.

The pen buttons 1210 are used to select portions of Web pages that are to be linked with sub-notes of notes. The pen buttons 1210 are used as follows. A user selects one of the pen buttons 1210 using the mouse. The pointer 1220 is then used to highlight, in the same color as the pen, what the user selects. The user then manipulates the pointer 1220 to select a portion of the currently displayed Web page (in the case of FIG. 12, a portion of the Web page displayed in the Web page window 1208). The selected portion of the Web page is color coded using the same color as the pen. The Web annotation system 502 creates a new sub-note, and links the sub-note to the selected portion of the Web page.

Figure 21:
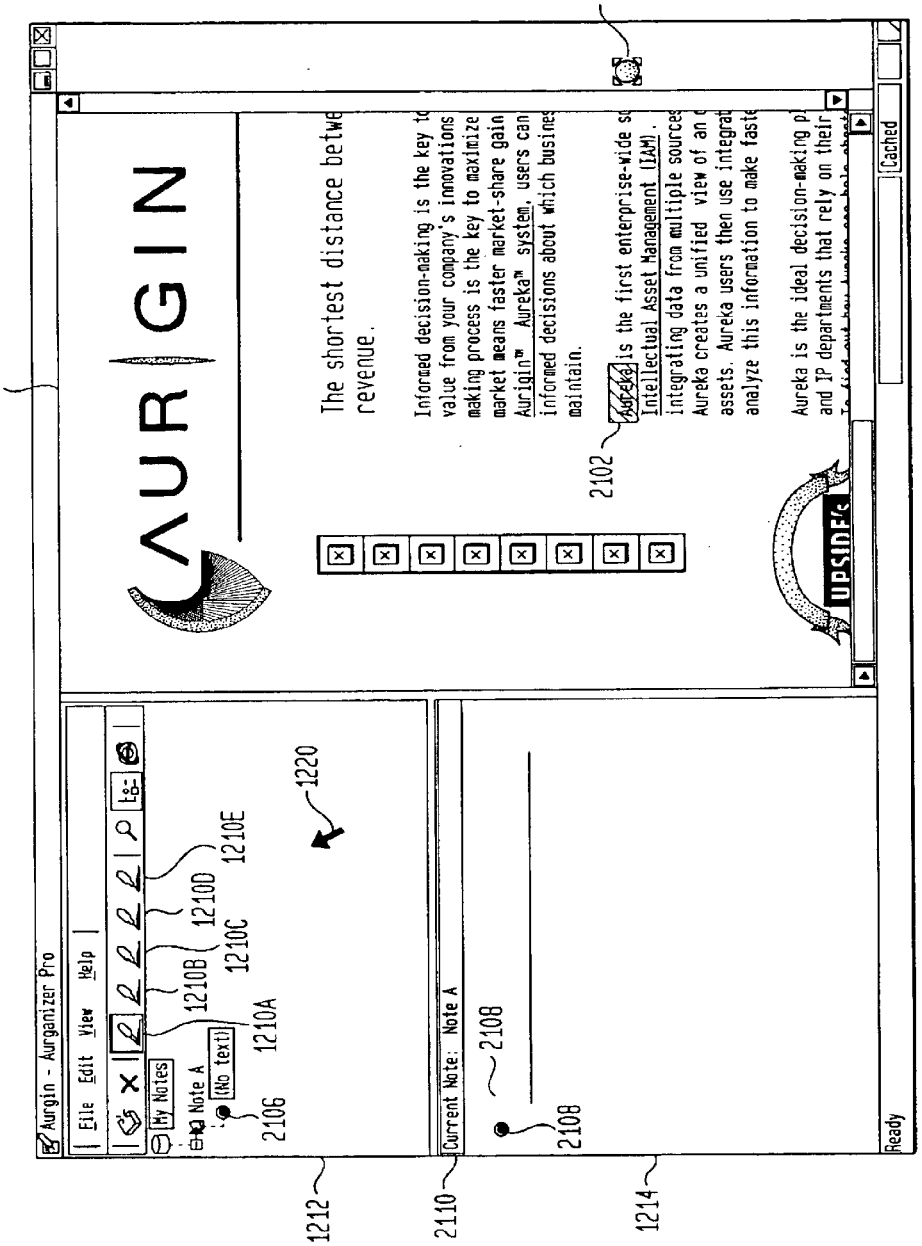
FIGS. 21 and 22 illustrate the operation of the present invention on the creation of a new sub-note and the linking of the sub-note to the selected portion of the Web page according to a preferred embodiment of the present invention.

Such operation is shown in FIG. 21. The user selects pen button 1210A, which is color coded using color 1106 (FIG. 11). The user selects text 2102, which is a portion of Aurigin's home Web page displayed in the Web page window 1208. The Web annotation system 502 instructs the application associated with the Web page window 1208 to color code the selected text 2102 using the same color as the pen button 1210A, i.e., color 1106.

The Web annotation system 502 creates a new note, called Note A, and displays Note A in the notes text window 1214. The notes text window 1214 has a current note title field 2110 in which the title of the note (i.e., Note A) is displayed. The date and time Note A was created and last modified can be displayed in the note page 1904 of the properties menu 1902 (FIG. 19). The Web annotation system 502 creates a new sub-note with a linking button with the color 1106 and the symbol 1108 (associated with color 1106). This linking button (with color 1106/symbol 1108) is positioned in three locations. The locations are in the notes/Web page directory window 1212 as a linking button 2106, in the notes text window 1214 as a linking button 2108, and outside the Web page window next to the selected text 2102 as linking button 2104. The Web annotation system 502 links the linking buttons 2104–2108 to the selected text 2102.

At this point the user types in the desired content for the sub-note associated with liking buttons 2104–2108 in a content area 2108 in the notes text window 1214. Once the user is finished typing in the desired content in the active content area 2108, the same content is displayed next to the linking button 2106 in notes/Web page directory window 1212 and replaces "no text." This result will be shown in FIG. 22.

Alternatively, instead of the content of a sub-note being displayed next to the linking button 2106 in notes/Web page directory window 1212, the user can have the present invention display either the linked Web page's title or the linked Web page's URL. The user can change the option displayed by using the options menu 1712 and sub-notes page 1704 (FIG. 17).

Linking button 2104, associated with the selected text 2102, is used to navigate to and display the sub-note (i.e., under Note A) that is linked to the selected text 2102. At any time, if the user wishes to view the sub-note linked to the selected text 1202, then the user need only click on one of the linking buttons 2104–2108. This causes the Web annotation system 502 to display Note A and the associated sub-note in the notes/Web page directory window 1212 and the notes text window 1214.

Figure 22:
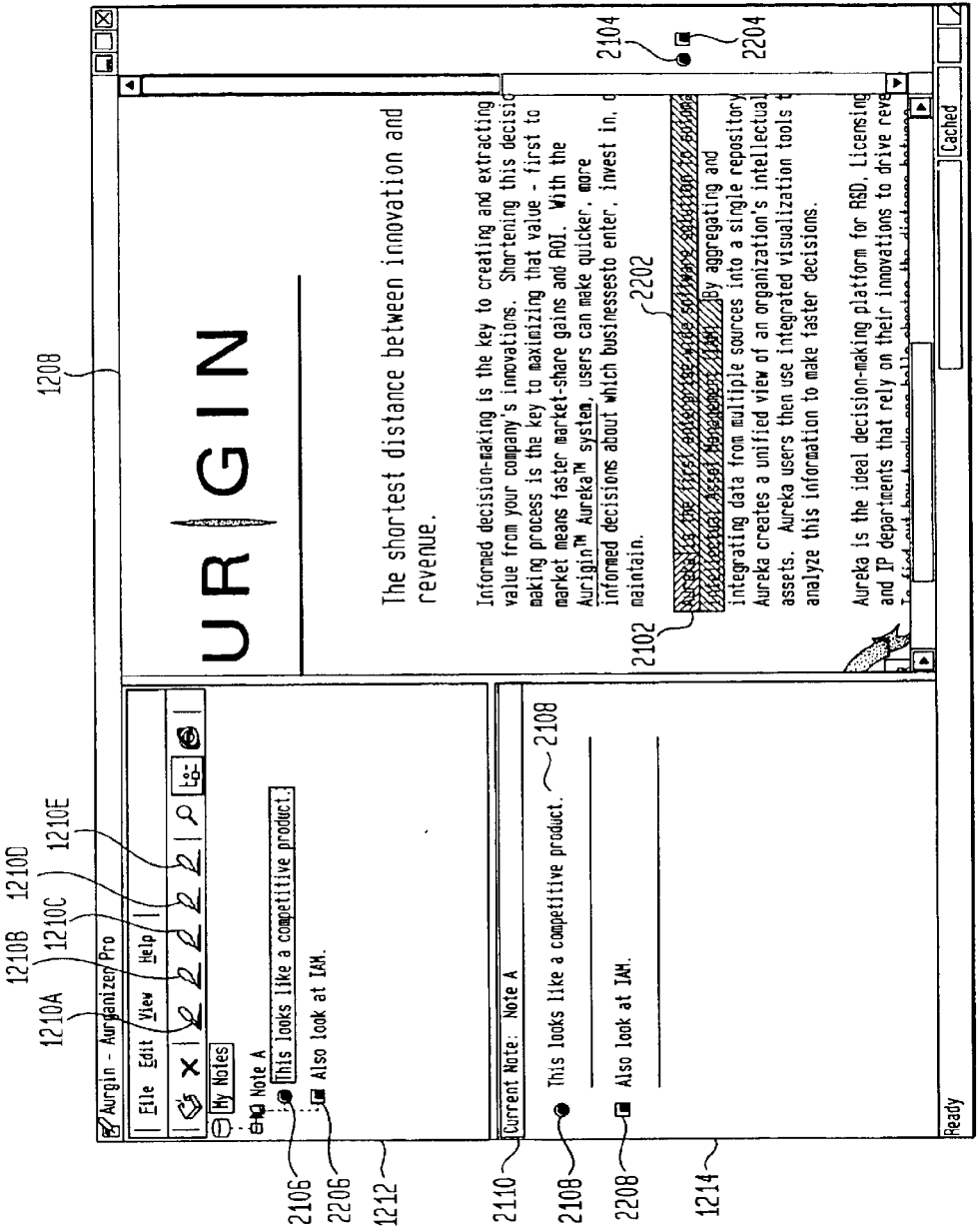

FIG. 22 continues the scenario of FIG. 21. In FIG. 227, the user selects pen button 1210B, which is color coded using color 1110 (FIG. 11). The user selects text 2202, which is a portion of Aurigin's home Web page displayed in the Web page window 1208. The Web annotation system 502 instructs the application associated with the Web page window 1208 to color code the selected text 2202 using the same color as the pen button 1210B, i.e., color 1110. The Web annotation system 502 creates a second sub-note with a linking button with the color 1110 and the symbol 1112 (associated with color 1110). This linking button (with color 1110/symbol 1112) is positioned in three locations. The locations are in the notes/Web page directory window 1212 as a linking button 2206, in the notes text window 1214 as a linking button 2208, and outside the Web page window next to the selected text 2202 as linking button 2204. The Web annotation system 502 links the linking buttons 2204–2208 to the selected text 2202. At this point the user types in the desired content for the second sub-note associated with linking buttons 2204–2208.

Note that this second sub-note is added to existing Note A, because Note A was being displayed when the user selected text 2202. Also note that selected text 2202 overlaps with selected text 2102. The present invention allows portions in a Web page that are to be linked with sub-notes to be distinct, to partially overlap, or to completely overlap. Such functionality of the invention enables users to precisely associate sub-notes with portions in Web pages.

Sub-notes in a note can be linked to portions of Web pages associated with different applications. This is done in a similar manner as described in U.S. Pat. No. 5,806,079, incorporated herein by reference. Thus, the invention can be used to mark or "bookmark" text based and non-text based Web pages for fast reference and retrieval.

As will be apparent from the foregoing, the Web annotation system 502 can operate with any application that supports the interface 510 (FIG. 5). The interface 510 preferably uses the JScript and DHTML standards. Both of these standards are also based on the COM. It should be understood, however, that the Web annotation system 502 is not limited to use with the JScript and DHTML standards. The Web annotation system 502 can be used with any standard that allows one software application to interact with another.

4.4 Viewing Notes, Sub-Notes, and Data Objects

In a preferred embodiment, the present invention supports a view mode for displaying the contents of the notes database 508 that is designed to be like a sheet of paper that the user can write his notes on. Other view modes that the present invention supports include a note centric view, an object centric view, and a link centric view, all of which are described in detail in U.S. Pat. No. 5,806,079.

Figure 23:
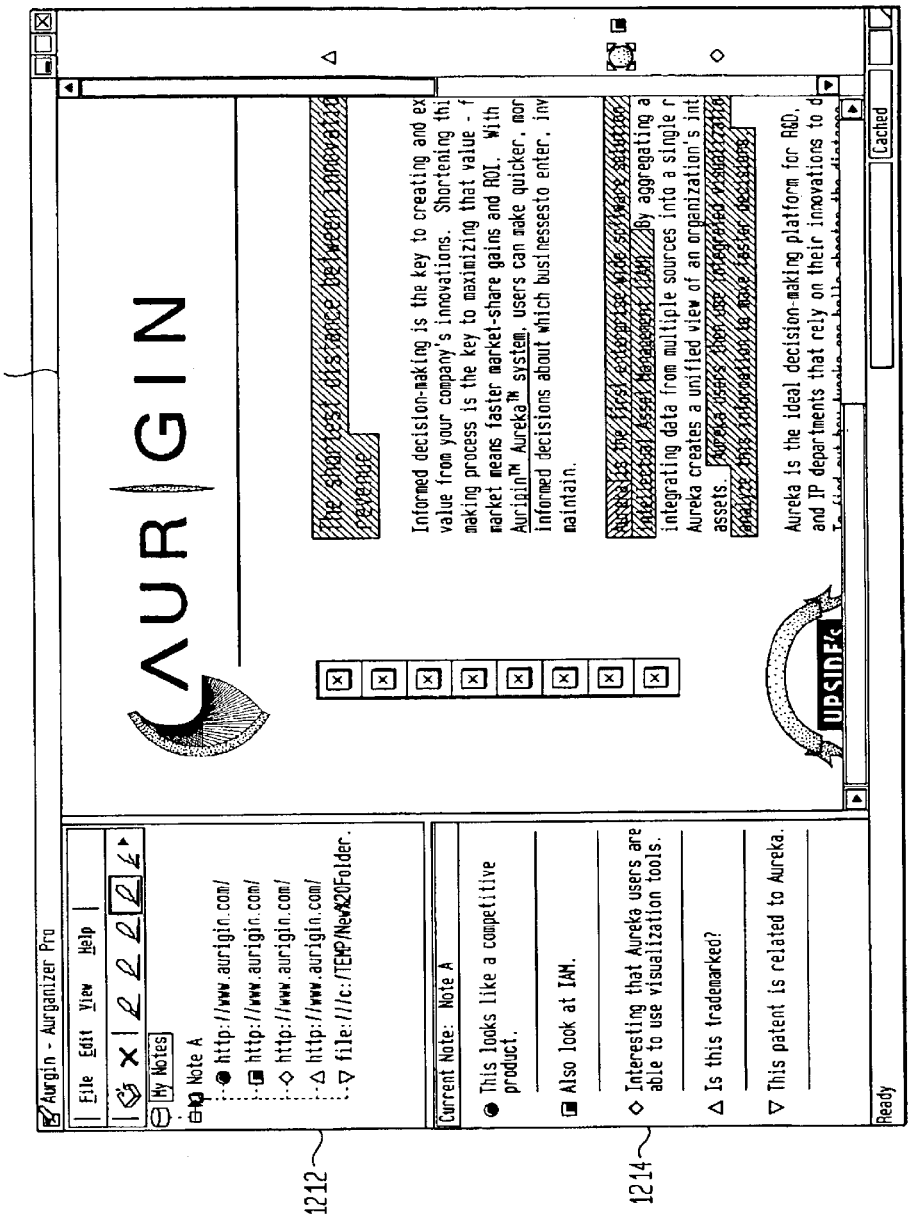
FIG. 23 illustrates the view mode of the present invention according to a preferred embodiment.

The view mode designed to be like a sheet of paper is further described with reference to FIG. 23. The present invention maintains the notes in the order in which the user created them (unless reordered by the user as will be described below). Referring to FIG. 23, the order in which the user created the notes is maintained in the notes/Web page directory window 1212 and the notes text window 1214. Note that this is true, regardless of the order of the links and their associated text in the Web page window 1208.

4.5 Editing Note/Sub-Note Organization

The invention includes many flexible features and functions for modifying and replicating the note grouping/note/sub-note hierarchy. These are described below.

4.5.1 Modification

The invention enables users to modify the note grouping/note/sub-note hierarchy. In other words, the invention enables users to switch or copy notes from one note grouping to another, or switch or copy sub-notes from one note to another.

One way in which a user can modify the note grouping/ note/sub-note hierarchy is move sub-note from one note to another by using well known copy/cut and paste operations (via the cut, paste, and delete commands on the edit menu 1502 (FIG. 15)). Also, a user can change the linkage and/or order between sub-notes and Web page portions by clicking and dragging the linking buttons.

4.5.2 Replication

A great deal of time and effort may go into the creation of a note grouping/note/sub-note hierarchical database. Typically, a database is specific to a particular task or project. However, it is often the case that parts of a database are applicable to another task or project. For efficiency purposes, users would like to reuse a database generated for one project to the extent possible in another project. Users may also want to e-mail copies of notes and sub-notes to other users. The invention provides powerful tools for enabling a user to identify and replicate portions of an existing database that may be relevant to another project. These replicated portions constitute the foundation of a new hierarchical database.

In some cases, a user may already know which parts of a database are pertinent to another project. In such cases, the user may select those parts and replicate (copy) them to a new database. Here, the user may select just those parts and e-mail a copy of them to one or more users. As discussed above with reference to FIG. 14 and file menu 1402, the user is able to send via e-mail a copy of portions of the note database 508 to other users by using a "send to" command in the file menu 1402. If the user sends an e-mail to another user, the recipient gets copies of all of the notes and Web pages necessary to display the information that is sent. The user can also save AWN (Aurigin Web Note) files. These files can be generated using the "export" command in the file menu 1402. Here, the "sent to" command simply mails an AWN file to the other user.

Figure 25:
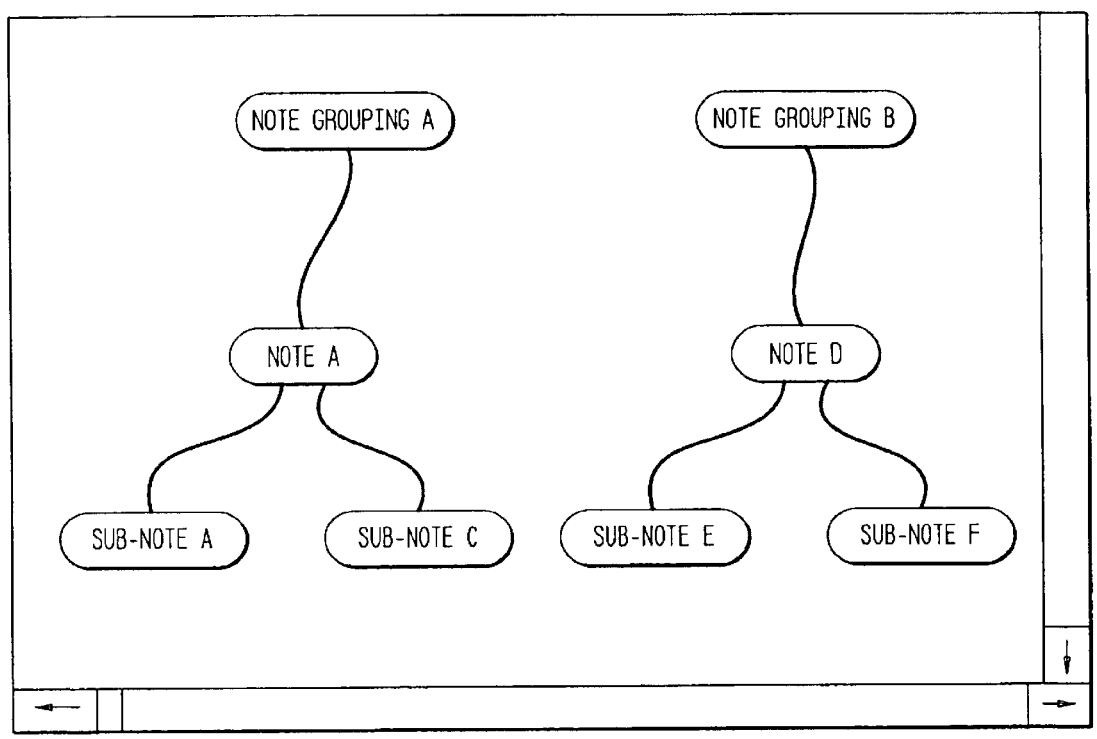
FIG. 25 illustrates the results of a replication operation according to a preferred embodiment of the present invention.

In other cases, the user does not know which parts of a database are pertinent to another project. In these cases, the user can use the invention's searching capabilities to identify note groupings, notes, sub-notes, and/or Web page portions that are relevant to this other project. The user can then replicate these identified note groupings, notes, sub-notes, and Web page portions to a new database. FIG. 25 illustrates a new database that was created based on a search conducted on the example database of FIG. 29. The invention supports searching based on key words, date/time of creation/ modification, creator, icon tags, color, shape, Web page title, note title, content, etc. The searching capabilities of the invention are discussed below.

4.6 User Interface

Figure 24:
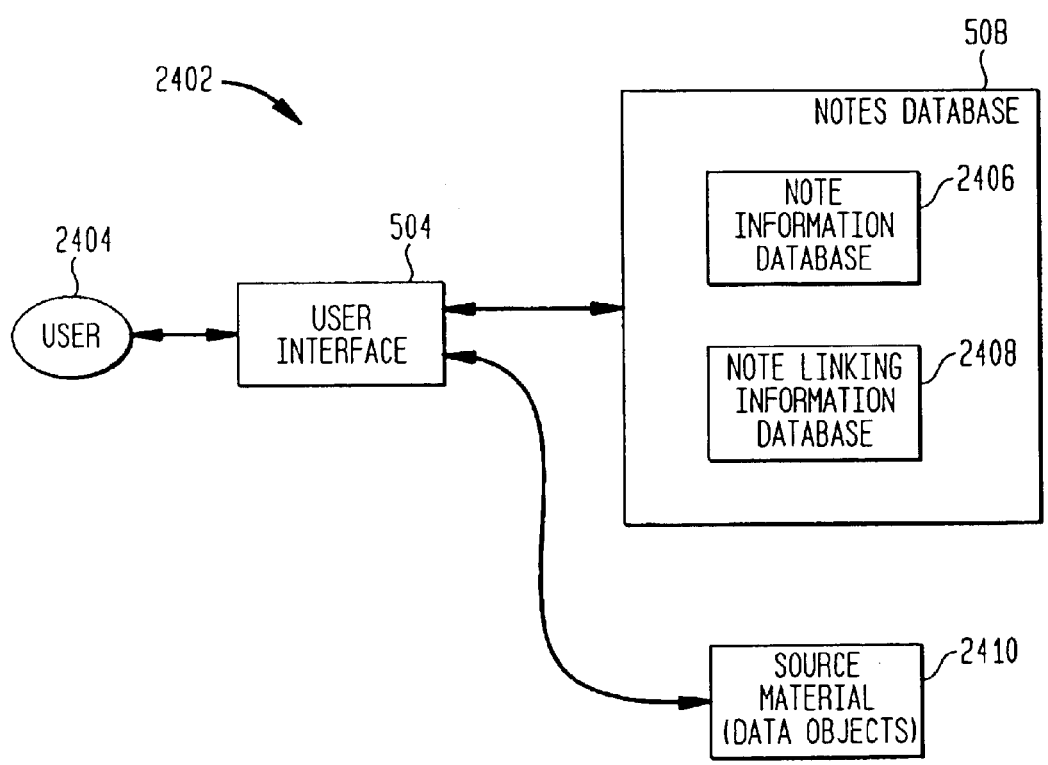
FIG. 24 is a block diagram illustrating the effects of a user interface of the present invention according to a preferred embodiment.

As discussed above, the Web annotation system 502 includes a user interface 504. Referring to FIG. 24, the user interface 504 enables a user 2404 to interact with the notes database 508 and source material 2410, representing Web pages (these Web pages may be stored in Web pages database 509). The user 2404 interacts with the user interface 504 so as to create note groupings, notes, and sub-notes, establish and modify the note grouping/note/sub-note hierarchy, establish and modify the links between sub-notes and Web page portions, and in all other ways interact with the notes database 508 and the source material 2410.

It is very important that the user interface 504 provide the user 2404 with an easy to use (i.e., user friendly) interface to the notes database 508, the source material 2410, and to the features and functions provided by the Web annotation system 502. If the user interface 504 is user friendly, then the user 2404 is more likely to utilize the Web annotation system 502 to document his thinking and work product.

The user interface 504 may be implemented using any user interface tools, approaches, techniques, technology and/or applications that currently exist, or that will be developed in the future. In one embodiment, the user interface 504 is implemented as a computer based graphical user interface (GUI). Example screen shots from this GUI are shown in FIGS. 12–23.

In another embodiment, the user interface 504 is implemented in whole or in part using virtual reality (VR) technology. Significant VR technology has been developed, and more is currently being developed. Virtual reality is discussed in many publicly available documents, such as *Virtual Reality Applications and Explorations*, edited by Alan Wexelblat, Academic Press, Cambridge, Mass., 1993, and *On the Cutting Edge of Technology*, Sams Publishing, Carmel, Ind., 1993 which are incorporated herein by reference in their entities.

It should be understood, however, that the invention is adapted and intended to operate with other user interface technology that currently exists, or that will be developed in the future.

Figure 26:
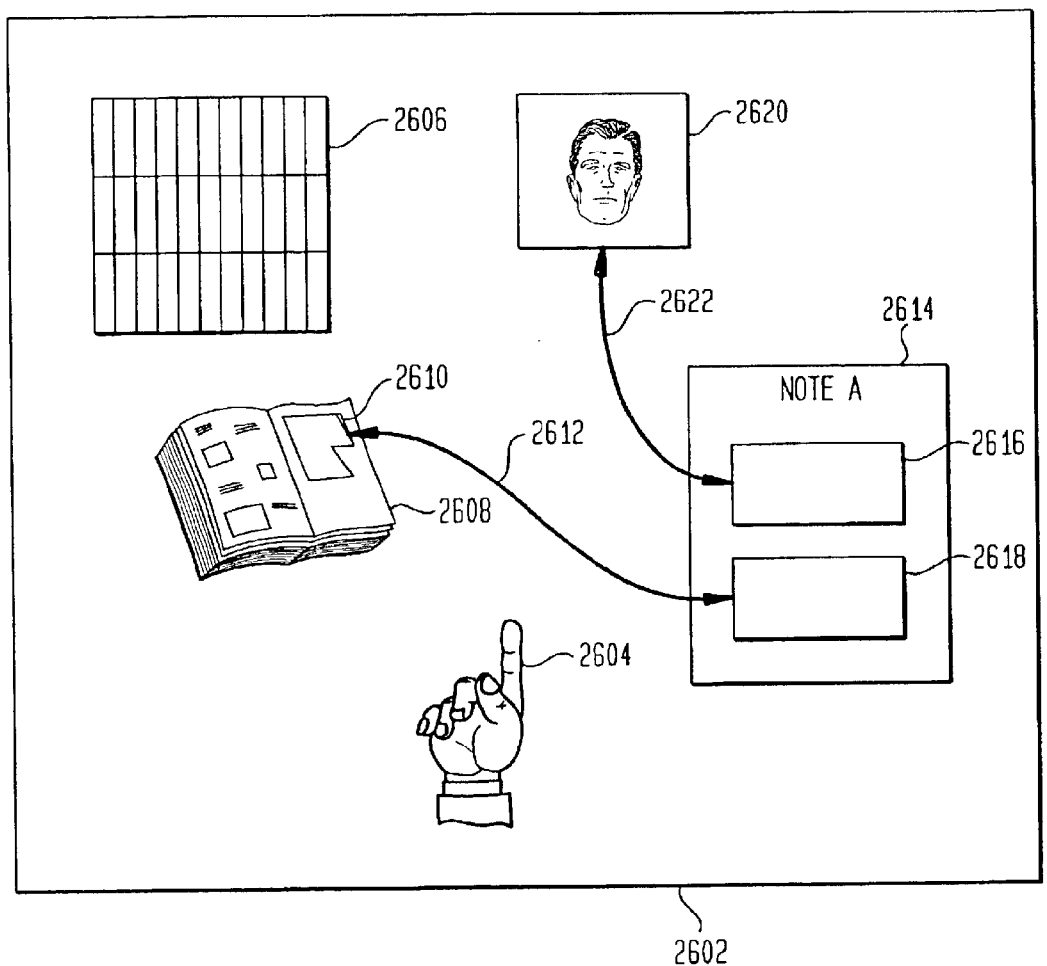
FIG. 26 illustrates an example virtual reality environment according to an embodiment of the present invention.

FIG. 26 represents an example VR scenario 2602 according to a preferred embodiment of the invention. The user is represented in VR scenario 2602 by a hand 2604. As will be appreciated by persons skilled in the VR arts, the user selects and manipulates objects in the VR world of FIG. 26 by using the virtual hand 2604, just like the user selects and manipulates objects in the real world using his own hand. Other techniques for manipulating objects in the VR world will be apparent to persons skilled in the VR arts. For example, manipulation may be accomplished by voice command, or by thought (tied to brain waves or brain impulses), or by body gestures, etc.

In the example of FIG. 26, the user selects a book 2608 from a library 2606. The user opens the book 2608 until a passage 2610 of interest is found. The user selects this passage 2610 and then links this passage 2610 to a sub-note 2618 in Note A. Such linkage may automatically occur upon the selection of the passage 2610 (since such selection results in the creation of sub-note 2618, and in the creation of the link between sub-note 2618 and the passage 2610, as described above). Alternatively, the user can link passage 2610 with sub-note 2618 by moving the hand 2604 from the passage 2610 to the sub-note 2618.

The user can enter comments into the sub-note 2618 using any input mechanism or procedure, such as typing on a real or virtual keyboard, audibly dictating the comments, etc.

Any of the displays and screen shots discussed herein, such as those shown in FIGS. 12–23, can be displayed and manipulated in the VR world. The user can manipulate the items and objects in those displays via the VR hand 2604 or any other virtual construct, instead of or in addition to a computer (physical or virtual) keyboard and mouse. The combination of the Web annotation system 502 with virtual reality creates a very powerful, user friendly application.

In the discussion herein, the user is often said to issue a command, press a button, select an option from a menu, review a computer display, input/key in information or commands, or perform some other type of action that requires interaction with the computer. It should be understood that, according to the present invention, such interaction can be achieved using any type of user interface, including a conventional computer interface (using a keyboard and mouse, for example), or a virtual reality interface, as just described above.

4.7 Security

In one embodiment of the present invention, security is not addressed. Yet in another embodiment, the invention may include many functions, features, and capabilities to maintain the security of the information contained in the note database 508. These security features can generally be categorized as follows: (1) security on individual note groupings, notes, sub-notes, links, and objects; and (2) security of the note database 508 as a whole. These two security features are discussed below.

4.7.1 Security on Individual Note Groupings, Notes, Sub-notes, Links, and Web pages A person, group, or organization may wish to limit access to note groupings, notes, sub-notes, links, and/or Web pages. Only people or groups who satisfy some specified criteria would have access to such note groupings, notes, sub-notes, links, and/or Web pages. The present invention supports features for securing individual note groupings, notes, sub-notes, links, and Web pages.

A note grouping, note, sub-note, link, or Web page may be secured based on a number of criteria, including creator, owner, password, security level, or any other well known security criteria. For example, if a sub-note is secured based on the creator criteria, then only the creator may access the sub-note. If a sub-note is secured based on password, then only persons who have the correct password may access the sub-note. If a sub-note is secured based on security level, then only persons having the appropriate security level will have access to the sub-note.

In one embodiment, a person or group who satisfies the current security criteria for a note grouping, note, sub-note, link, or Web page may modify the security criteria for the note grouping, note, sub-note, link, or Web page. In other embodiments, only persons or groups who have satisfy a specified, alternate security criteria (such as administrators) may change existing security criteria.

If a note grouping is secured, then only persons who satisfy the specified criteria may gain access to the note grouping, and the notes, sub-notes, and connectors/links contained in the note grouping.

If a note is secured, then only persons who satisfy the specified criteria may gain access to the note, and the sub-notes and connectors/links contained in the note.

If a sub-note is secured, then only persons who satisfy the specified criteria may gain access to the sub-note, and the link contained in the note.

If a link (that links a sub-note to a Web page portion) or a connector (that establishes the note grouping/note/sub-note hierarchy) is secured, then only persons who satisfy the specified criteria may gain access- to and traverse the link/connector.

Figure 27:
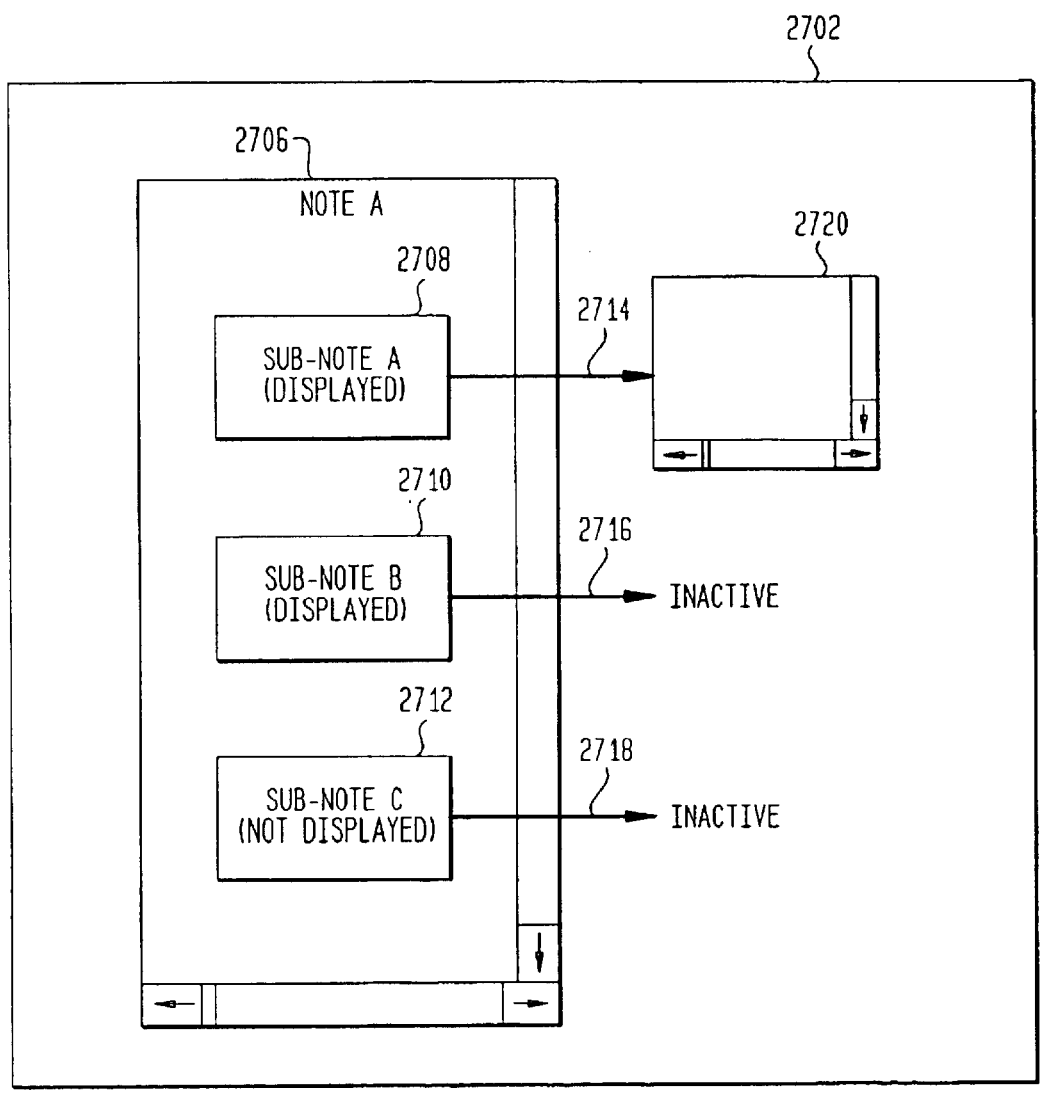
FIG. 27 illustrates the effect of security/privacy features of the invention according to a preferred embodiment.

This effect of security is illustrated in the example of FIG. 27. Note A is displayed in a note window 2706. It is assumed that Note A is not secured, or that the current user satisfies the security criteria associated with Note A. Note A includes Sub-notes A, B, and C. It is assumed that Sub-notes A and B are not secured, or that the current user satisfies the security criteria respectively associated with Sub-notes A and B. Accordingly, Sub-notes A and B are displayed. Sub-note C is secured. However, the current user does not satisfy the security criteria of Sub-note C. Thus, Sub-note C is not displayed.

It is assumed that the current user satisfies the security criteria respectively associated with link 2714. Thus, the link 2714 is active. The current user may manipulate and traverse link 2714. Thus, the Web page associated with link 2714 is displayed in application window 2720. The current user does not satisfy the security criteria of link 2716. Thus, link 2716 is inactive. The current user may not manipulate or traverse link 2716. Thus, the Web page associated with link 2716 is not displayed. It is irrelevant whether the current user does or does not satisfy the security criteria of link 2718. In either case, link 2718 is inactive since its Sub-note C is inactive (in other embodiments, the security state of a link is separate and distinct from the security state of its sub-note).

4.7.2 Security on the Note Database as a Whole

According to some embodiments of the present invention, the notes database 508 is stored in a single computer. In other embodiments of the present invention, the notes database 508 is distributed among multiple databases. Procedures and technology for distributing the notes database 508, and for working with the distributed notes database 508, will be apparent to persons skilled in the relevant art(s).

In some circumstances, the distribution of the notes database 508 is advantageous for implementation, performance, and robustness reasons. The motivations and advantages of distributed database systems in this regard are well known.

According to the present invention, the notes database 508 is also distributed for security reasons. In some situations, it is necessary to maintain the confidentiality and secrecy of the notes database 508. Distributing the notes database 508 aids in this effort, and it ensures that the inadvertent or improper disclosure of one part of the notes database 508 maintained at one site does not result in the disclosure of the other parts of the notes database 508 at other sites.

In some cases, it is critical that the linkage information contained in the notes database 508 be kept secret. The present invention utilizes techniques in addition to the data distribution approached described above to secure the linkage information in the notes database 508. These additional techniques also relate to data distribution.

In particular, the present invention preferably partitions the notes database 508 into a note information database 2406 and a note/object linking information database 2408. The note/object linking information database 2408 contains the linkage information that specifies how sub-notes are linked to Web page portions. The note information database 2406 includes all information about notes and sub notes except for the linkage information.

The note information database 2406 is distributed among a first set of sites. The note/object lining information database 2408 is distributed among a second set of sites. The first and second sets of sites may be the same, may be completely different, or may be partially the same.

Figure 28:
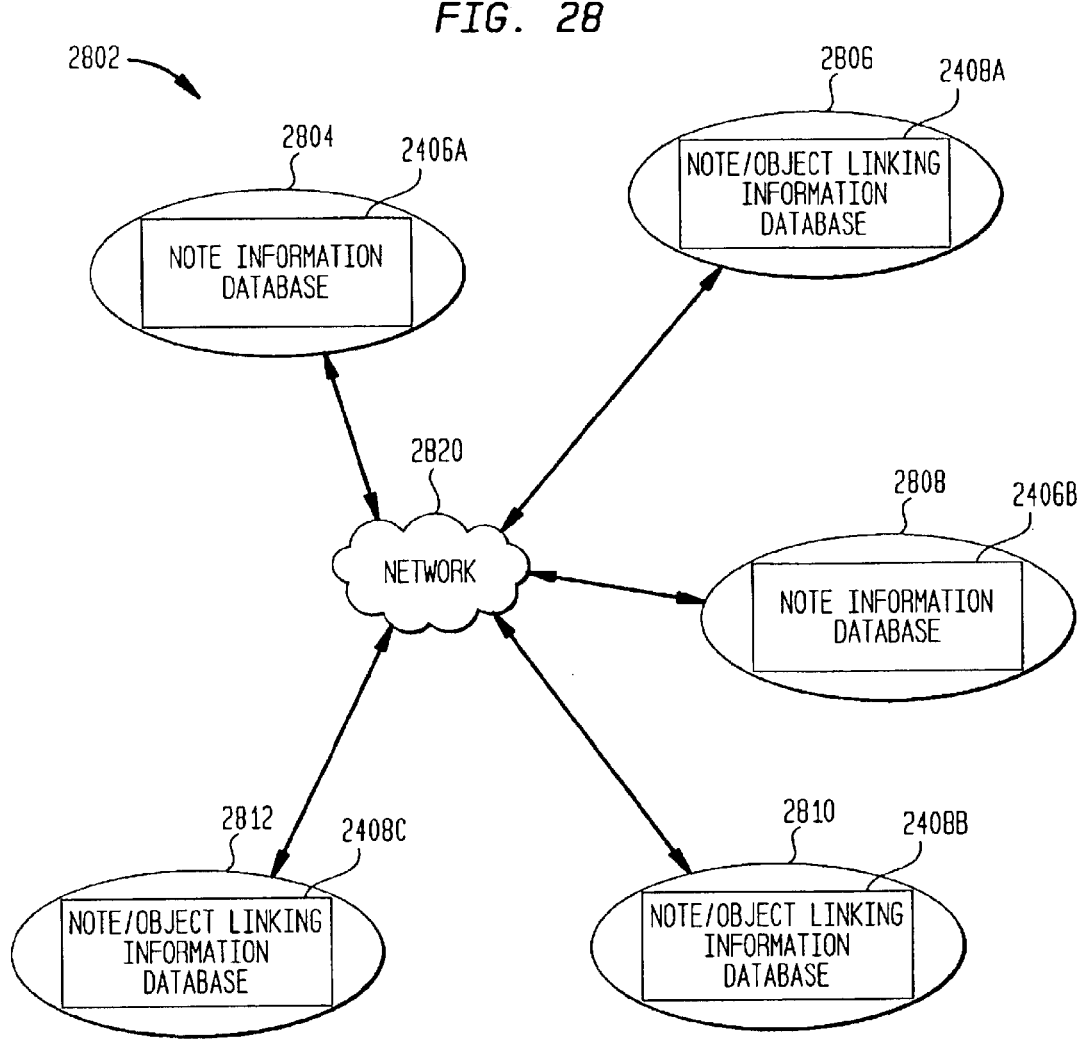
FIG. 28 illustrates an example implementation of the invention according to a preferred embodiment.

FIG. 28 illustrates an example implementation of the invention. In this example, the note information database 2406 is distributed among sites 2804 and 2808. The note/object linking information database 2408 is distributed among sites 2806, 2810, and 2812. These sites are connected via a network 2820, which may represent any type of communication medium in any form or configuration, such as a public network (the Internet, for example), a private network (such as a virtual network), dial up telephone lines, etc. The communication medium can include any type of communication links, such as fiber optics, coaxial cable, wireless, satellite links, etc., or any combination of these.

The invention uses other techniques for securing the notes database 508. In some embodiments, for example, all or part of the notes database 508 is encrypted. For example, references contained in the note information database 2406 to the note/object linking information database 2408 are encrypted using any well known encryption mechanism or algorithm, such as key encryption. Encryption of the notes database 508 is further described below.

4.8 Search Capabilities

The invention supports powerful search features for identifying note groupings, notes, sub-notes, links, and/or Web pages that satisfy user supplied search criteria. Users can perform key word searches, searches based on date/time of creation or modification, searches based on icon tagging (icons can be predefined or user defined), searches based on creator or owner, searches based on security/privacy levels, color, shape, Web page title, etc. Preferably, sub-notes are indexed and searchable. Also, fields (predefined or user defined) within note groupings, notes, and sub-notes are indexed and searchable.

The user can limit the search to a user-defined path through the note/sub-note hierarchy (for example, the user can limit the search to a path that starts with a user specified note grouping, note, sub-note, link, etc.).

The operation of the search capabilities of the present invention are described further below.

5. Notes Database

A detailed implementation of the notes database 508 according to an embodiment of the present invention shall now be described. As stated above, with reference to FIG. 8, the notes database 508 (as well as the Web pages database 509) are implemented as functional objects. Conceptually, note repository object 804, note object 806, sub-note object 808, content object 810, and anchor object 812 make up the notes database 508. The content object 810 stores data that conveys information. These data are user definable and includes at least information that explains the rationale for linking the sub-note object 808 to a portion of the Web page object 818. The data stored in the content object 810 can be any format or combination of formats, such as text, sound, video, image, executable program, tactile (such as braille), etc. The anchor object 812 is linked by a bookmark link 820 to the Web page object 818. According to the present invention, the bookmark link 820 is bi-directional.

Each note object 806 contains data including its title, the date and time of creation, the data and time of last modification, a listing of all of its sub-notes, etc. Each sub-note object 808 also contains data including its title, the date and time of creation, the data and time of last modification, its content object, its anchor object, privacy settings, etc. The anchor object contains data including the color and which pen was highlighted when the pointer 1220 was used to select the selected portion to which the sub-note is linked, etc.

Figure 30:
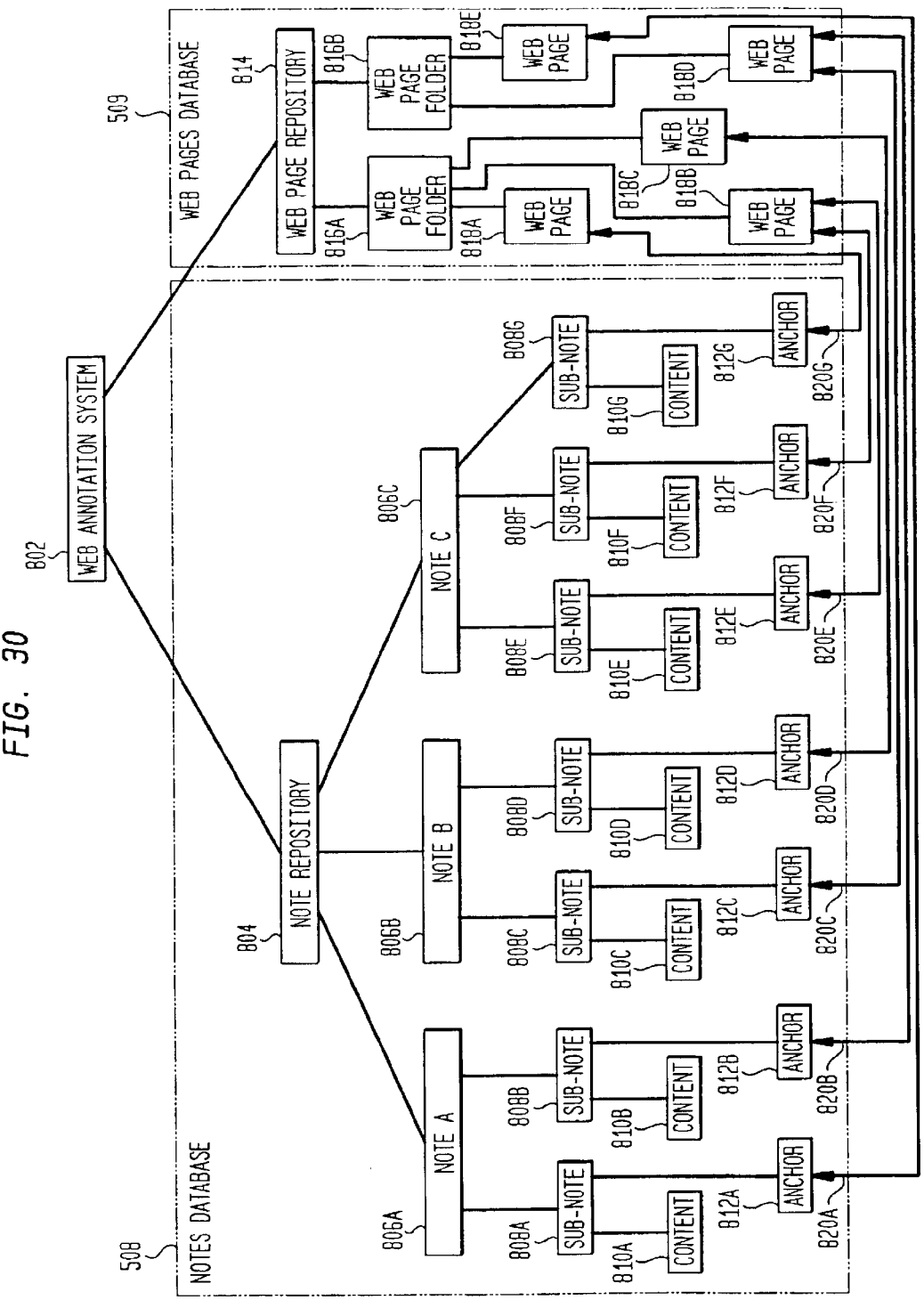
FIG. 30 illustrates an example notes database according to a preferred embodiment of the present invention.

FIG. 30 illustrates an example notes database 508 that stores Notes A, B, and C. As described above with reference to FIG. 8, the user interface 504 (FIG. 5) creates, updates, and deletes objects in the Web annotation system 502 preferably using the COM interfaces. In order to do this, the user interface 504 must first gain access to a functional object through the top level object, namely the Web annotation system object 802. The Web annotation system object 802 can return to the user interface 504 the note repository object 804 and/or the Web page repository object 814. Once the user interface 504 has either the note repository object 804 or the Web page repository object 814, it can use either of these (based on its interface) to: navigate to other objects, create child objects, remove child objects, and modify child objects.

In FIG. 30, the note repository object 804 includes three note objects, namely a note A object 806A, a note B object 806B, and a note C object 806C. The note A object 806A is comprised of two sub-note objects, namely sub-note object 808A and sub-note object 808B. The sub-note object 808A comprises a content object 810A and an anchor object 812A. The sub-note object 808B comprises a content object 810B and an anchor object 812B.

The note B object 806B is also comprised of two sub-note objects, namely sub-note object 808C and sub-note object 808D. The sub-note object 808C comprises a content object 810C and an anchor object 812C. The sub-note object 808D comprises a content object 810D and an anchor object 812D.

The note C object 806C is comprised of three sub-note objects, namely sub-note object 808E, sub-note object 808F, and sub-note object 808G. The sub-note object 808E comprises a content object 810E and an anchor object 812E. The sub-note object 808F comprises a content object 810F and an anchor object 812F. The sub-note object 808G comprises a content object 810G and an anchor object 812G.

In order to more fully explain the notes database 508 (and the relationship between notes and portions of Web pages of the present invention), an example Web pages database 509 is also shown in FIG. 30. As stated above with reference to FIG. 8, Web page repository object 814, Web page folder object 816, and Web page object 818 conceptually make up Web pages database 509. In FIG. 30, Web page repository object 814 includes two Web page folders, namely Web page folder object 816A and Web page folder object 816B. The Web page folder object 816A comprises a Web page object 818A, a Web page object 818B, and a Web page object 818C. The Web page folder object 816B comprises a Web page object 818D and a Web page object 818E.

Bookmark links will next be discussed with reference to FIG. 30. Note that in a preferred embodiment of the present invention, the bookmark links are bi-directional links. A bookmark link 820A links together the sub-note object 808A (and its content object 810A) with the portion of a Web page it relates to, namely a portion of the Web page object 818E. A bookmark link 820B links together the sub-note object 808B with a portion of the Web page object 818D. In a similar manner, a bookmark link 820C also links together the sub-note object 808C to a portion of the Web page object 818D. Note that sub-note object 808B and sub-note object 808C are both linked to the same Web page object 818D. The portion of Web page object 818D that sub-note object 808B and sub-note object 808C are linked to can be the same portion, can be different portions, or can be two portions that overlap.

A bookmark link 820D links together the sub-note object 808D with a portion of the Web page object 818C, a bookmark link 820E links together the sub-note object E with a portion of the Web page object 818B, a bookmark link 820F links together the sub-note object F with a portion of the Web page object 818B, and finally, a bookmark link 820G links together the sub-note object G with a portion of the Web page object 818A.

The notes database 508 could be implemented in ways other than that shown in FIG. 30, and described above. In particular, the notes database 508 could be implemented using any well known data structure or organization. Various data structures are described in many publicly available documents, such as Niklaus Wirth, *Algorithms+Data Structures=Programs*, Prentice Hall, 1976, which is herein incorporated by reference in its entirety.

6. Operation of the Invention

Figure 31:
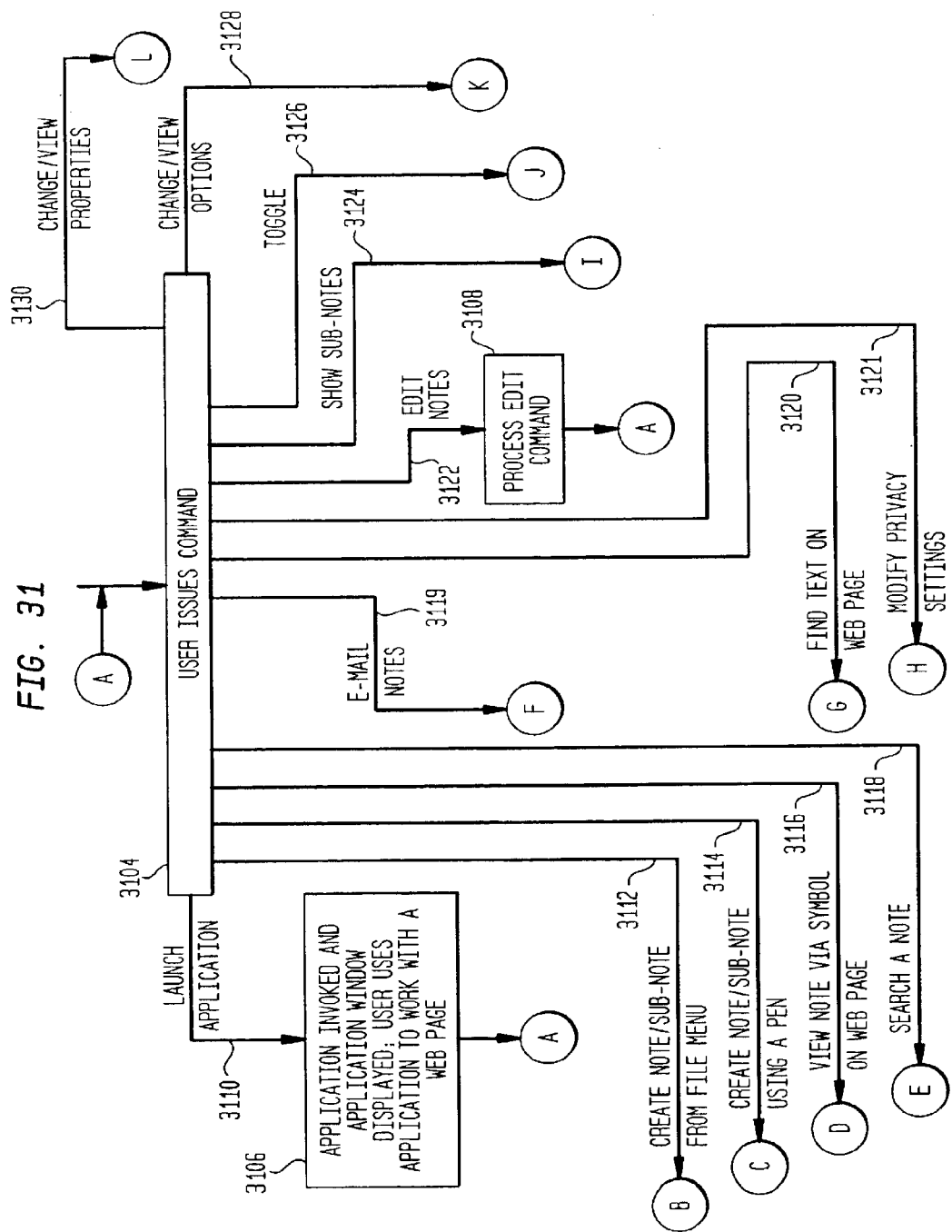
FIGS. 31–42 are flowcharts depicting a preferred operation of the present invention.

The operation of the present invention shall now be described with reference to a flowchart 3102 shown in FIG. 31. Flowchart 3102 illustrates the manner in which a user interacts with the Web annotation system 502 to organize Web pages, and to manipulate notes attached to portions of Web pages.

Such user interaction with the Web annotation system 502 is preferably achieved through interaction with a user interface 504 that forms part of the Web annotation system 502. As apparent from the discussion below, the user interface 504 of the present invention is very powerful and flexible. In particular, the user interface 504 allows users to access the functionality of the Web annotation system 502 in any number of ways. Accordingly, the operational steps shown in flowchart 3102 and in other flowcharts discussed below represent one way (i.e., one operational sequence) of accessing the functions provided by the Web annotation system 502. Users may access and traverse the functions provided by the Web annotation system 502 in any number of other ways via interaction with the menus provided by the user interface 504. Such other ways (Le., such other operational sequences) will be apparent to persons skilled in the relevant art(s).

In step 3104, the user issues a command to an operating system executing in the computer system 602. The user may issue this command via a keyboard or a well known point-and-click approach, or via a body gesture, thought, or voice command when using a VR user interface, or via any other well known means for entering a command.

If the user issued a command to launch an application, then control line 3110 is taken. If the user issued a command to create a new note/sub-note, and this command was issued using the file menu 1402, then control line 3112 is taken. If the user issued a command to create a new note/sub-note, and this command was issued using a pen (such as pen 1210A in FIG. 12) or VR hand 2604 or the like, then control line 3114 is taken. If the user issued a command to view a note, and this command was issued by selecting a linking button in a Web page, then control line 3116 is taken. If the user issued a command to search a note, and this command was issued from the view menu 1602 or search button 1230, then control line 3118 is taken. If the user issued a command to e-mail a copy of a portion of notes database 508, and this command was issued from the file menu 1402, then control line 3119 is taken. If the user issued a command to find a specified text in the current Web page via edit menu 1502, then control line 3120 is taken. If the user issued a command to modify the privacy/security settings associated with a note grouping, note, sub-note, or link, then control line 3121 is taken. If the user issued a command to edit one or more notes via the edit menu 1502 or by clicking on the appropriate area in the notes text window 1214, then control line 3122 is taken. If the user issued a command to show sub-notes in the notes/Web page directory window 1212 via view menu 1602, then control line 3124 is taken. If the user issued a command to toggle between viewing notes or Web pages in the notes/Web page directory window 1212 via view menu 1602, then control line 3126 is taken. If the user issued a command to change or view options via the view menu window 1602, then control line 3128 is taken. If the user issued a command to change or view properties via the view menu window 1602, then control line 3130 is taken. These control flows and commands are discussed below.

6.1 Launch an Application

If the user in step 3104 issued a command to launch an application, then step 3106 is performed.

In step 3106, the operating system in the computer system 602 invokes the user-specified application in a well known manner. The application is preferably a Web browser, but may also be a word processing application, a spread sheet application, a database application, a communication application, a video/audio processing application, a financial application, etc. The invoked application displays an application window. Typically, the user commands the application to load a Web page, and uses the application to process the Web page.

In the user interface environment of the present invention, control from step 3106 may then flow to any number of directions. In some cases, control flows back to step 3104, as shown in FIG. 31.

6.2 Create a Note/Sub-note (From the File Menu)

Figure 32:
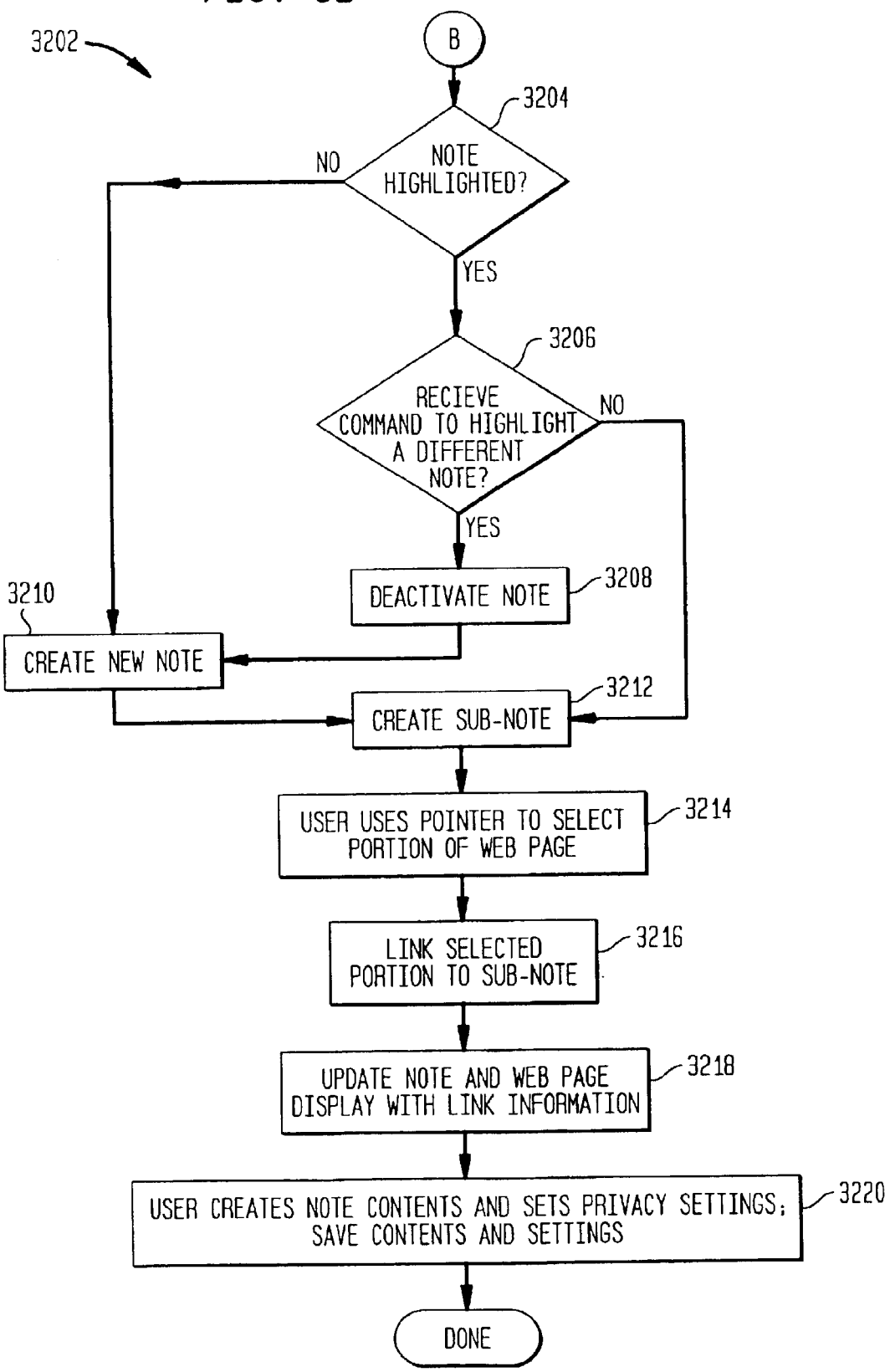

One way for the user to issue a command to create a new note or sub-note is to open the file menu 1402 (by pressing the file menu button 1222), and then select the "New Note" function or the "New Sub-Note" function. In response to this command, the Web annotation system 502 performs the steps of flowchart 3202 in FIG. 32.

In step 3204, the notes engine 506 of the Web annotation system 502 determines whether a note is currently highlighted in the computer display (i.e., the display unit 2826). That is, the notes engine 506 determines whether a note is currently active. If a note is not currently highlighted or active, then step 3210 is performed. Otherwise, step 3206 is performed.

In step 3206, the notes engine 506 determines whether the user has issued a command to highlight a different note (i.e., deactivate the note that was currently being highlighted). The user issues such a command if he wishes to insert the new sub-note in a new note, as opposed to the currently active note. If the notes engine 506 determines that the user has not issued a command to deactivate the note that is currently being highlighted, then step 3212 is performed (described below). In step 3212, the note currently being highlighted is called the active note for reference purposes. Otherwise, step 3208 is performed.

In step 3208, the notes engine 506 closes or deactivates the note.

Figure 33:
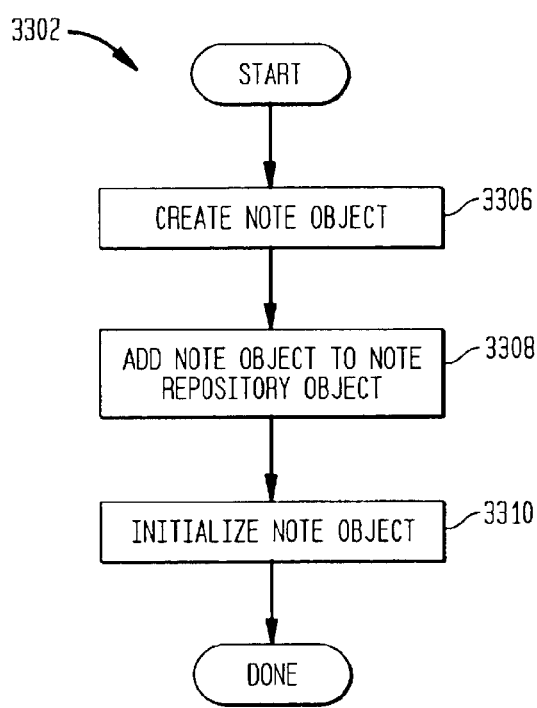

In step 3210, the notes engine 506 creates a new note. As represented by a flowchart 3302 in FIG. 33, the notes engine 506 creates a new note by creating and storing a new note object (such as note object 806 in FIG. 8) in the notes database 508 (step 3306). The notes engine 506 adds the new note object to the note repository object 804 (step 3308). Procedures for adding data to an object are well known. The notes engine 506 in step 3310 initializes the new note object by storing its title in the note object (this name is preferably entered by the user). At this point, the Web annotation system 502 may also prompt the user for security/privacy settings for the new note object. Any security/privacy settings input by the user are also stored in the new note object.

Also at this point, the Web annotation system 502 may receive from the user a command identifying a notes group (either existing or new) to which the Web annotation system 502 should add the new note object. If the user provides this information, then the Web annotation system 502 modifies the note grouping table 1090 (FIG. 10) accordingly.

Referring again to FIG. 32, also in step 3210, the user interface 504 displays the new note (i.e., note object) in the notes/Web page directory window 1212 and the notes text window 1214. The new note is called the active note for reference purposes.

Figure 34:
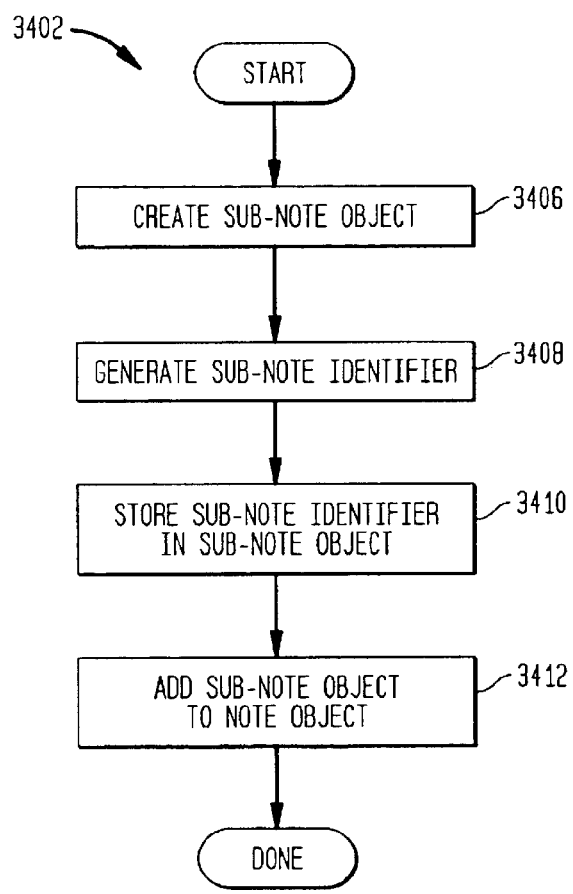

In step 3212, the notes engine 506 creates a new sub-note. As indicated in a flowchart 3402 in FIG. 34, the notes engine

506 creates a new sub-note by creating a new sub-note object (such as sub-note object 808 in FIG. 8) in step 3406. In step 3408, the notes engine 506 generates a sub-note identifier for the new sub-note object. The sub-note identifier is unique among all sub-note objects. The sub-note identifier may be composed of the title of the note (i.e., the active note) concatenated with the current date/time stamp. Other procedures for deriving the sub-note identifier could alternatively be used.

In step 3410, the notes engine 506 stores the sub-note identifier in the sub-note object. The notes engine 506 also stores information identifying the new sub-note object in the note object. In step 3412, the notes engine 506 adds the new sub-note object to the active notes object's sub-note objects. At this point, the notes engine 506 may also receive a command from the user indicating the privacy/security setting of the new sub-note object. If the user enters this information, then the notes engine 506 stores the privacy/ setting of the new sub-note object in the sub-note object.

Referring again to FIG. 32, the user interface 504 in step 3214 enables the user to link the new sub-note to a portion of a Web page. It may be necessary for the user to open the Web page in a well known manner prior to the performance of step 3214. Alternatively, the Web page may already have been opened by the user. In any case, in step 3214, the user selects one of the pen buttons 1210 in order to obtain a pen. The user then uses this pen to activate the pointer 1220 (in the manner discussed above) to select a portion of the Web page. Procedures for selecting portions of Web pages are well known. The procedure for selecting a portion of a Web page is dependent on the application associated with the Web page. The notes engine 506 commands the application associated with the Web page to color code the selected portion using the color associated with the pen.

Figure 35:
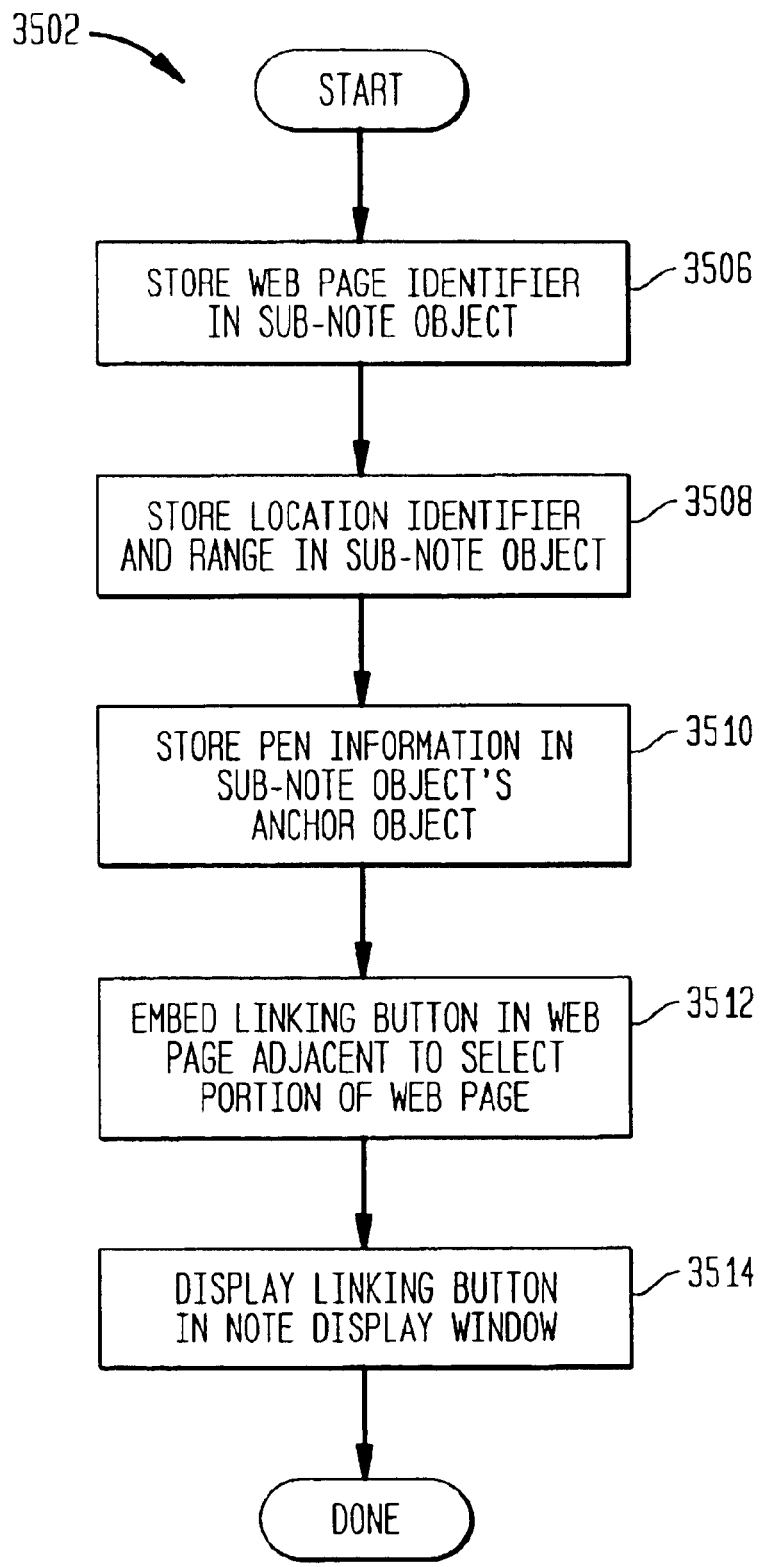

In step 3216, the notes engine 506 links the selected portion of the Web page object to the new sub-note object. In step 3218, the notes engine 506 updates the displays of the Web page and the active note so as to graphically reflect this linkage. The notes engine 506 performs steps 3216 and 3218 in the manner shown in a flowchart 3502 of FIG. 35.

In step 3506, the notes engine 506 stores information identifying the Web page in the sub-note object. This information may be the file name of the Web page, for example. The notes engine 506 may also store in the sub-note object information identifying the application associated with the Web page. The notes engine 506 may obtain the information to be stored in the sub-note object by querying the application associated with the Web page.

In step 3508, the notes engine 506 stores in the new sub-note object information that identifies the location of the selected portion in the Web page. If the Web page is a text document, for example, then this information may comprise page and line information. The notes engine 506 preferably obtains this location identification information by querying the application associated with the Web page. Also in step 3508, the notes engine 506 stores in the sub-note object information that indicates the range of the selected portion in the Web page.

As discussed above, in some embodiments the object identifier data, the location identifier data, and the range data are partitioned into the note/object linking information database 2408 (along with any link privacy settings). All other information is stored in the note information database 2406.

In step 3510, the notes engine 506 stores in the sub-note object's anchor object the pen data that identifies the pen that the user used in step 3214 to select a portion of the Web page. Preferably, the notes engine 506 stores pen data identifying the color of the pen, and the symbol associated with the pen. In one embodiment of the present invention, the notes engine 506 may store privacy/security settings information for the sub-note and/or the link, if the user enters this information.

In step 3512, the notes engine 506 commands the application associated with the Web page to display a linking button proximate or adjacent to the selected portion. The linking button is displayed using the color of the pen used to select this selected portion, and using the symbol associated with this color (see FIG. 11). The notes engine 506 associates the sub-note identifier for the new sub-note with this linking button. In this manner, the notes engine 506 can locate the new sub-note if the user presses the linking button (such operation is described below).

In step 3514, the notes engine 506 displays a linking button (identical to that described in step 3512) in the notes/Web page directory window 1212 and the notes display window 1214 for the note.

Referring again to FIG. 32, the user interface 504 in step 3220 enables the user to enter information in the appropriate area in the notes display window 1214 for the new sub-note. Such information can be of any format, such as text, sound, video, tactile, computer program, etc. The notes engine 506 stores this information in the content object (such as content object 810 of FIG. 8) of the new sub-note's object. The user may also enter privacy settings at this time for the note, sub-note, or link. The notes engine 506 stores any such information entered by the user in the appropriate locations of the sub-note object.

6.3 Create a Note/Sub-note (Using a Pen)

Figure 36:
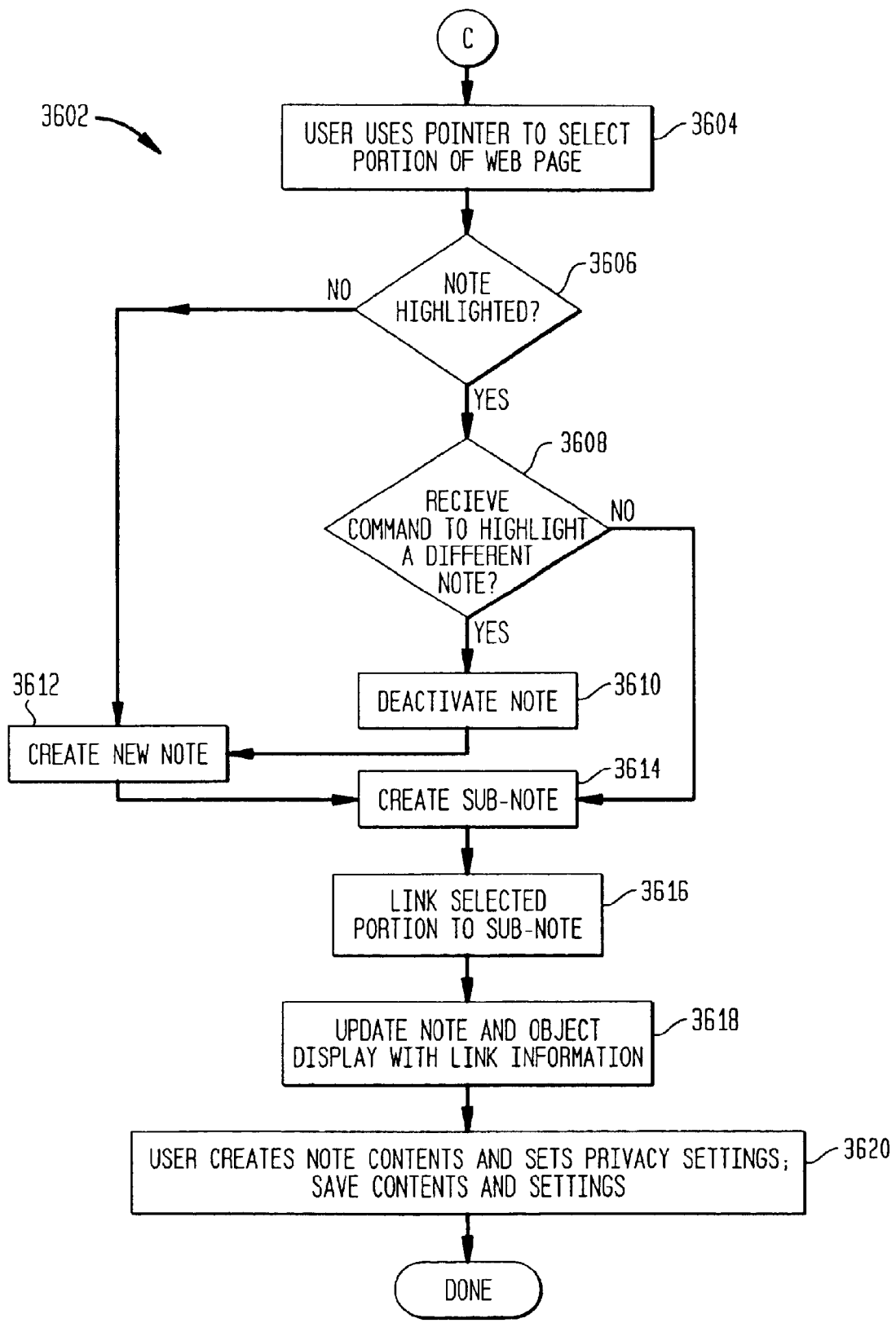

Another way for the user to issue a command to create a new note or sub-note is to press one of the pen buttons 1210, and then use the resulting pointer 1220 to select a portion of the Web page currently being displayed. A new sub-note is then created and linked to this selected portion. This approach does not require the user to use the file menu 1402. The operation of the Web annotation system 502 in accordance with this approach is re presented by a flowchart 3602 shown in FIG. 36.

In step 3604, the user selects one of the pen buttons 1210 in order to obtain a pen. The user then uses this pen to activate the pointer 1220 (in the manner discussed above) to select a portion of the Web page. The notes engine 506 commands the application associated with the Web page to color code the selected portion using the color associated with the pen.

In step 3606, the notes engine 506 of the Web annotation system 502 determines whether a note is currently highlighted in the computer display (i.e., the display unit 2826). That is, the notes engine 506 determines whether a note is currently active. If a note is not currently highlighted or active, then step 3612 is performed. Otherwise, step 3608 is performed.

In step 3608, the notes engine 506 determines whether the user has issued a command to highlight a different note (i.e., deactivate the note that was currently being highlighted). The user issues such a command if he wishes to insert the new sub-note in a new note, as opposed to the currently active note. If the notes engine 306 determines that the user has not issued a command to close the note that is currently being displayed, then step 3614 is performed (described below). (In step 3614, the note currently being displayed is called the active note for reference purposes.) Otherwise, step 3610 is performed.

In step 3610, the notes engine 306 deactivates the note.

In step 3612, the notes engine 506 creates a new note. As represented above with reference to FIG. 33, the notes engine 506 creates a new note by creating and storing a new note object (such as note object 806 in FIG. 8) in the notes database 508 (step 3306). The notes engine 506 adds the new note object to the note repository object 804 (step 3308). The notes engine 506 in step 3310 initializes the new note object by storing its title in the note object (this name is preferably entered by the user). At this point, the Web annotation system 502 may also prompt the user for security/privacy settings for the new note object. Any security/privacy settings input by the user are also stored in the new note object. Also in step 3612, the user interface 504 displays the new note (i.e., note object) in the notes/Web page directory window 1212 and the notes text window 1214. The new note is called the active note for reference purposes.

In step 3614, the notes engine 506 creates a new sub-note. As indicated above with reference to FIG. 34, the notes engine 506 creates a new sub-note by creating a new sub-note object (such as sub-note object 808 in FIG. 8) in step 3406.

In step 3616, the notes engine 506 links the selected portion of the Web page to the new sub-note (in the manner discussed above).

In step 3618, the notes engine 506 updates the displays of the Web page and the active note so as to graphically reflect this linkage (in the manner discussed above).

The user interface 504 in step 3620 enables the user to enter information in the appropriate area in the notes display window 1214 for the new sub-note (in the manner discussed above). Such information can be of any format, such as text, sound, video, tactile, computer program, etc. The notes engine 506 stores this information in the content object (such as content object 810 of FIG. 8) of the new sub-note's object. Any security/privacy settings entered by the user are also stored.

6.4 View Note (By Selecting a Linking Button in a Web Page)

Figure 37:
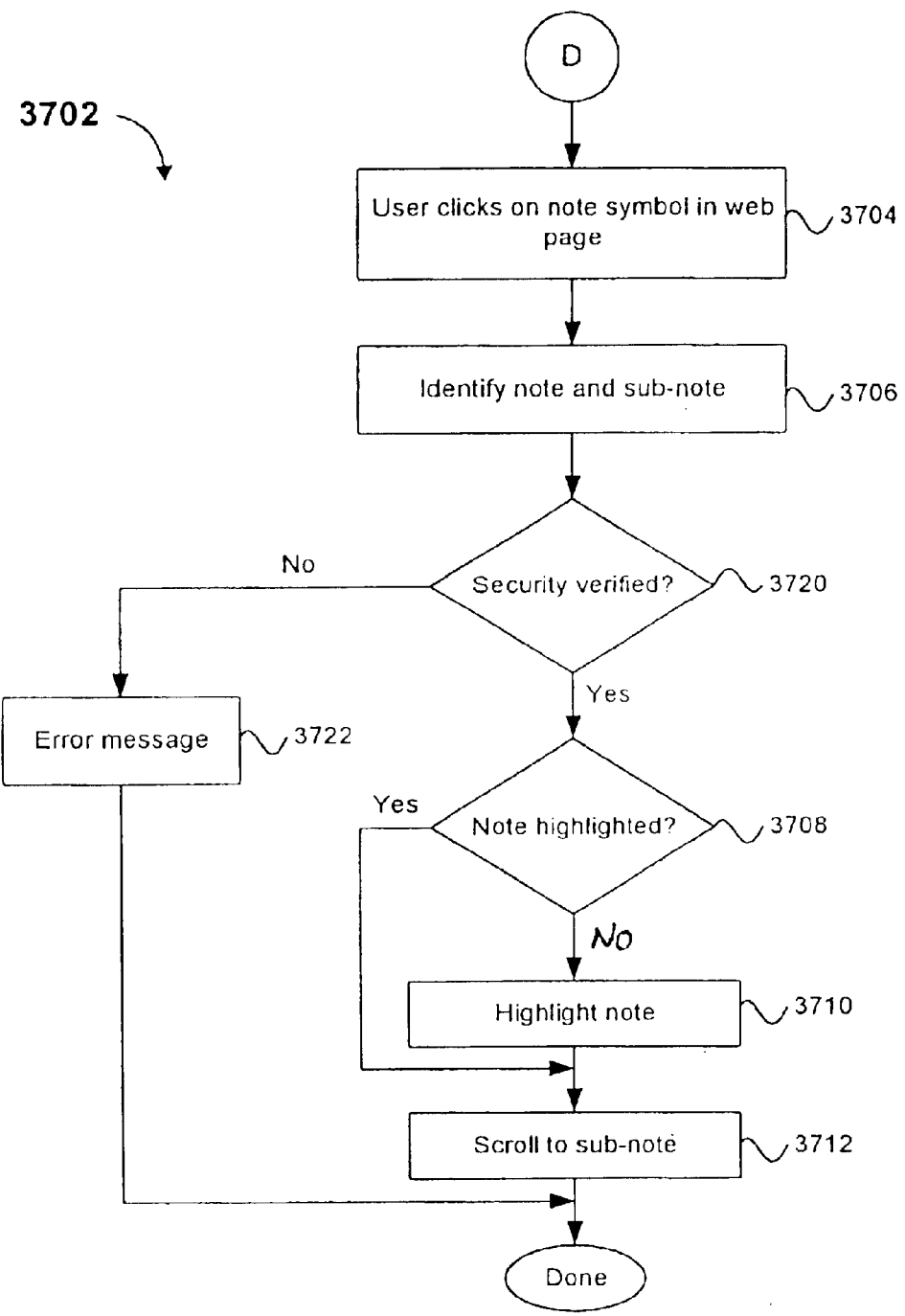

One way for the user to issue a command to view an existing sub-note is to select (using the well known point-and-click approach) the linking button displayed proximate to the portion of the Web page that is linked to the sub-note. For example, in FIG. 4, the user can issue a command to view Sub-note A by selecting the linking button 2104 next to the portion 2102 of the Web page that is linked to Sub-note A. The operation of the Web annotation system 502 in this regard is represented by a flowchart 3702 in FIG. 37.

In step 3704, the user selects the linking button displayed proximate to the portion of the Web page of interest. For illustrative purposes, suppose that the user clicked on the linking button 2204 corresponding to portion 2202 of the Web page titled "aurigin.com" (FIG. 22).

Figure 38:
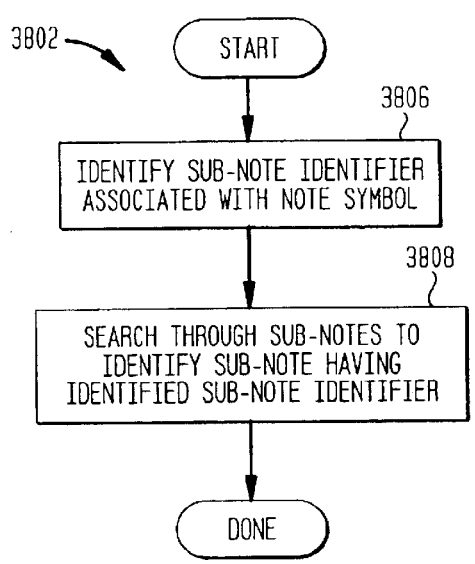

In step 3706, the notes engine 506 in response to this user action identifies the note and sub-note corresponding to linking button 2204. The manner in which the notes engine 506 performs step 3706 is represented by a flowchart 3802 in FIG. 38. In step 3806, the notes engine 506 identifies the sub-note identifier that is associated with the liking button 2204. The linking button 2204 preferably has stored with it the sub-note identifier (or some other type of reference or address to a sub-note). In step 3808, the notes engine 506 searches in a well known manner through the notes database 508 until it locates the sub-note having the sub-note identifier determined in step 3806. For illustrative purposes, assume that the notes engine 506 in step 3808 determines that Sub-note B (see FIG. 29) has the sub-note identifier determined in step 3806.

In step 3720, the notes engine 506 determines whether security/privacy criteria associated with the link (corresponding to the linking button), the sub-note (identified in step 3706), and the note (identified in step 3706) are satisfied. The notes engine 506 retrieves this security/privacy criteria information from the associated note node and sub-note node, and then compares the retrieved security/privacy criteria information to the situation at hand. For example, if the security/privacy criteria is keyed to the current user's password, then the notes engine 506 compares the password of the current user (which the current user previously entered, or is now asked to enter) with that retrieved from the note and/or sub-note. If the security/privacy criteria is not satisfied, then the user cannot view the note and/or sub-note. If this is the case, then an error message is displayed in step 3722. If the security/privacy criteria is satisfied, then control flows to step 3708.

In step 3708, the notes engine 506 determines whether the note that includes the sub-note identified in step 3706 is currently being displayed in the computer display. In the example discussed above, the notes engine 506 in step 3708 determines whether Note B is currently being displayed in the computer display. If Note B is currently being displayed in the computer display, then control flows to step 3712 (described below). Otherwise, step 3710 is performed.

In step 3710, the notes engine 506 displays in a notes display window 1214 the note that includes the sub-note identified in step 3706.

In step 3712, the notes engine 506 scrolls through the note in the notes display window 1214 until the sub-note identified in step 3706 is displayed in the notes display window 1214.

6.5 Search a Note

Figure 39:
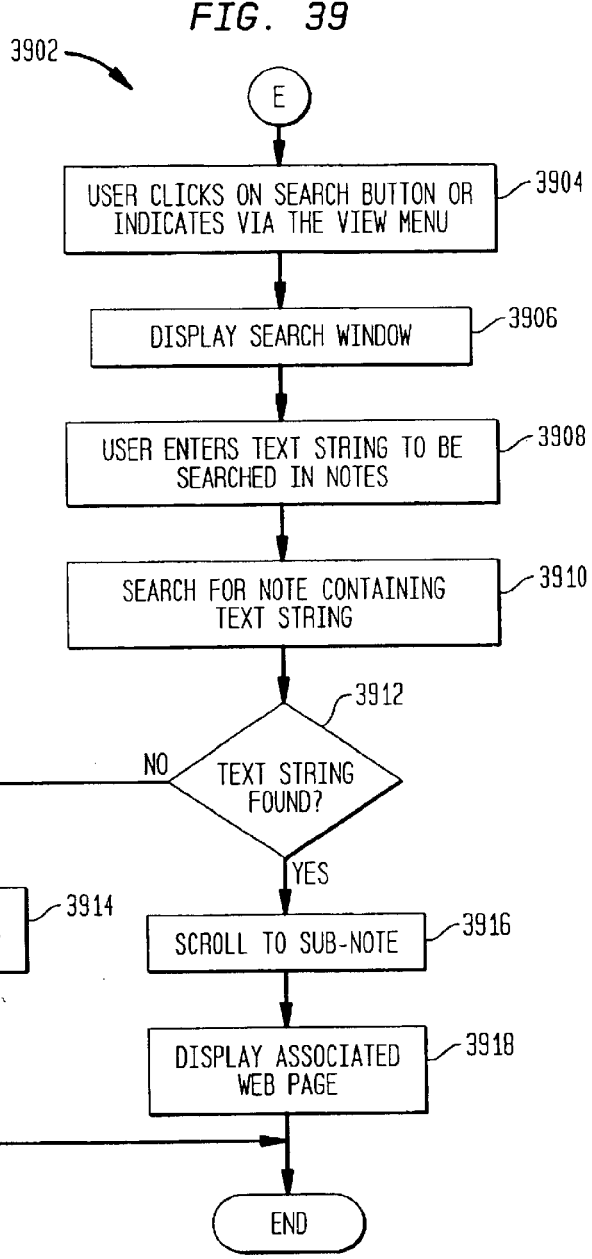

Referring again to FIG. 31, if the user issued a command to search a note, and this command was issued from the view menu 1602 or search button 1230, then control line 3118 is taken. The operation of the Web annotation system 502 in accordance with function is represented by a flowchart 3902 shown in FIG. 39. In step 3904, the user clicks on the search button 1230 or indicated via the view menu 1602 that he would like to search notes for a specific text string.

In step 3906, a search window is displayed. In step 3908, the user types in the search window the text string to be searched for by the present invention. In step 3910, the present invention searches the notes database 508 (specifically the content object 810 of each sub-note object 808 (FIG. 8)) for the indicated text string. In step 3912, if the text string is not found, then control passes to step 3914 where the present invention displays to the user that no matches were found. Alternatively, the control passes to step 3916.

In step 3916, the notes engine 506 scrolls through the note in the notes display window 1214 until the sub-note identified in step 3910 is displayed in the notes display window 1214. In step 3918, the notes engine 506 also displays the associated Web page.

6.6 E-mail Notes to a Recipient

Figure 40:
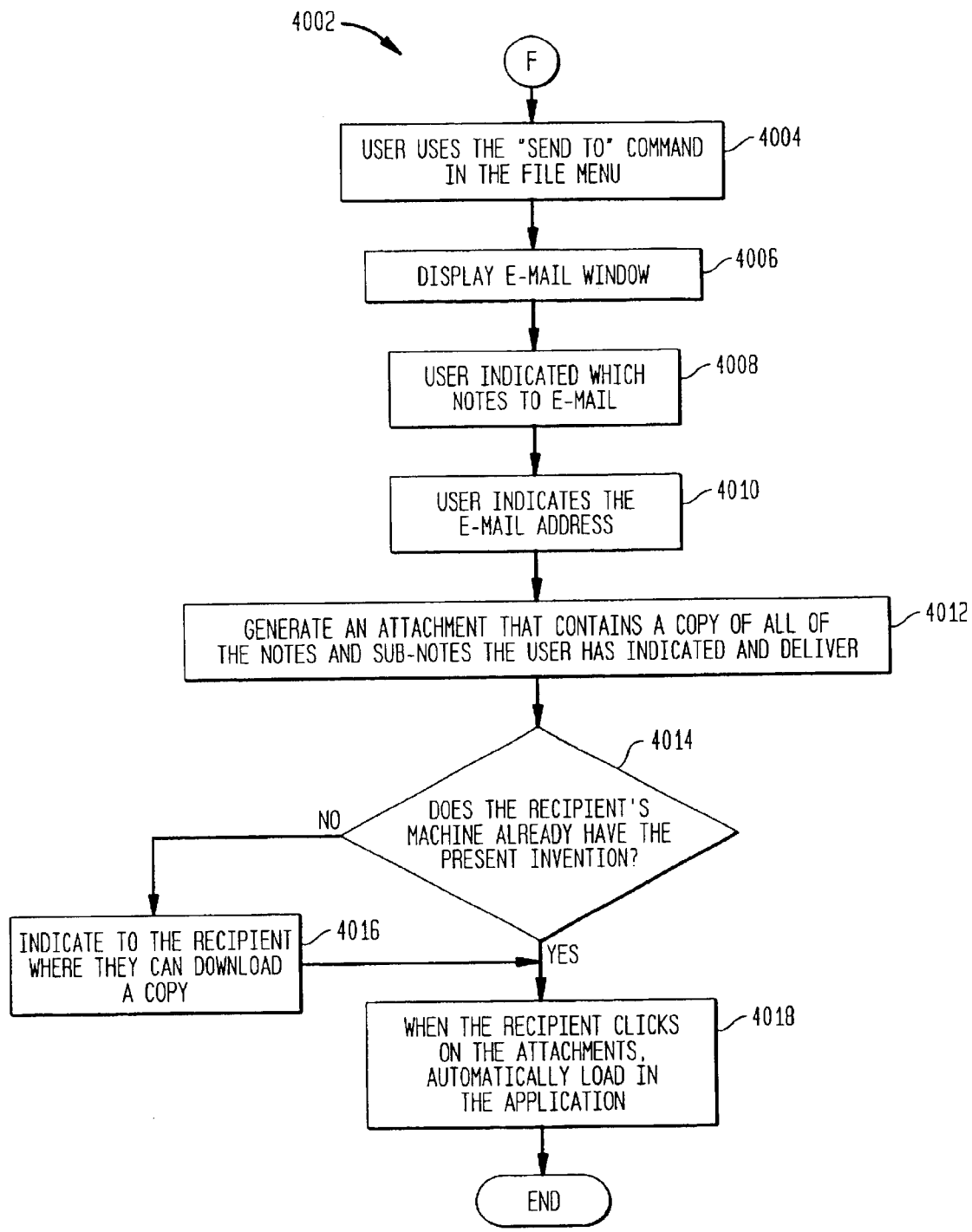

Referring again to FIG. 31, if the user issued a command to e-mail a copy of a portion of notes database 508, and this command was issued from the file menu 1402, then control line 3119 is taken. The operation of the Web annotation system 502 in accordance with function is represented by a flowchart 4002 shown in FIG. 40. In step 4004, the user clicks indicates via the file menu 1402 (by using the "send to" command) that he would like to e-mail a copy of a portion of notes database 508 and any associated Web pages to another user. In step 4006, the present invention displays an e-mail window to the user.

In step 4008, the user utilizes the e-mail window to indicate to the Web annotation system 502 the notes/sub-notes he wants sent to an e-mail recipient. In step 4010, the user indicates the recipient's e-mail address to the present invention. The user can also save AWN (Aurigin Web Note) files. These files can be generated using the "export" command in the file menu 1402. Here, the "sent to" command simply mails an AWN file to the other user.

In step 4012, the Web annotation system 502 generates an attachment that contains a copy of all of the notes/sub-notes and their associated Web pages. Also in step 4012, the Web annotation system 502 sends the attachment to the e-mail recipient.

In step 4014, if the e-mail recipient's machine already has a copy of the present invention, control passes to step 4018. Alternatively, control passes to step 4016. In step 4016, the present invention indicates to the recipient where he can download a copy of the present invention to his machine. Control then passes to step 4018. In step 4018, when the recipient clicks on the attachment sent by the present invention, the present invention automatically loads in the application to display the Web pages.

6.7 Find Specified Text in the Current Web Page

Figure 41:
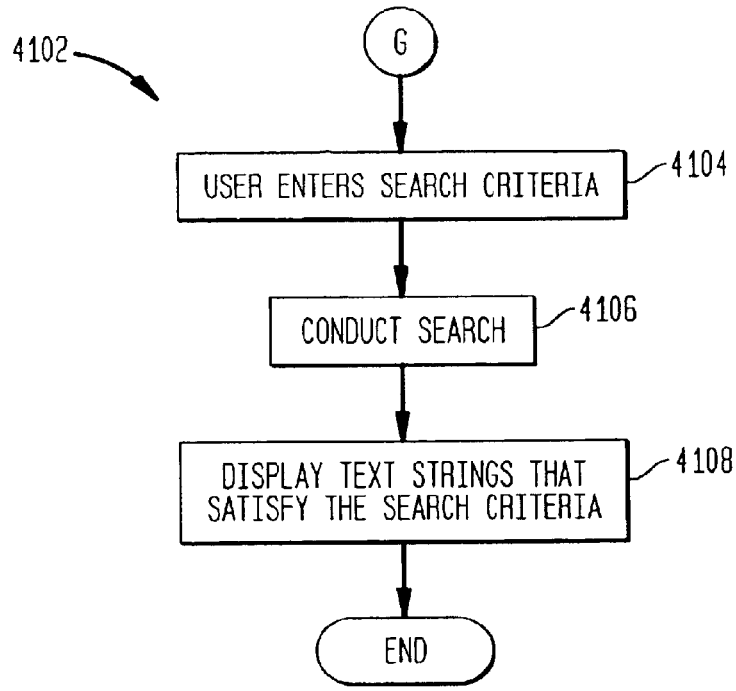

The user initiates a search for a text string in the current Web page by selecting the "Find" command in the edit menu 1502. The operation of the Web annotation system 502 while performing searching is represented by a flowchart 4102 in FIG. 41. In step 4104, the user interface 504 enables the user to enter search criteria. The user enters the text string to search. The user can limit the search criteria by indicating whether to match "whole words only," case, and/or how to search (up or down the Web page). In step 4106, the notes engine 506 searches through the text of the current Web page (as limited by the user) to locate any and all text strings that satisfy the search criteria. In step 4108, the user interface 504 highlights the first text string located in the current Web page. If no text strings are found, the present invention indicates this to the user.

6.8 Modify Privacy/Security Settings

Figure 42:
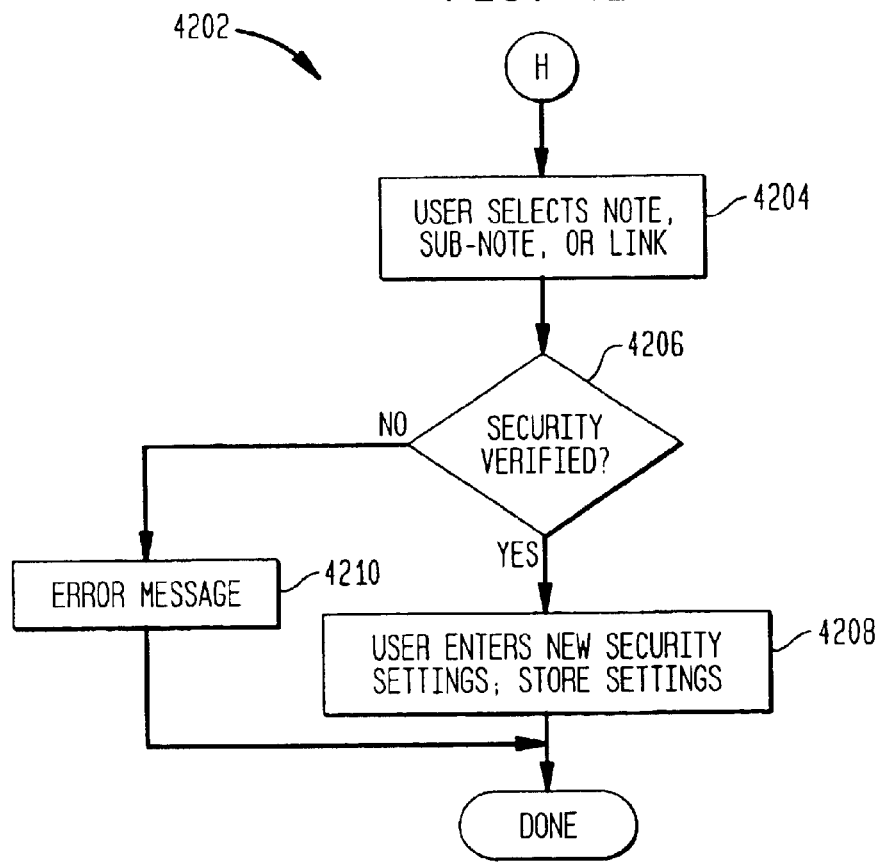

Flowchart 4202 in FIG. 42 represents the operation of the invention when enabling the user to modify the privacy/security settings associated with a note grouping, note, sub-note, or link.

In step 4204, the user selects a note grouping, note, sub-note, or link using any of the selection procedures discussed herein.

In step 4206, the Web annotation system 502 verifies that the privacy/security criteria associated with the selected item is satisfied. Such verification is described above. If the privacy/security criteria is not satisfied, then the user is not allowed to modify the privacy/security settings. In this case, an error message is displayed in step 4210. If the privacy/security criteria is satisfied, then in step 4208 the user is allowed to enter new privacy/security settings for the selected item. This new privacy/security setting is then stored.

6.9 Edit One or More Notes

The present invention allows users to modify the sub-notes that are in notes. For example, a user may rearrange the ordering of sub-notes within a note. The user can delete sub-notes from a note. The user can also copy (replicate) or move sub-notes from one note to other notes. The user can also move, delete, or otherwise modify the notes that are in the note groups. The user can also modify the linkage between sub-notes and Web page portions. In other words, the invention allows the user to easily modify the note grouping/note/sub-note hierarchy by processing step 3108 (FIG. 31). Such operation of step 3108 is further illustrated by reference to FIG. 43.

Figure 43:
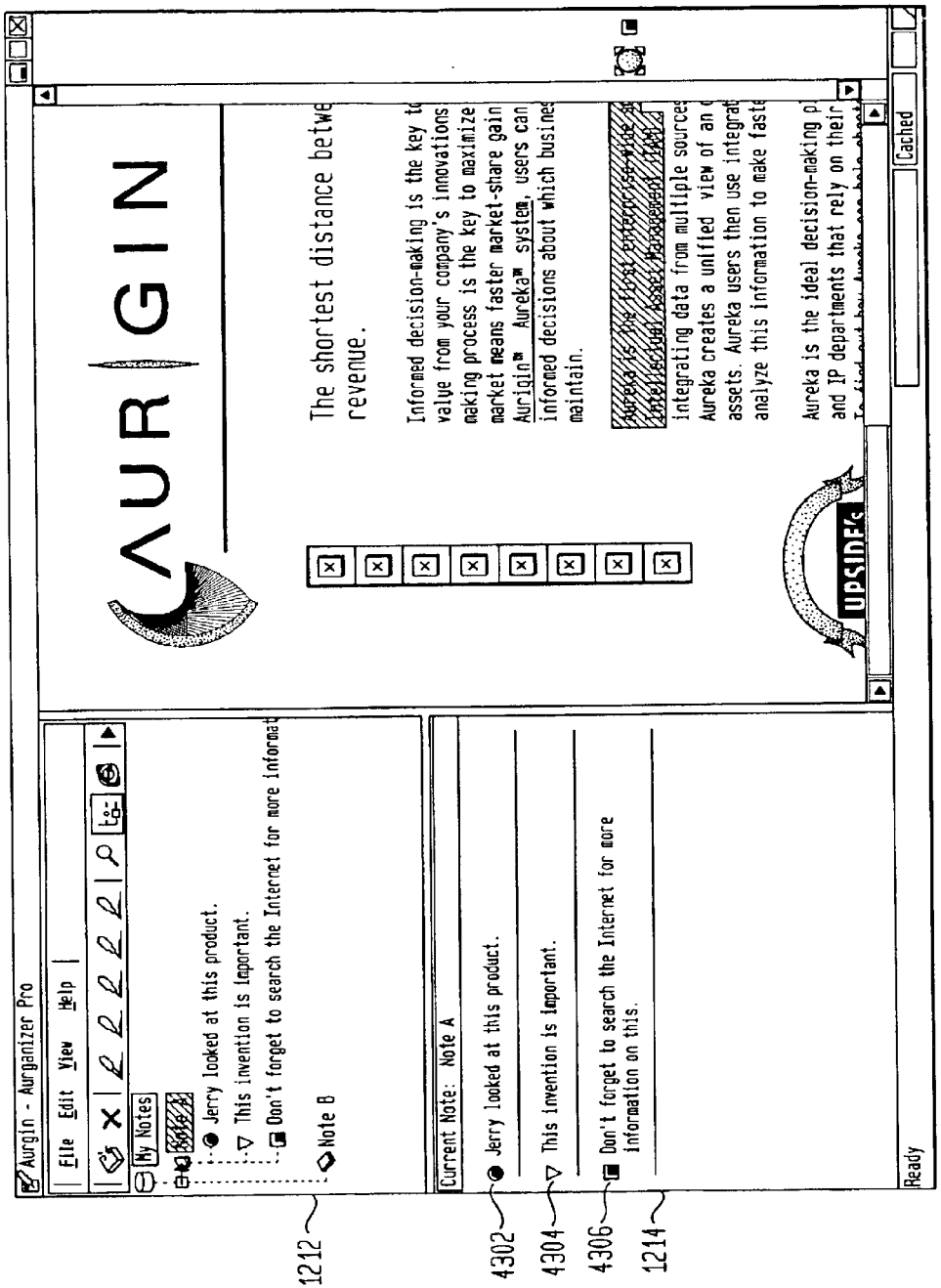
FIG. 43 illustrates the drag and drop method of editing notes according to a preferred embodiment of the present invention.

A user rearranges sub-notes in a note, or moves/copies sub-notes between notes by selecting the desired sub-notes, and then dragging and dropping the selected sub-notes to the desired locations. In FIG. 43, for example, assume that the user wishes to move sub-note 4302 so that it is displayed between sub-notes 4304 and 4306. In this case, the user selects sub-note 4302 in a well known manner, and then drags selected sub-note 4302 until it is located between sub-notes 4304 and 4306. The user then drops sub-note 4302 between sub-notes 4304 and 4306 in a well known manner. This can be done in both notes/Web page directory window 1212 and the notes text window 1214.

Suppose that the user wishes to move sub-note 4302 to Note B. In this case, the user selects sub-note 4302 in a well known manner, and then drags selected sub-note 4302 until it is positioned over Note B. The user then drops sub-note 4302 into Note B. This is done in only the notes/Web page directory window 1212.

The user modifies the notes within a note group and the linkage between sub-notes and Web page portions in a similar manner.

In response to such user commands, the notes engine 506 moves/copies sub-notes between the sub-note objects, modifies the note grouping table 1090, and/or modifies the linkage information in the sub-note nodes.

6.10 Show Sub-Notes

Figure 46:
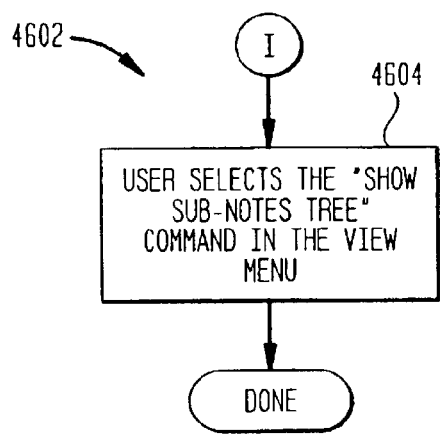
FIGS. 46–49 are flowcharts depicting a preferred operation of the present invention.

Referring again to FIG. 31, if the user issued a command to show sub-notes in the notes/Web page directory window 1212 via view menu 1602, then control line 3124 is taken. Such operation is further described with reference to flowchart 4602 in FIG. 46. In step 4604, the user indicates to the present invention to show the content of the sub-notes in the notes/Web page directory window 1212 by selecting the "Show Sub-notes In Tree" command in the view menu 1602.

6.11 Toggle Between Notes and Web Pages View

Figure 47:
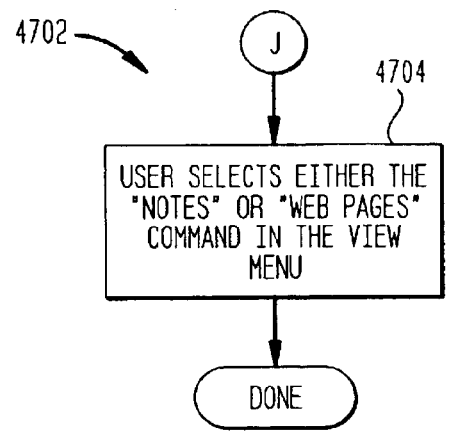

If the user issued a command to toggle between viewing notes or Web pages in the notes/Web page directory window 1212 via view menu 1602, then control line 3126 is taken. Such operation is further described with reference to flowchart 4702 in FIG. 47. In step 4704, the user can toggle between displaying the notes tree or Web pages tree in the notes/Web page directory window 1212 by either selecting the "Notes" command or the "Web Pages" command in the view menu 1602.

6.12 Change or View Options

Figure 48:
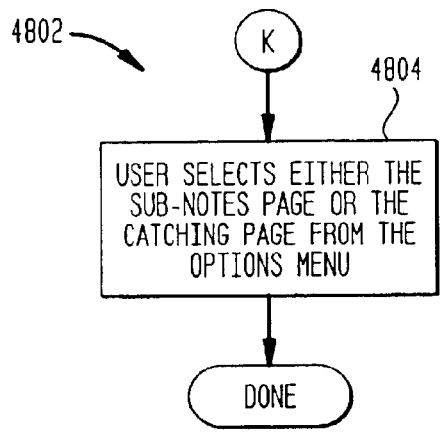

If the user issued a command to change or view options via the view menu window 1602, then control line 3128 is taken. Such operation is further described with reference to flowchart 4802 in FIG. 48. In step 4804, the user can select either the sub-notes page 1704 or the caching page 1706 by selecting the options menu 1702 (FIG. 17). Referring to FIG. 17, the sub-files file 1704 provides the user with options on how the sub-notes are displayed. For example, the sub-notes can be shown in the tree in the notes/Web page directory window 1212 (as described above with the sub-notes button 1232), the contents of the sub-note can be displayed beside the title of the note in the tree, and the title and/or URL of the Web page that the sub-note is linked to can be display in the tree. The caching option, when checked, in the caching page 1706 indicates to the present invention to cache Web pages in the Web pages database 509 for faster retrieval of the Web pages by the present invention.

6.13 Change or View Properties

Figure 49:
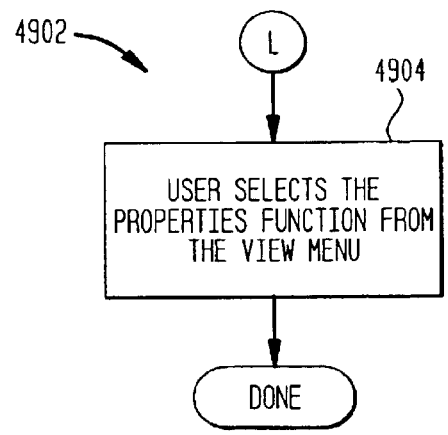

If the user issued a command to change or view properties via the view menu window 1602, then control line 3130 is taken. Such operation is further described with reference to flowchart 4902 in FIG. 49. In step 4904, the user selects the properties function from the view menu 1602 and a properties menu 1902 (FIG. 19) is displayed. Referring to FIG. 19, the properties menu 1902 has a note page 1904. Here, the title of the note is displayed (and can be changed by the user), the date and time it was created, and the date and time it was last modified.

7. Applications of the Invention

The invention is applicable to any application that would benefit from the enhanced organization of information. Such applications include, but are not limited to: (1) law related projects, such as licensing studies, litigation efforts, opinions of counsel (such as patentability, patent validity, and patent infringement studies); (2) scientific and/or engineering related projects, such as research and development projects; (3) electronic text books, handbooks, user manuals, encyclopedias, and other electronic reference works, including multimedia reference works; (4) auditory and visual documents; (5) virtual library; (6) review course, such as legal bar review course, business review courses, CPA courses, medical review courses, etc.; (7) virtual classrooms; (8) business-related Internet to research; and (9) casual Internet use.

Other applications of the invention will be apparent based on the discussion contained herein. Two such applications are discussed in some detail below.

7.1 Movie Production

Figure 44:
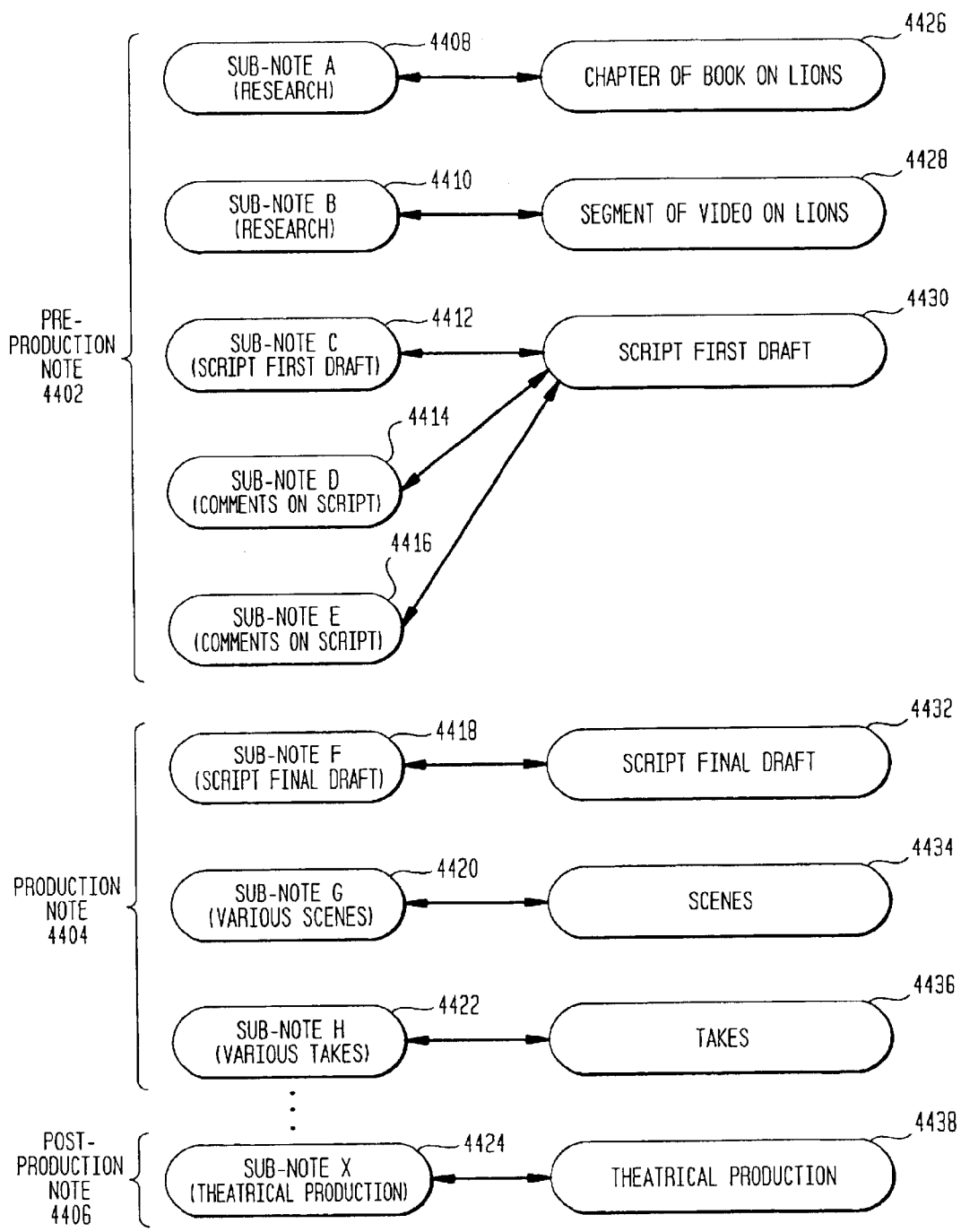
FIG. 44 illustrates a movie making example.

The invention is applicable to the entertainment industry, such as the motion picture industry. The invention could be used to organize the great amounts of information that is collected and generated during the development of a movie and stored on the Internet. This scenario is represented in simplified form in FIG. 44.

Generally, a movie is developed in three phases: a pre-production phase, a production phase, and a post production phase. The present invention could be used to organize, memorialize, and institutionalize the information collected and generated during these phases. Specifically, a note 4402 could be created for the pre-production phase. Also, a note 4404 could be created for the production phase, and another note 4406 could be created for the post production phase.

The pre-production note 4402 could include sub-notes that link to Web pages used to research the movie's topic. For example, suppose the movie involved lions. One sub-note, called Sub-note A, could be linked to a chapter in a book 4426 dealing with lions stored on a Web page. Another sub-note, Sub-note B, could be linked to a segment of a video 4428 pertaining to lions stored on a Web page. Other sub-notes, such as Sub-notes C–E, could be linked to drafts 4430 of the script on Web pages. These sub-notes could include comments/edits on the drafts 4430. Other sub-notes (not shown) could be linked to other pre-production related objects, such as contracts with actors, travel itineraries, budget reports, purchase orders for costumes and props, etc.

The production note 4404 could include sub-notes that are linked to production Web pages, such as the final draft of the script 4434, various scenes 4434, various takes 4434, clips, shots, frames, etc. Such scenes 4434, takes 4434, clips, shots, and frames would be in a form useable by a computer.

The post production note 4406 could include sub-notes that are linked to post-production Web pages, such as the theatrical production 4424 of the movie, the video production 4424 of the movie, the movie soundtrack, etc.

There are many advantageous for using the present invention to create movies. First and perhaps foremost, the present invention will lend order to the creation of a movie and to the memorialization and documentation of the movie production. Accordingly, movie production will be more efficient and effective.

Second, the use of the invention to create movies will create great marketing opportunities. Currently, there is limited distribution of movies and their related materials. For most movies, only the theatrical version and perhaps the home video version are sold and distributed. Limited source materials (such as the "Making of" type publications) are available to the public.

The present invention allows any and all versions of any given movie to be easily packaged, distributed and sold. One need only copy the pertinent notes, sub-notes, and Web pages to a computer readable medium (such as one or more compact disks), and distribute and sell copies of the computer readable medium to the public.

Also, for movie historians and other interested parties, the materials that were used to create the movie (such as the pre-production information and the production information) can be easily packaged, distributed, and sold. Again, one need only copy the pertinent notes, sub-notes, and Web pages to a computer readable medium, and distribute and sell copies of the computer readable medium to the public.

Further, the use of the invention will enable movie aficionados to create their own versions of a movie. This is the case, since the soundtrack, scenes, takes, clips, shots, and/or frames are stored as Web pages, and are linked to sub-notes. Such personalized movie making packages can be easily packaged, distributed, and sold. Again, one need only copy the pertinent notes, sub-notes, and Web pages to a computer readable medium, and distribute and sell copies of the computer readable medium to the public.

7.2 Bar Review Program

The invention could be used to create attorney bar review course materials. These materials could be used as a supplement to a traditional bar review course, or as an alternative to a bar review course.

Figure 45:
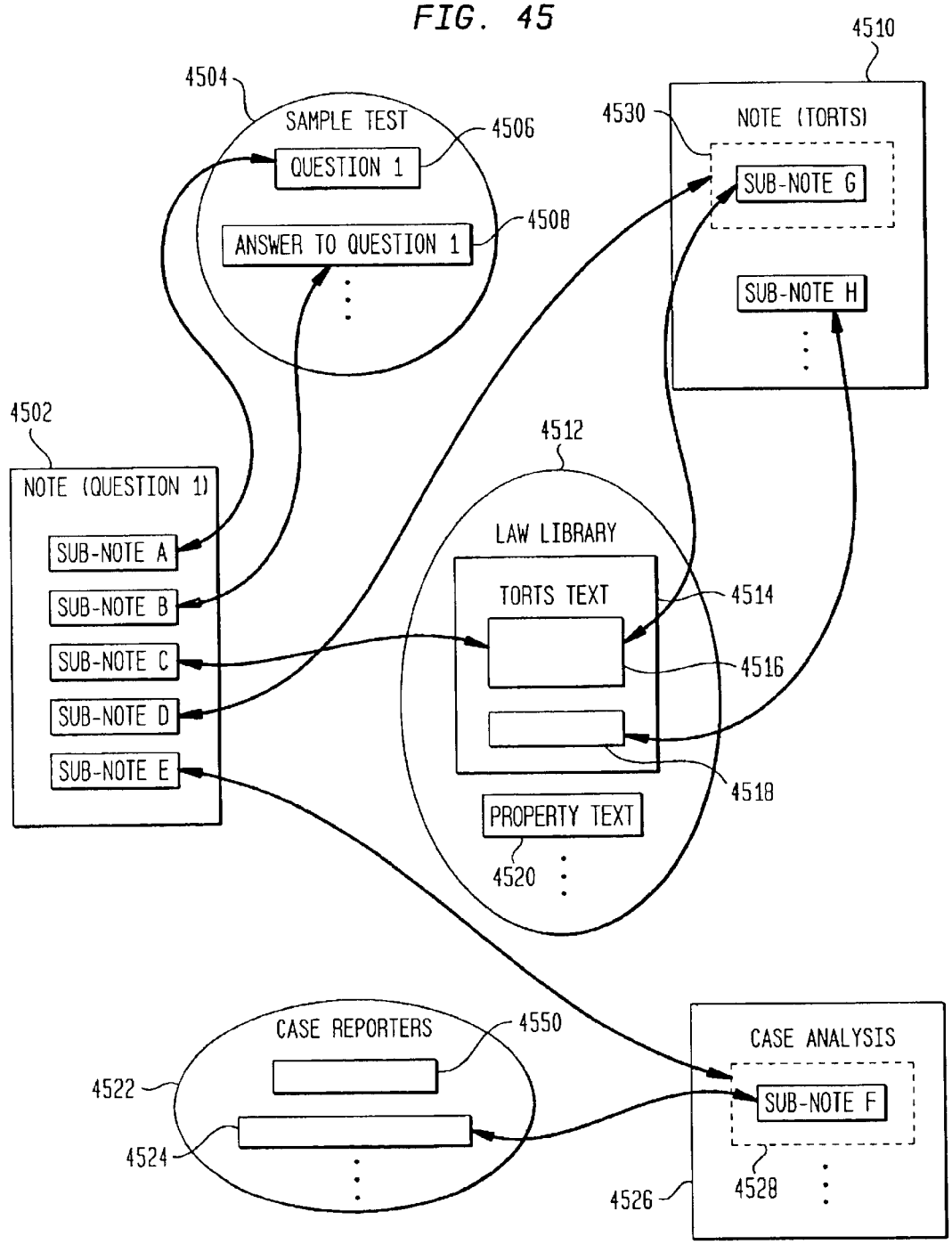
FIG. 45 illustrates a bar review course materials example.

A portion of an example notes database 508 for a bar review course is shown in FIG. 45. Bar review course materials typically include a number of sample tests. According to the present invention, a note is associated with each question of each sample test. For example, note 4502 is associated with Question 1. Sub-note A is linked to the portion 4506 of a sample test Web page 4504 that corresponds to Question 1. Sub-note B is linked to the portion 4508 of the sample test Web page 4504 that corresponds to the answer to Question 1.

Suppose that Question 1 pertains to an area of Torts law. Question 1 note 4502 may also include a Sub-note C that is linked to a portion 4516 of a torts text 4514 in an electronic legal library 4512. This portion 4516 deals with the substantive torts law of Question 1. A student may find it very useful to study this portion 4516 when working with Question 1.

The notes database 508 could also include a torts note 4510 that the deals specifically with torts. This torts note 4510 could have sub-notes, such as Sub-notes G and H, that are linked to portions of the torts text 4514. Sub-notes G and H could have commentary on these portions of the torts text 4514. The Question 1 note 4502 could then have a Sub-note D that points to Sub-note G in the torts note 4510. Sub-note G points to the same portion 4516 in the torts text 4514 pointed to by Sub-note C (typically, the Question 1 note 4502 would include Sub-note C or Sub-note D, but not both). Notes dealing with questions other than Question 1 could then point to the sub-notes in the torts note 4510, as necessary, thereby enhancing reusability.

The notes database 508 could also include a case analysis note 4526 that includes sub-notes that point to cases in electronic case reporters 4522. These sub-notes could include commentary and analysis of such cases. The Question 1 note 4502 could include a Sub-note E that is linked to a Sub-note F in the case analysis note 4528. This Sub-note F is linked to a case 4524 that deals with the issues of Question 1. Students may find it useful to review this case 4524 when working with Question 1.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for linking notes to Web pages, comprising:

means for enabling a user to select a portion of a Web page;

means for creating an annotation;

means for linking said annotation to said selected portion;

means for receiving a request from a user viewing said annotation to display said selected portion linked to said annotation; and means for invoking an application to view said selected portion, if said application is not already invoked, and for causing said application to load said Web page and present said selected portion.

2. The system of claim 1, further comprising:

means for receiving a request from a user viewing said selected portion to display said annotation linked to said selected portion; and means for loading said annotation, if said annotation is not already loaded, and for displaying said annotation.

3. The system of claim 1, further comprising:

means for enabling a user to enter into said annotation a description of the rationale for linking said annotation to said selected portion.

4. The system of claim 1, further comprising:

means for enabling a user to e-mail another user a copy of said annotation and a copy of said selected portion.

5. The system of claim 1, wherein said annotation is a first sub-notes in a note, further comprising:

means for enabling a user to select a second portion of said Web page;

means for creating a second sub-note in said note; and means for linking said second sub-note to said selected second portion.

6. The system of claim 5, wherein said first portion and said second portion partially overlap in said Web page.

7. The system of claim 1, wherein said annotation is a first sub-note in a note, further comprising:

means for enabling a user to select a second portion of a second Web page associated with a second application;

means for creating a second sub-note in said note; and means for linking said second sub-note to said selected second portion.

8. The system of claim 7, further comprising:

means for receiving a request from a user viewing said note to display said selected second portion linked to said second sub-note; and means for invoking said second application, if said second application is not already invoked, and for causing said second application to load said second Web page and present said selected second portion.

9. The system of claim 1, wherein said portion of said Web page is one or more of a portion of a text object, a portion of a spreadsheet object, a portion of a database object, a portion of a financial object, a portion of a communication object, a portion of a multimedia object, a portion of a video object, a portion of a graphics object, a portion of a presentation object, a portion of a computer program object, a portion of an audio object, a portion of a digital image object, a portion of a networking object, a portion of an on-line service object, a portion of a scanner object, a portion of a CAD object, and a portion of a virtual reality object.

10. A method of linking notes to Web pages, comprising the steps of:

(1) enabling a user to select a portion of a Web page;

(2) creating a annotation;

(3) linking said annotation to said selected portion;

(4) receiving a request from a user viewing said annotation to display said selected portion linked to said annotation; and (5) invoking an application, if said application is not already invoked, and for causing said application to load said Web page and present said selected portion.

11. The method of claim 10, further comprising the steps of:

(6) receiving a request from a user viewing said selected portion to display said annotation linked to said selected portion; and (7) loading said note, if said annotation is not already loaded, and for displaying said annotation.

12. The method of claim 10, further comprising the step of:

(6) enabling a user to enter into said annotation a description of the rationale for linking said annotation to said selected portion.

13. The method of claim 10, further comprising the step of:

(6) enabling a user to e-mail another user a copy of said annotation and a copy of said selected portion.

14. The method of claim 10, wherein said annotation is a first sub-note in a note, further comprising the steps of:

(6) enabling a user to select a second portion of said Web page;

(7) creating a second sub-note in said note; and (8) linking said second sub-note to said selected second portion.

15. The method of claim 14, wherein said first portion and said second portion partially overlap in said Web page.

16. The method of claim 10, wherein said annotation is a first sub-note in a note, further comprising the steps of:

(6) enabling a user to select a second portion of a second Web page associated with a second application;

(7) creating a second sub-note in said note; and (8) linking said second sub-note to said selected second portion.

17. The method of claim 16, further comprising the steps of:

(9) receiving a request from a user viewing said note to display said selected second portion linked to said second sub-note; and

(10) invoking said second application, if said second application is not already invoked, and for causing said second application to load said second Web page and present said selected second portion.

18. The method of claim 10, wherein said portion of said Web page is one or more of a portion of a text object, a portion of a spreadsheet object, a portion of a database object, a portion of a financial object, a portion of a communication object, a portion of a multimedia object, a portion of a video object, a portion of a graphics object, a portion of a presentation object, a portion of a computer program object, a portion of an audio object, a portion of a digital image object, a portion of a networking object, a portion of an on-line service object, a portion of a scanner object, a portion of a CAD object, and a portion of a virtual reality object.

* * * * *